(12) United States Patent
Nishimori et al.

(10) Patent No.: US 8,073,592 B2
(45) Date of Patent: Dec. 6, 2011

(54) STEERING SYSTEM

(75) Inventors: Takashi Nishimori, Wako (JP);
Hiroyuki Tokunaga, Wako (JP);
Masaya Yamada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 930 days.

(21) Appl. No.: 12/052,254

(22) Filed: Mar. 20, 2008

(65) Prior Publication Data
US 2008/0243339 A1    Oct. 2, 2008

(30) Foreign Application Priority Data

| Mar. 27, 2007 | (JP) | 2007-080485 |
| Mar. 28, 2007 | (JP) | 2007-084605 |
| Mar. 29, 2007 | (JP) | 2007-088012 |
| Apr. 12, 2007 | (JP) | 2007-104508 |

(51) Int. Cl.
*B62D 5/06* (2006.01)

(52) U.S. Cl. ......... 701/39; 701/43; 180/404; 280/5.522

(58) Field of Classification Search ............ 701/39, 701/43; 180/404; 280/5.522
See application file for complete search history.

(56) References Cited

U.S. PATENT DOCUMENTS

| 6,929,086 | B1 | 8/2005 | Husain et al. | |
| 7,873,440 | B2 * | 1/2011 | Horiuchi et al. | 700/279 |
| 7,878,512 | B2 * | 2/2011 | Horiuchi et al. | 280/5.522 |
| 2005/0178606 | A1 * | 8/2005 | Husain et al. | 180/408 |
| 2011/0046851 | A1 * | 2/2011 | Onaya et al. | 701/41 |

FOREIGN PATENT DOCUMENTS

| DE | 102005007725 A1 | 9/2005 |
| EP | 1 958 850 | 8/2008 |
| FR | 2887839 | 1/2007 |
| JP | 62-125952 | 6/1987 |
| JP | 05-058326 | 3/1993 |
| JP | 2000-177615 | 6/2000 |
| JP | 2002-059855 | 2/2002 |
| JP | 2003-081117 | 3/2003 |
| JP | 2005-199955 | 7/2005 |
| JP | 2006-069497 | 3/2006 |
| WO | 2006117343 A1 | 11/2006 |
| WO | 2007/003661 A1 | 1/2007 |

* cited by examiner

*Primary Examiner* — Kevin Hurley
(74) *Attorney, Agent, or Firm* — Rankin, Hill & Clark LLP

(57) ABSTRACT

A steering system includes: an electric power steering device which includes a steering unit of front wheels having an electric motor for generating an auxiliary torque in accordance with at least a steering torque and for transmitting the auxiliary torque to the steering unit; toe angle changers for changing toe angles of rear wheels in accordance with at least a front wheel turning angle and a vehicle speed; and a steering controller for controlling the electric power steering device and the toe angle changer. The steering system further includes a toe angle changer anomaly detection unit and/or an electric power steering device anomaly detection unit, and when a toe angle changer abnormal state is detected, an auxiliary torque target value and/or a viscosity in the electric power steering device is controlled, and when an electric power steering device abnormal state is detected, the toe angle changer is controlled.

15 Claims, 32 Drawing Sheets

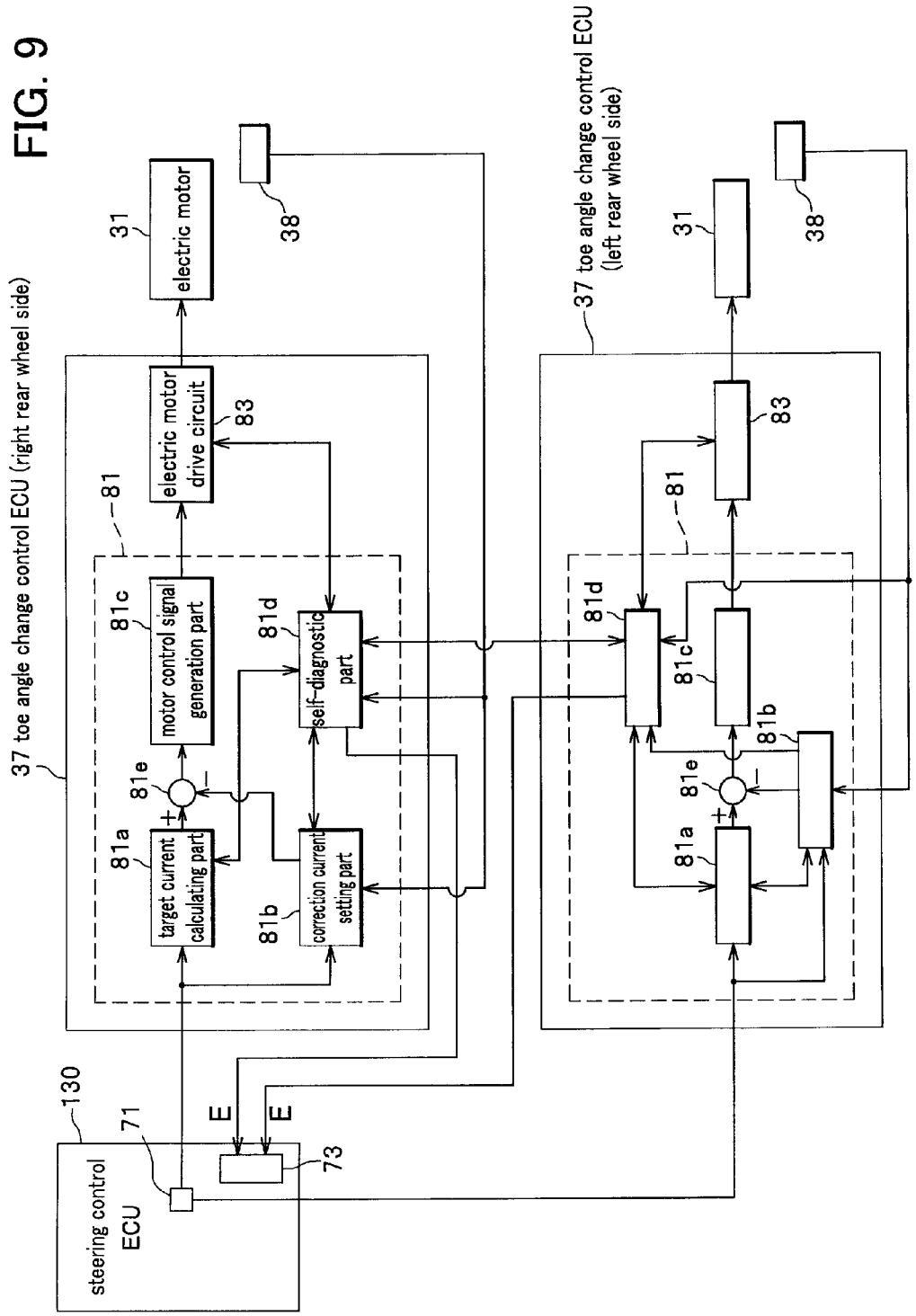

STEERING SYSTEM

CROSS-REFERENCE TO RELATED APPLICATIONS

This application claims the foreign priority benefit under Title 35, United States Code, section 119 (a)-(d), of Japanese Patent Application Nos. 2007-080485, 2007-084605, 2007-088012 and 2007-104508, filed on Mar. 27, 28 and 29, and Apr. 12, 2007, respectively, in the Japan Patent Office, the disclosures of which are herein incorporated by reference in their entirety.

BACKGROUND OF THE INVENTION

1. Field of the Invention

The present invention relates to a steering system in which an operation of toe angles of rear wheels is controlled based on a turning angle of front wheels and a vehicle speed, and particularly to a steering system in combination with an electric power steering device which assists steering wheel turn of the front wheels.

2. Description of the Related Art

An electric power steering device is a device in which an electric motor generates an auxiliary torque in accordance with a magnitude of a steering torque, and the auxiliary torque is transmitted to a steering unit, to thereby reduce a steering effort required by a driver for steering. In Japanese patent application examined publication No. H6-47388 (FIG. 2) (hereinbelow, referred to as "Patent Document 1"), there is disclosed an all-wheel independent steering device in which operation of all running wheels are individually controlled based on an operation angle of a steering wheel and a vehicle speed. Also in Japanese patent application unexamined specification No. 2005-199955 (FIG. 6) (hereinbelow, referred to as "Patent Document 2"), there is disclosed a technique in a steering device of a steer-by-wire type vehicle for informing an anomaly to the driver, in which, when an abnormal state (failure) associated with the steering wheel turn occurred, an electronic control unit selects a map that gives a larger (or "heavier") steering torque, based on a conversion table including a relationship between turning angle and steering torque, to thereby make a steering torque in response to the steer wheel operation of the driver become larger as compared with a driving in a normal state.

There is also disclosed a technique in which a base signal (auxiliary torque) based on steering torque and vehicle speed is compensated with inertia and damping (viscosity) in the steering unit, and an electric motor is controlled using the compensated signal as a target current (see Japanese patent application unexamined specification Nos. 2002-59855 (FIG. 2) and 2000-177615 (FIG. 2) (hereinbelow, referred to as "Patent Document 3" and "Patent Document 4", respectively)).

In Patent Document 3, properties including a base signal, damping and inertia are computed using a base table, a damper table and an inertia table which substantially has a differential property, respectively. Herein, setting of each table, which includes functions of steering torque, vehicle speed and electric motor angular velocity, will be discussed. The base table is set in such a manner that a driver is provided with road information and a steady responsive feeling from a steering torque, in accordance with an increase in the vehicle speed, and thus it is required that a gain be made lower when the vehicle speed is higher, and that a dead zone is set larger for giving a larger manual steering zone. The base table is also set so as to give an excellent steering feeling, and therefore, it is required that a response lag, which may otherwise be caused by electric motor inertia, viscosity or the like, be reduced by using the inertia table.

Since the road reaction is reduced when the vehicle runs at a higher speed, the damping control introduces inhibitory control to the motion of the electric motor at higher rotational speed range, to thereby impart stability to steering feeling. Therefore, in the damping control, a target current is corrected (damped) with a compensation value corresponding to damping gain. In the vehicle having a toe angle changer capable of turning the rear wheel, the toe angle of the rear wheels are also taken into consideration upon the damping control.

In the vehicle steering system for controlling vehicle properties by performing drive control of toe angle of rear wheels (RTC: Rear Toe Control), drive control by RTC may be failed (drive control by RTC may be in an abnormal state). In this case, it becomes impossible to control the rear wheels, and the toe angle of rear wheels become fixed, leading to change in a yaw rate gain of the vehicle. Especially, in the case of the anomaly, such as toe-out or antiphase failure, under a high yaw rate gain, the vehicle tends to be unstable, and thus stabilizing the vehicle body is highly demanded.

There is disclosed a technique for stabilizing a vehicle in which vehicle properties, such as yaw rate, are fed back to the system, and a control with an electric power steering device is performed using a reaction force based on the feedback (see, for example, Japanese patent application unexamined specification No. 2003-81117 (hereinbelow, referred to as "Patent Document 5")).

However, in the conventional techniques, such as those disclosed in Patent Document 5 which uses the feedback of the yaw rate or the like, a reaction force value based on the feedback is determined simply for each vehicle speed. As a result, the reaction force value based on the feedback, which is supposed to be determined in accordance with the vehicle properties, cannot be properly altered. When the vehicle properties has changed due to failure of the drive control by RTC, the vehicle tends to be unstable, but the conventional technique cannot respond to the change, leading to poor stabilization of the vehicle.

In addition, when the toe angle changer is in an abnormal state, for example, when the toe angle changer is locked with the wheels toed out or with an antiphase control state, and the vehicle runs at a higher speed, the vehicle behavior becomes unstable.

Moreover, if the locking as described above occurs when the vehicle runs at a low speed, the driver may not sense anomaly (may feel as usual), due to the assisting effect by auxiliary torque in the electric power steering device.

In order to solve this problem, it may be natural to come up with the proposal that, when the toe angle changer is in an abnormal state, the steering torque is made larger than usual as described in Patent Document 2, and a means to notify the anomaly to the driver is further provided. However, a sudden change in the steering torque in response to the anomaly detection of the toe angle changer will give an awkward feeling to the driver.

Also in the techniques disclosed in Patent Documents 3 and 4, when the toe angle changer is in an abnormal state, the toe angles of rear wheels are fixed and the reaction force properties are changed, which may give unnatural steering feeling to the driver.

In the technique disclosed in Patent Document 1, when the power steering device is in an abnormal state, such as no auxiliary torque is output from the power steering device, the operational reaction force on the steering wheel becomes larger than that in the normal state, leading to delay in steering wheel operation by the driver. If the toe angle changer is normally acted under such a condition, the turnability is not reduced in response to the reduced steerability, leading to a discomfort to the driver.

Therefore, it would be desirable to provide a steering system that solves above-mentioned problems in vehicle stability and steerability associated with anomaly in the relationship between the rear wheel toe angle changer and the power steering, by performing a control in the combination of the power steering and the rear wheel toe angle changer.

SUMMARY OF THE INVENTION

In one aspect of the present invention, there is provided a steering system for a vehicle including: an electric power steering device which includes a steering unit of front wheels having an electric motor configured to generate an auxiliary torque in accordance with at least a steering torque, and is configured to transmit the auxiliary torque to the steering unit; a toe angle changer for a left rear wheel and a toe angle changer for a right rear wheel, which are capable of changing toe angles of the respective right and left rear wheels in accordance with at least a turning angle of the front wheels and a vehicle speed; and a steering controller configured to control the electric power steering device and the toe angle changer, wherein the steering system further includes at least one of a toe angle changer anomaly detection unit configured to detect an abnormal state of the toe angle changer, and an electric power steering device anomaly detection unit configured to detect an abnormal state of the electric power steering device, and when an abnormal state of the toe angle changer is detected, at least one of a target value of the auxiliary torque for assisting the electric power steering device and a viscosity in the electric power steering device is controlled, and when an abnormal state of the electric power steering device is detected, the toe angle changer is controlled.

In the above-mentioned steering system, it is preferable that each of the toe angle changers includes the toe angle changer anomaly detection unit, and the steering controller includes an auxiliary torque calculating unit configured to calculate the target value of the auxiliary torque; a yaw rate detection unit for detecting a yaw rate of the vehicle; a yaw rate gain calculating unit configured to calculate a yaw rate gain in the abnormal state of the toe angle changer; a yaw rate feedback torque correction value calculating unit configured to calculate a yaw rate feedback torque correction value in the abnormal state of the toe angle changer based on the yaw rate, the vehicle speed and the yaw rate gain in the abnormal state; and a target value correction unit configured to correct the target value of the auxiliary torque using the yaw rate feedback torque correction value.

In the above-mentioned steering system, it is preferable that each of the toe angle changers includes the toe angle changer anomaly detection unit, the steering controller includes an auxiliary torque calculating unit configured to calculate the target value of the auxiliary torque, and the steering controller reduces the calculated target value of the auxiliary torque when the steering controller receives an anomaly detection signal from the toe angle changer anomaly detection unit.

In the above-mentioned steering system, it is preferable that each of the toe angle changers includes the toe angle changer anomaly detection unit, and the steering controller sets the auxiliary torque to 0 when the steering controller receives an anomaly detection signal from the toe angle changer anomaly detection unit.

In the above-mentioned steering system, it is preferable that each of the toe angle changers includes a toe angle detection unit for detecting the toe angle of the corresponding rear wheel and the toe angle changer anomaly detection unit, the steering controller includes a damping control part configured to calculate a compensation value for increasing or reducing the viscosity in the electric power steering device, and when the toe angle changer anomaly detection unit detects an abnormal state, in the case where the left and right rear wheels are toed in, the compensation value is made smaller to reduce the viscosity, and in the case where the left and right rear wheels are toed out, the compensation value is made larger to increase the viscosity.

In the above-mentioned steering system, it is preferable that each of the toe angle changers includes a toe angle detection units for detecting the toe angle of the corresponding rear wheel and the toe angle changer anomaly detection unit, the steering controller includes an auxiliary torque calculating unit configured to calculate the target value of the auxiliary torque as an assist amount for the electric power steering device, and when the toe angle changer anomaly detection unit detects an abnormal state, in the case where the left and right rear wheels are toed in, the target value of the auxiliary torque is made larger to make the assist amount for the electric power steering device larger, and in the case where the left and right rear wheels are toed out, the target value of the auxiliary torque is made smaller to make the assist amount for the electric power steering device smaller.

In the above-mentioned steering system, it is preferable that each of the toe angle changers includes a toe angle detection units for detecting the toe angle of the corresponding rear wheel and the steering controller includes an auxiliary torque calculating unit configured to calculate the target value of the auxiliary torque, and the electric power steering device anomaly detection unit, and when the electric power steering device anomaly detection unit detects an abnormal state, the toe angle changers are controlled in a manner that at least toe-out control for allowing the rear wheels to be toed out is not performed.

BRIEF DESCRIPTION OF THE DRAWINGS

The various aspects, other advantages and further features of the present invention will become more apparent by describing in detail illustrative, non-limiting embodiments thereof with reference to the accompanying drawings.

FIG. 9 is a block configuration diagram showing a control function of a toe angle change control ECU of a toe angle changer.

FIG. 30 show a comparison in yaw rate response property in a turning motion between a standard vehicle model according to the first modified version of the fifth embodiment and a conventional vehicle, in which.

DETAILED DESCRIPTION OF THE EXEMPLARY EMBODIMENTS

Embodiments of the present invention will be described in detail below with reference to the accompanying drawings.

First Embodiment

1. Configuration of Steering System

Figure 1:
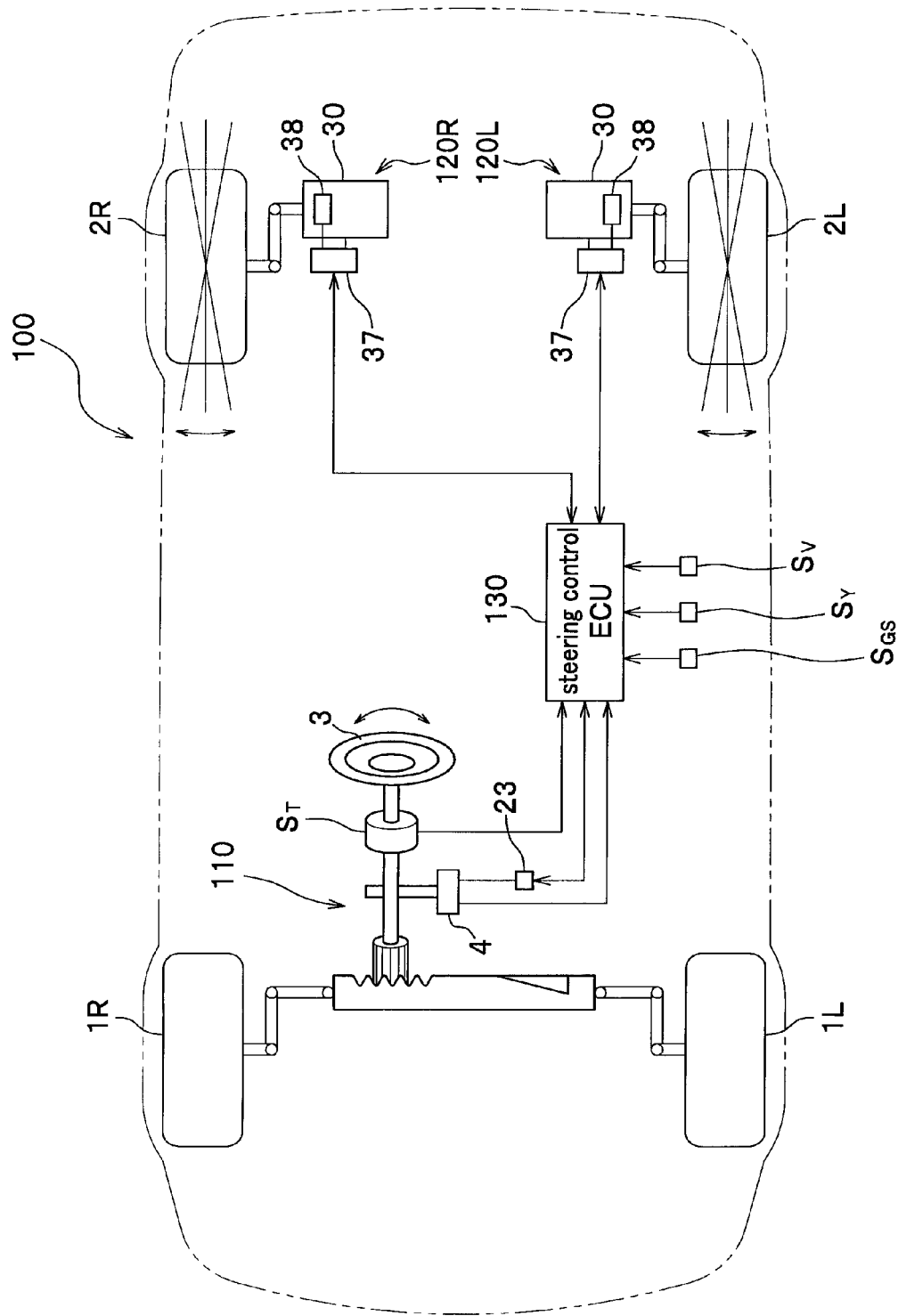
FIG. 1 is a schematic diagram of a four-wheel vehicle having a steering system according to a first embodiment of the present invention.

As shown in FIG. 1, a steering system 100 includes an electric power steering device 110 having an electric motor 4, which is configured to assist steering of front wheels 1L, 1R by a steering wheel 3; toe angle changers 120L, 120R configured to independently change respective toe angles of rear wheels 2L, 2R by respective actuators 30, in accordance with a turning angle of the front wheels 1L, 1R by the electric power steering device 110 and a vehicle speed; a steering controller (hereinbelow, referred to as "steering control ECU (Electronic Control Unit)") 130 configured to control the electric power steering device 110 and the toe angle changers 120L, 120R; and various sensors, including a vehicle speed sensor $S_V$, a yaw rate sensor $S_Y$ (yaw rate detection unit) and a lateral acceleration sensor $S_{GS}$.

2. Configuration of Electric Power Steering Device

Figure 2:
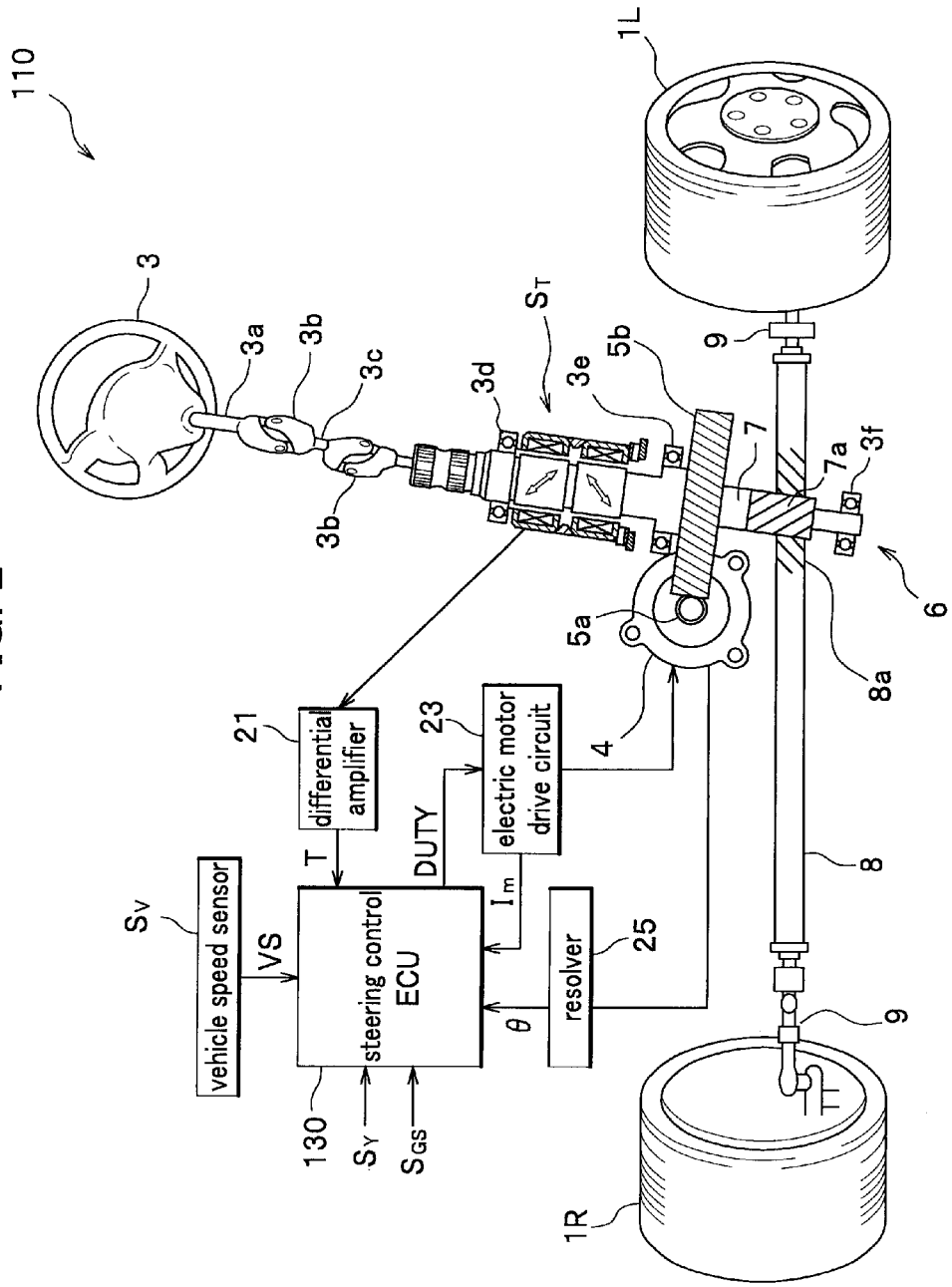
FIG. 2 is a diagram of an electric power steering device in the steering system.

The electric power steering device 110 includes, as shown in FIG. 2, the steering wheel 3, a main steering shaft 3a attached thereto, a shaft 3c and a pinion shaft 7, which shafts are connected through two universal joints 3b. The pinion shaft 7 has a pinion gear 7a provided on a lower end of the pinion shaft 7, which engages with rack teeth 8a of a rack shaft 8 which can reciprocate in a vehicle width direction. To respective ends of the rack shaft 8, the left front wheel 1L and the right front wheel 1R are connected through tie rods 9, 9. With this configuration, the electric power steering device 110 can change traveling direction of the vehicle by the operation of the steering wheel 3. Herein, the rack shaft 8, the rack teeth 8a and the tie rods 9, 9 constitute a steering wheel turn mechanism.

It should be noted that the pinion shaft 7 is supported by a steering gear box 6: an upper portion, a middle portion and a lower portion of the pinion shaft 7 are supported through bearings 3d, 3e and 3f, respectively.

The electric power steering device 110 also has the electric motor 4 for supplying an auxiliary steering effort (auxiliary torque) to reduce a steering effort (steering torque) required at the steering wheel 3. The electric motor 4 has an output shaft with a worm gear 5a which engages with a worm wheel gear 5b provided on the pinion shaft 7.

In other words, the worm gear 5a and the worm wheel gear 5b constitute a deceleration mechanism. In addition, a rotor (not shown) of the electric motor 4, and the components connected to the electric motor 4, such as the worm gear 5a, the worm wheel gear 5b, the pinion shaft 7, the rack shaft 8, the rack teeth 8a and the tie rods 9, 9, constitute a steering unit.

The electric motor 4 is a three-phase brushless motor formed of a stator (not shown) with a plurality of field coils as well as the rotor which rotates in the stator, for converting electric energy to kinetic energy ($P_M = \omega T_M$).

Herein, $\omega$ represents a rotational angular velocity (hereinbelow, also simply referred to as "angular velocity") of the electric motor 4, and $T_M$ represents a torque generated at the electric motor 4. In addition, a relationship between the generated torque $T_M$ and an output torque $T_M^*$ actually obtained as an output can be represented by the following formula (1):

$$T_M^* = T_M - (C_m d\theta_m/dt + J_m d^2\theta_m/dt^2)i^2 \quad (1)$$

where i represents a reduction gear ratio of the worm gear 5a to the worm wheel gear 5b; $\theta_m$ represents the rotation angle of the electric motor; and $J_m$ and $C_m$ represent the inertia moment and the viscosity coefficient, respectively, of the rotor of the electric motor 4.

As is apparent from the formula (1), the relationship between $T_M^*$ and $\theta_m$ can be expressed with $J_m$ and $C_m$ of the rotor of the electric motor 4, which means the relationship is independent of the vehicle properties or the vehicle state.

Herein a steering torque applied to the steering wheel 3 is represented as $T_S$, and a coefficient of an assist amount $A_H$ by the torque (auxiliary torque) generated at the electric motor 4, which has been powered through the deceleration mechanism, is represented as, for example, $k_A(V)$, which varies as a function of the vehicle speed V. Since the formula $A_H = k_A(V) \times T_S$ is established in this case, a pinion torque $T_P$, which is a road load, can be represented by the following formula (2):

$$T_P = T_S + A_H \quad (2)$$
$$= T_S + k_A(V) \times T_S$$

From this formula, the steering torque $T_S$ can be represented by the following formula (3).

$$T_S = T_P/(1 + k_A(V)) \quad (3)$$

Therefore, the steering torque $T_S$ is reduced to $1/(1+k_A(V))$ of the pinion torque $T_P$ (load). For example, if $k_A(0)=2$ with the vehicle speed V=0 km/h, the steering torque $T_S$ is controlled to one third of the pinion torque $T_P$, and if $k_A(100)=0$ with the vehicle speed V=100 km/h, the steering torque $T_S$ is controlled to be equal to the pinion torque $T_P$, which provides a responsive feeling from a steady steering torque, similar to those obtained in the manual steering. In other words, by controlling the steering torque $T_S$ in accordance with the vehicle speed V, the responsive feeling from the steering torque becomes light when the vehicle runs at a lower speed, and steady and stable when the vehicle runs at a higher speed.

In general, the steering torque $T_S$ is known to be represented by the following formula (4):

$$T_S = J \cdot d^2\theta_S/dt^2 + C \cdot d\theta_S/dt + K(\theta_S - \theta_F) \quad (4)$$

where $\theta_S$ represents a steering rotation angle; $\theta_F$ represents a value obtained by dividing an electric motor rotation angle $\theta_m$ by a rotation ratio $n_M$ of the deceleration mechanism; J represents an inertia coefficient (inertia) of a steering unit; C represents a viscosity coefficient (damper) of the steering unit; and K represents a base signal coefficient. Like in the formula (1), the relationship shown by the above formula is independent of the vehicle properties or the vehicle state.

Upon evaluating the steering feeling, attention is paid upon a difference in the steering reaction force due to the presence or absence of the inertia moment, and the inertia moment can be evaluated with a ratio Ev of an input torque to a reaction force torque (inertia torque) taken as a performance function. Based on the evaluation result using this performance function, it was found that there is a zone with a high steering feeling evaluation near a point Ev0, where the inertia coefficient J in the steering unit and the viscosity around the steering unit are neglected.

Herein, the ratio Ev is represented by the following formula:

$$Ev = T_{det}/T_S = K(\theta_S - \theta_F)/T_S \quad (5)$$

With this formula, a compensator H(S) can be obtained which imparts the gain property of the transfer function from $T_S$ to $T_{det} = K(\theta_S - \theta_F)$ retained to Ev0 or less.

Since the compensator obtained by the H∞ control is determined by a subject model and an order (degree) of the frequency weighing function, the compensator will be with a higher order which is difficult to obtain with regular microcomputer. Therefore, the order of the compensator is reduced here by focusing on the frequency band required for controlling the steering unit.

For example, the transfer function Hf(S) can be set to the following formula so as to have four zeros and four poles:

$$Hf(S) = 8.88(S+140)(S+65.1)(S+30.1)(S+1.77)/\{(S+1730)(S+209)(S+37.1)(S+15.6)\}$$

It should be noted that the gain property of the transfer function Hf(S) has a differentiation property.

In addition, the electric power steering device 110 also includes an electric motor drive circuit 23 configured to drive the electric motor 4; a resolver 25; a torque sensor $S_T$ configured to detect (measure) a pinion torque $T_P$ applied to the pinion shaft 7; a differential amplifier 21 configured to amplify the output from the torque sensor $S_T$; and the vehicle speed sensor $S_V$ configured to detect (measure) a vehicle speed.

Figure 5:
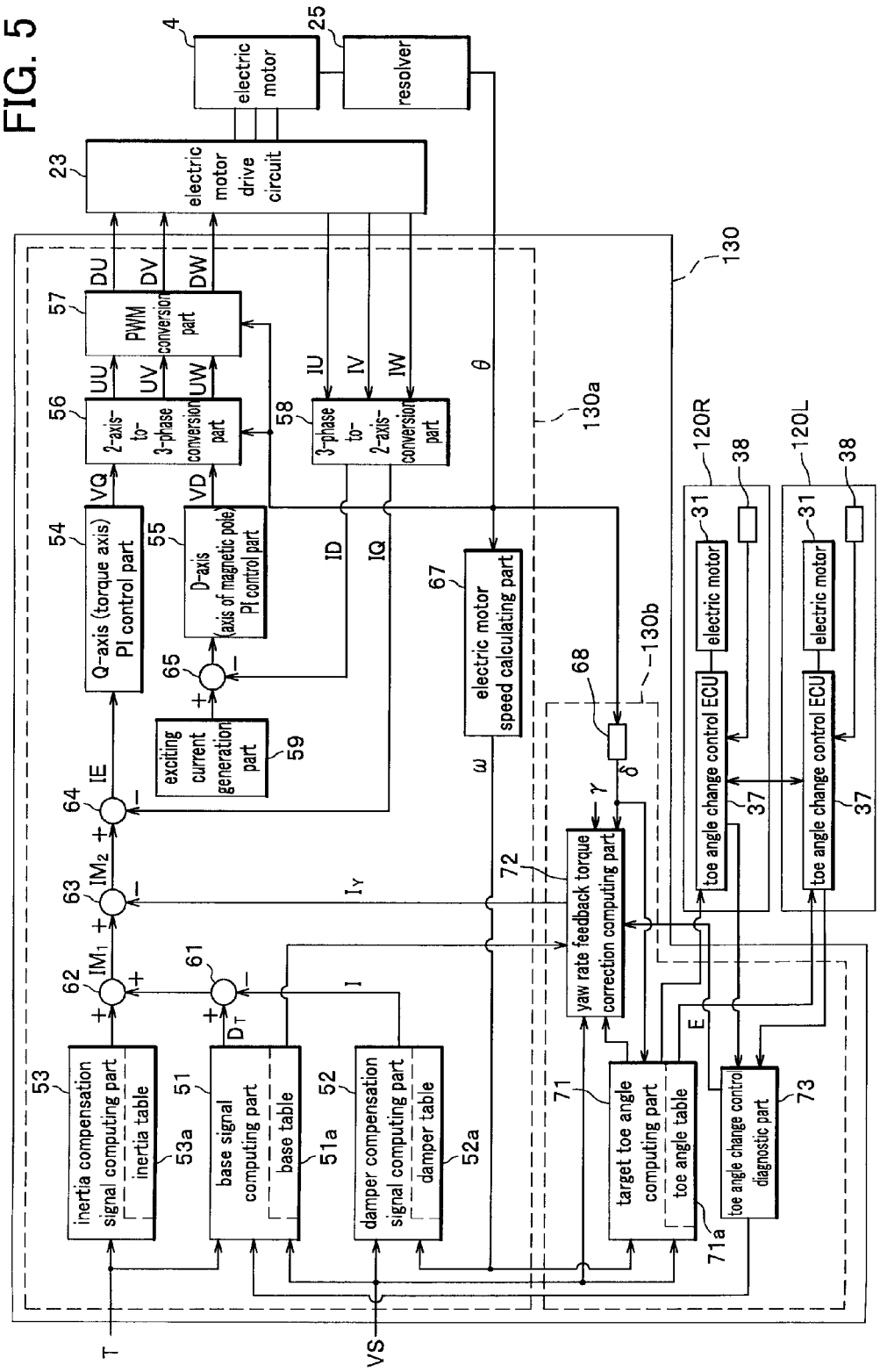
FIG. 5 is a schematic diagram of a control function of a steering control ECU and toe angle changers in the steering system according to the first embodiment.

As shown in FIG. 5, the steering control ECU 130 of the steering system 100 has an electric power steering control part 130a (which will be described later) as a functional part of the electric power steering device 110, which controls the driving of the electric motor 4, as well as a rear wheel toe angle control part 130b.

The electric motor drive circuit 23 has switching elements, such as three-phase FET bridge circuit, and is configured to generate a square-wave voltage based on duty signals (DU, DV, DW) from the electric power steering control part 130a (see FIG. 5), to thereby drive the electric motor 4.

The electric motor drive circuit 23 also has a function to detect (measure) a three-phase electric motor current $I_m$ (IU, IV, IW) using a Hall element (not shown).

The resolver 25 is configured to detect (measure) a rotation angle $\theta_m$ of the electric motor 4 and to output an angular signal $\theta$, and examples include a sensor for detecting a change in magnetoresistance which is positioned in the vicinity of a magnetic rotor having a plurality of recess portions and projection portions arranged evenly along a circumference of the rotor.

The torque sensor $S_T$ is configured to detect (measure) the pinion torque $T_P$ applied to the pinion shaft 7. The torque sensor $S_T$ is formed of magnetostrictive films adhered to the pinion shaft 7 at two different positions along an axis thereof so as to exhibit opposite anisotropies, and detection coils are arranged with a gap from the pinion shaft 7 along the surface (outer circumference) of the respective magnetostrictive films.

The differential amplifier 21 is configured to amplify a difference in permeability change between two magnetostrictive films detected as an inductance change by the detection coil, and to output a torque signal T.

The vehicle speed sensor $S_V$ is configured to detect (measure) the vehicle speed V as a pulse number per unit time, and to output a vehicle speed signal VS.

The functional configuration of the steering control ECU 130 will be described later, together with the control by the electric power steering device 110 and the control by the toe angle changers 120L, 120R.

3. Configuration of Toe Angle Changer

Next, a configuration of the toe angle changer will be described with reference to FIGS. 3 and 4.

Figure 3:
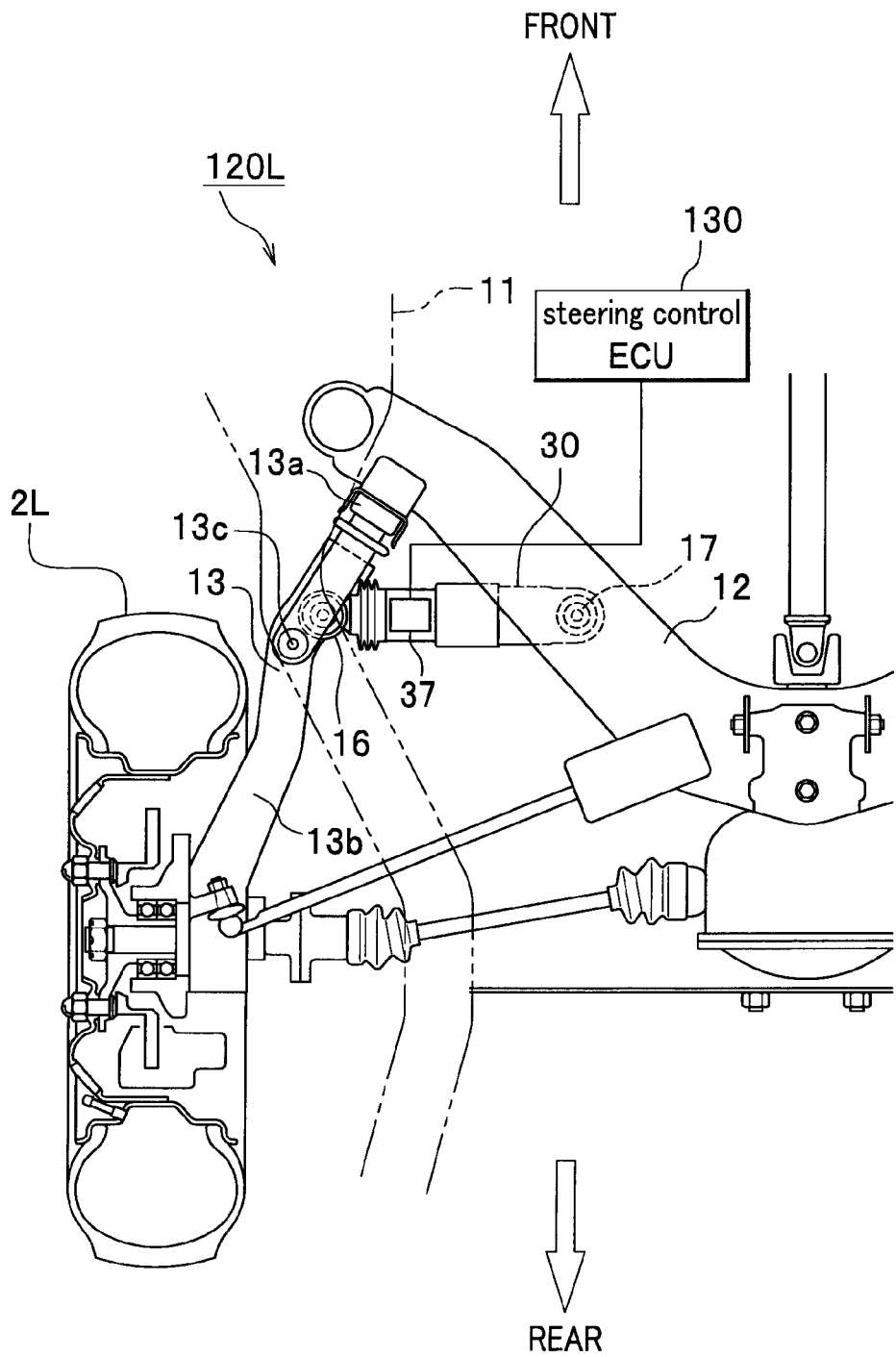
FIG. 3 is a schematic plan view of a toe angle changer on a left rear wheel side in the steering system.

FIG. 3 is a schematic plan view of a toe angle changer on a left rear wheel side. FIG. 4 is a schematic cross sectional view showing a structure of an actuator of a toe angle changer.

The toe angle changers 120L, 120R are installed to the left rear wheel 2L and the right rear wheel 2R of the vehicle, respectively. The toe angle changer 120L is taken as an example, and the left rear wheel 2L is shown in FIG. 3. The toe angle changer 120L includes the actuator 30 and a toe angle change controller (hereinbelow, referred to as "toe angle change control ECU") 37.

It should be noted that FIG. 3 shows only the left rear wheel 2L, but the components are arranged in the same manner (symmetrically) on the right rear wheel 2R.

The cross member 12 extends substantially in the vehicle width direction, and end portions (in terms of the vehicle width direction) thereof are elastically supported by a rear side frame 11 of the vehicle body. A trailing arm 13 extends substantially in the front-rear direction of the vehicle body, and a front end portion thereof is supported by a portion near the terminal (in terms of the vehicle width direction) of the cross member 12. The rear wheel 2L is fixed to a rear end portion of the trailing arm 13.

The trailing arm 13 is formed of a vehicle body-side arm 13a attached to the cross member 12, and a wheel-side arm 13b fixed to the rear wheel 2L, which are connected to each other through a nearly vertical rotation axis 13c. With this configuration, the trailing arm 13 is displaceable in the vehicle width direction.

With respect to the actuator 30, one end portion is attached through a ball joint 16 to a front end portion of the wheel-side arm 13b relative to the rotation axis 13c, and the other end (base end) portion of the actuator 30 is fixed to the cross member 12 through a ball joint 17.

Figure 4:
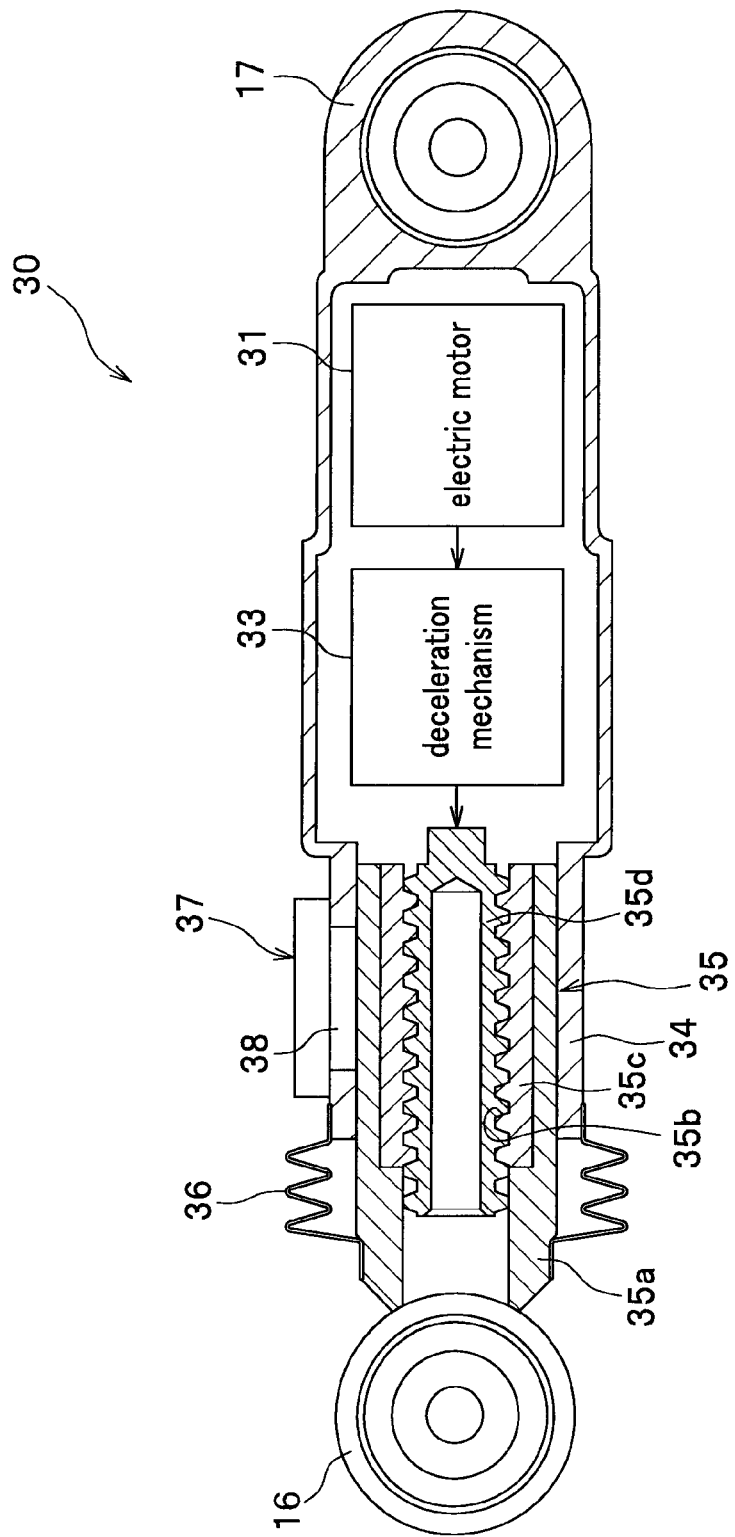
FIG. 4 is a schematic cross sectional view showing a structure of an actuator of a toe angle changer.

As shown in FIG. 4, the actuator 30 includes an electric motor 31, a deceleration mechanism 33, a feed screw portion 35 and the like.

The electric motor 31 may be a brush motor, a brushless motor or the like, which can rotate in both forward and reverse directions.

The feed screw portion 35 includes: a rod 35a in a shape of a cylinder; a nut 35c in a shape of a cylinder which has an internal thread 35b formed in an inner periphery thereof and is inserted in the rod 35a; and a screw shaft 35d which engages with the internal thread 35b and supports the rod 35a in such a manner that the rod 35a is movable in an axial direction.

The feed screw portion 35, the deceleration mechanism 33 and the electric motor 31 are encased in a case body 34 in an elongated cylindrical shape. To a portion of the case body 34 on a feed screw portion 35 side, a boot 36 is attached so as to cover both an end portion of the case body 34 and an end portion of the rod 35a, in order to prevent dust or foreign matter from attaching to an outer periphery of the rod 35a exposed from the end portion of the case body 34, and to prevent dust, foreign matter or water from entering the case body 34.

One end portion of the deceleration mechanism 33 is connected to an output shaft of the electric motor 31, and the other end portion is connected to the screw shaft 35d.

When the power of the electric motor 31 is transmitted through the deceleration mechanism 33 to the screw shaft 35d to rotate the screw shaft 35d, the rod 35a shifts in a right-left direction in the drawing (axial direction) relative to the case body 34, and thus the actuator 30 contracts or expands. Due to the frictional force caused by engagement of the screw shaft 35d and the internal thread 35b of the nut 35c, a toe angle of the rear wheel is maintained constant, even when the electric motor 31 is not energized and not driven.

The actuator 30 also includes a stroke sensor 38 configured to detect (measure) the position of the rod 35a (i.e., amount of expansion/contraction). In the stroke sensor 38, a magnet or the like is embedded so as to detect (measure) the location of the rod 35a by utilizing magnetism. In this manner, by detecting the position of the rod 35a using the stroke sensor 38, the steering angles (toe angle) of toe-in or toe-out of the rear wheels 2L, 2R are separately detected with high accuracy.

With the actuator 30 having the configuration as described above, the ball joint 16 provided on an end portion of the rod 35a is rotatably connected to the wheel-side arm 13b of the trailing arm 13 (see FIG. 3), and the ball joint 17 provided on the base end of the case body 34 (right-hand end in FIG. 4) is rotatably connected to the cross member 12 (see FIG. 3). When the power of the electric motor 31 rotates the screw shaft 35d and the rod 35a shifts leftward (in FIG. 4) (i.e., the actuator 30 expands), the wheel-side arm 13b is pushed outward in the vehicle width direction (left direction in FIG. 3) to thereby leftward turn the rear wheel 2L. On the other hand, when the rod 35a shift rightward (in FIG. 4) (i.e. the actuator 30 contracts), the wheel-side arm 13b is pulled inward in the vehicle width direction (right direction in FIG. 3) to thereby rightward turn the rear wheel 2L.

It should be noted that the position to which the ball joint 16 of the actuator 30 is attached is not limited to the wheel-side arm 13b and the actuator 30 can be attached to any position, such as on a knuckle arm, as long as the toe angle of the rear wheel 2L can be changed. In addition, in the present embodiment, the toe angle changers 120L, 120R are applied to an independent suspension system with semi-trailing arms. However, the present invention is not limited to this type of suspension system, and may be applied to other types of suspension system.

For example, the actuator 30 may be introduced to a side rod of a double wishbone type suspension, or a side rod of a strut type suspension.

In addition, the toe angle change control ECU 37 is unified with the actuator 30. The toe angle change control ECU 37 is fixed to the case body 34 of the actuator 30, and connected to the stroke sensor 38 through connectors or the like. Between two toe angle change control ECUs 37, 37, and between the toe angle change control ECU 37 and the steering control ECU 130, there are provided signal circuits connecting them to each other.

To the toe angle change control ECU 37, power is supplied from a power source (not shown), such as a battery, mounted on a vehicle. Also to the steering control ECU 130 and the electric motor drive circuit 23, power is supplied from a power source (not shown), such as battery, which is an independent system of that of the toe angle change control ECU 37.

4. Functional Configuration of Steering Control ECU

Next, functions of the steering control ECU will be described with reference to FIGS. 5, 6A, 6B, 7, 8A and 8B.

Figure 6A:
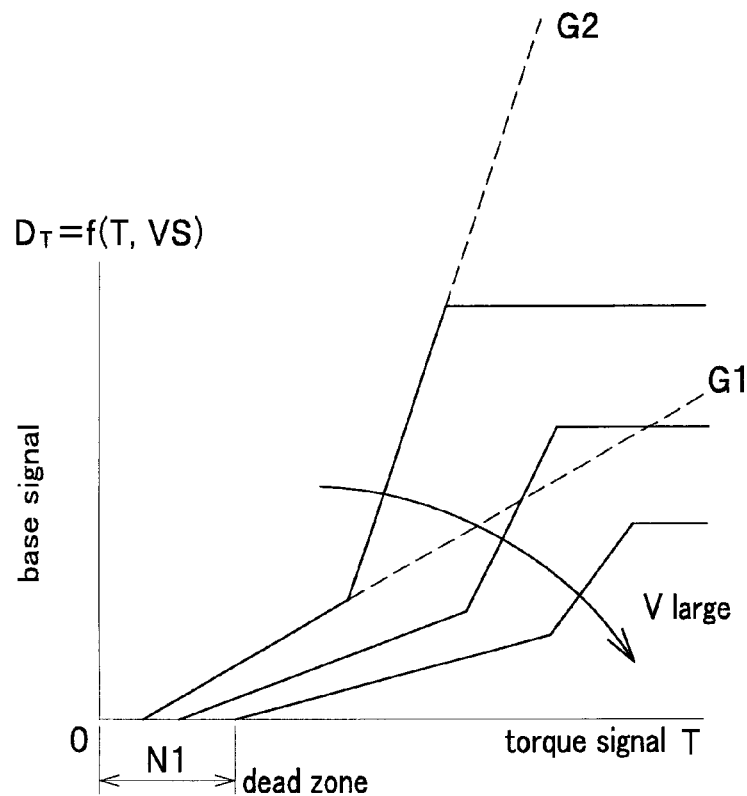
FIG. 6A is a graph showing a function of base signal stored in a base table.
Figure 6B:
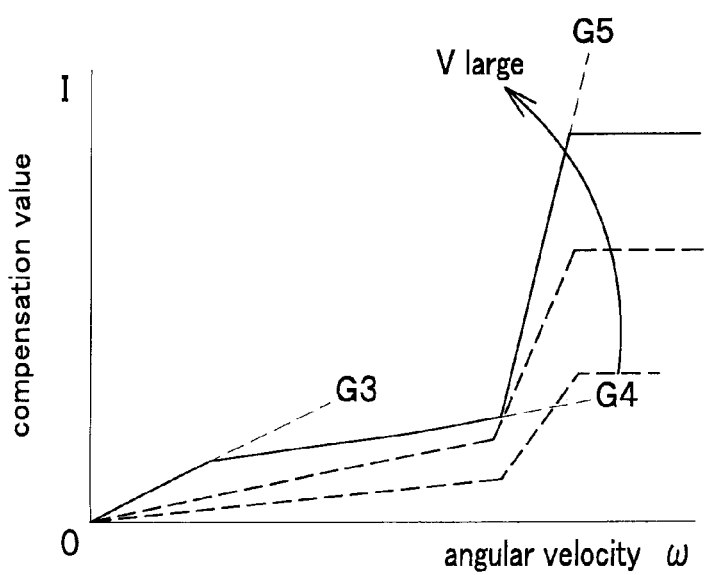
FIG. 6B is a graph showing a characteristic function of a damper table.
Figure 7:
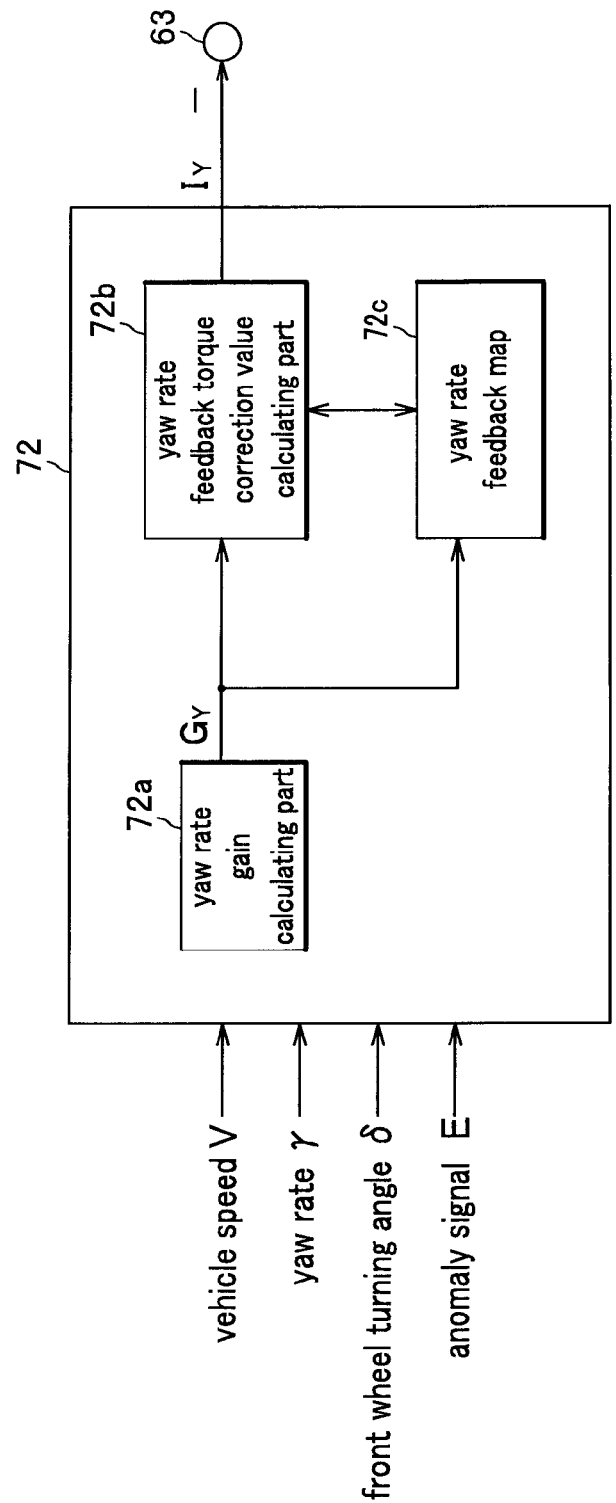
FIG. 7 is a block configuration diagram showing detailed functions of a yaw rate feedback torque correction computing part.
Figure 8A:
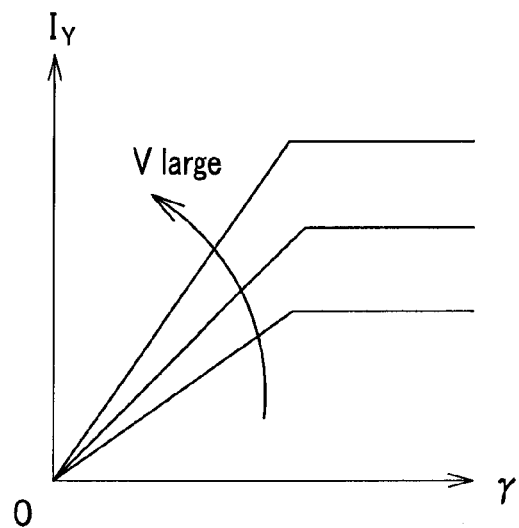
FIGS. 8A and 8B show characteristics of the yaw rate feedback torque correction computing part.
Figure 8B:
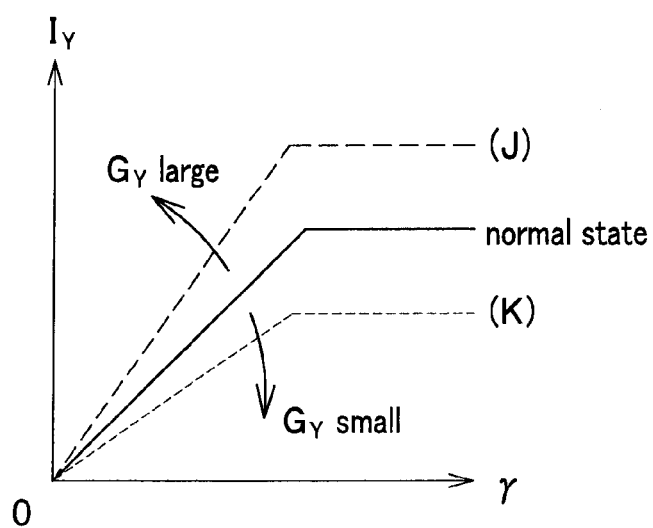

FIG. 5 is a schematic diagram of a control function of a steering control ECU and toe angle changers in the steering system, FIG. 6A is a graph showing a function of base signal stored in a base table, FIG. 6B is a graph showing a characteristic function of a damper table, FIG. 7 is a block configuration diagram showing detailed functions of a yaw rate feedback torque correction computing part shown in FIG. 5, and FIGS. 8A and 8B show characteristics of the yaw rate feedback torque correction computing part.

The steering control ECU 130 includes a microcomputer with components, such as CPU (Central Processing Unit), ROM (Read Only Memory), RAM (Random Access Memory) (all not shown), programs and peripheral circuits and the like, and performs a function depicted in the control function diagram of FIG. 5.

As shown in FIG. 5, the steering control ECU 130 includes: the electric power steering control part 130a configured to control the electric power steering device 110; and a rear wheel toe angle control part 130b configured to compute (control) toe angles of the rear wheel 2L, 2R. The steering control ECU 130 is connected to the electric motor drive circuit 23 of the electric power steering device 110 (see FIG. 2), the left toe angle changer 120L and the right toe angle changer 120R and configured to control these components. The steering control ECU 130 is also connected to various sensors and configured to receive variety of information from the sensors.

(Electric Power Steering Control Part)

First, the electric power steering control part 130a will be described with reference to FIGS. 5, 6A and 6B (and FIG. 2 where appropriate).

The electric power steering control part 130a includes: a base signal computing part (auxiliary torque calculating unit) 51; a damper compensation signal computing part (auxiliary torque calculating unit) 52; an inertia compensation signal computing part (auxiliary torque calculating unit) 53; a Q-axis (torque axis) PI control part 54; a D-axis (axis of magnetic pole) PI control part 55; a 2-axis-to-3-phase conversion part 56; a PWM conversion part 57; a 3-phase-to-2-axis conversion part 58; an electric motor speed calculating part 67; and an exciting current generation part 59.

The 3-phase-to-2-axis conversion part 58 converts a three-phase current IU, IV, IW of the electric motor 4 detected by the electric motor drive circuit 23 into a two-axis current, including a D-axis which is an axis of magnetic pole of the rotor of the electric motor 4, and a Q-axis which is obtained by electrically rotating the D-axis by 90 degrees. A Q-axis current IQ is proportional to the torque $T_M$ generated at the electric motor 4, and a D-axis current ID is proportional to an exciting current. The electric motor speed calculating part 67 introduces a differential operator to an angular signal θ of the electric motor 4, to thereby generate an angular velocity signal ω. The exciting current generation part 59 generates a target signal for the exciting current of the electric motor 4, and if desired, field-weakening control can be performed by making the D-axis current substantially equal to the Q-axis current.

Based on the torque signal T and the vehicle speed signal VS, the base signal computing part 51 generates a base signal $D_T$ to be used as a standard reference for a target signal $IM_1$ of the output torque $T_M{}^*$. The signal is generated from a base table 51a with reference to the torque signal T and the vehicle speed signal VS, which table had been prepared by experimental measurement or the like. FIG. 6A is a graph showing a function of the base signal $D_T$, stored in the base table 51a. In the base signal computing part 51, a dead zone N1 is provided where the base signal $D_T$ is set to zero when the value of the torque signal T is small, and the base signal $D_T$ linearly increases along a gain G1 when the value of the torque signal T is larger than the value in the dead zone N1.

The base signal computing part 51 increases the output along a gain G2 at specific torque values, and when the torque value further increases, the output is made saturated.

In addition, a vehicle body in general has various road loads (road reactions) depending on the running speed thereof. Accordingly, the gain is adjusted based on the vehicle speed signal VS. The load is heaviest during a static steering (vehicle speed=0), and the load is relatively small at medium and low speeds. Therefore, when the vehicle speed V becomes higher, the base signal computing part 51 provides the driver with road information with a larger manual steering zone, by making the gains (G1, G2) smaller and the dead zone N1 larger. In other words, in accordance with the increase of the vehicle speed V, a steady responsive feeling is provided from the steering torque $T_S$. In this case, it is necessary that the inertia compensation be made also in the manual steering zone.

Referring to FIG. 5, the damper compensation signal computing part 52 is introduced for compensating a viscosity in the steering unit, and for providing a steering damper function for compensating convergence of steering wheel position when convergence decreases during high-speed driving, by reading a damper table 52a with reference to the angular velocity signal ω.

FIG. 6B is a graph showing a characteristic function of the damper table 52a, in which the line is formed of a several linear sections and a compensation value I as a whole increases as the rotational angular velocity ω of the electric motor 4 (see FIG. 2) increases. The graph is also characterized in that the compensation value I rapidly increases when the rotational angular velocity ω is in a specific range. Moreover, as the vehicle speed signal VS becomes high, i.e. the vehicle speed V becomes high, the rotational angular velocity ω of the electric motor 4, i.e., the output torque $T_M{}^*$ of the electric motor 4 in accordance with the speed of the steering wheel turn, is reduced by increasing the gains (G3, G5). To put it another way, when the steering wheel 3 is turned away from the home position, a current to the electric motor 4 is reduced; when the steering wheel 3 is returned to resume the home position, a large current is supplied to the electric motor 4. For example, when the steering wheel 3 is further turned away and the rotational angular velocity ω becomes high, the rotational angular velocity ω cannot be immediately reduced because of the inertia in the electric motor 4. In order to prevent this phenomenon, the damper compensation signal computing part 52 increases the current supply to the electric motor 4, to thereby perform an inhibitory control of the rotational angular velocity ω when the steering wheel 3 is resuming the home position. Because of this steering damper effect, convergence of the steering wheel 3 is improved, to thereby stabilize the vehicle properties.

Referring to FIG. 5, an adder 61 is configured to subtract the output signal (compensation value I) of the damper compensation signal computing part 52 from the output signal $D_T$ of the base signal computing part 51, and an adder 62 is configured to add the output signal from the adder 61 and the output signal from the inertia compensation signal computing part 53 and to output the output signal $IM_1$.

It should be noted that an assist control is performed by a combination of the base signal computing part 51, the damper compensation signal computing part 52 and the adder 61.

The inertia compensation signal computing part 53 is configured to compensate an effect caused by the inertia in the steering unit, in which the torque signal T is computed from an inertia table 53a. A transfer function Hf(S) in the stored table is, for example, represented by the following formula:

$$Hf(S)=8.88(S+140)(S+65.1)(S+30.1)(S+1.77)/\{(S+1730)(S+209)(S+37.1)(S+15.6)\}$$

In addition, the inertia compensation signal computing part 53 compensates the lowering of the response caused by the inertia of the rotor of the electric motor 4. To put it another way, when the rotation direction of the electric motor 4 is made to be switched from forward to reverse or vice versa, it is difficult to immediately switch the direction since the inertia tends to maintain the rotational state. Accordingly, the inertia compensation signal computing part 53 controls the timing of switching the rotation direction of the electric motor 4, so as to synchronize the timing of switching the rotation direction of the electric motor 4 with that of the steering wheel 3. In this manner, the inertia compensation signal computing part 53 reduces a response lag in the steering, which may otherwise be caused by inertia, viscosity or the like in the steering unit, to thereby give an excellent steering feeling.

Further, the inertia compensation signal computing part 53 can practically impart satisfactory steering feeling relative to various steering properties which varies depending on vehicle characteristics, such as those specifically different among FF (Front engine Front wheel drive) vehicle, FR (Front engine Rear wheel drive) vehicle, RV (Recreation Vehicle) and sedan (or saloon) car, and vehicle states, such as vehicle speed, as well as road conditions.

The output signal $IM_1$ of the adder 62 is a target signal for the Q-axis current which defines the torque of the electric motor 4 (see FIG. 2).

An adder 63 (target value correction unit) is configured to subtract, from the output signal $IM_1$, a yaw rate feedback torque correction value $I_Y$ (which may be, hereinbelow, simply referred to as "correction value $I_Y$") output from a yaw rate feedback torque correction computing part 72, which is calculated based on the yaw rate γ and the vehicle speed V, as well as a yaw rate gain set by the present turning angle of front wheel (which is also referred to as "tire angle") δ, the yaw rate γ or the like, and to send an output signal $IM_2$ to an adder 64.

The details of the yaw rate feedback torque correction computing part 72 will be described later.

The adder 64 is configured to subtract the Q-axis current IQ from the output signal $IM_2$, and to generate a deviation signal IE. The Q-axis (torque axis) PI control part 54 is configured to perform a P (proportional) control and an I (integral) control so as to reduce the deviation signal IE.

An adder 65 is configured to subtract the D-axis current ID from the output signal of the exciting current generation part 59. The D-axis (axis of magnetic pole) PI control part 55 is configured to perform a PI feedback control so as to reduce the output signal from the adder 65.

The 2-axis-to-3-phase conversion part 56 is configured to convert two-axis signal including an output signal VQ from the Q-axis (torque axis) PI control part 54 and an output signal VD from the D-axis (axis of magnetic pole) PI control part 55 into three-phase signal UU, UV, UW. The PWM conversion part 57 is configured to generate duty signals (DU, DV, DW), which is an ON/OFF signal [PWM (Pulse Width Modulation) signal] having pulse widths proportional to the magnitude of the three-phase signal UU, UV, UW.

It should be noted that the angular signal θ of the electric motor 4 (see FIG. 2) is input to the 2-axis-to-3-phase conversion part 56 and the PWM conversion part 57, and a signal corresponding to the magnetic pole position of the rotor is output.

(Rear Wheel Toe Angle Control Part)

Next, the rear wheel toe angle control part 130b will be described with reference to FIGS. 5, 7, 8A and 8B. As shown in FIG. 5, the rear wheel toe angle control part 130b includes a front wheel turning angle computing part 68, a target toe angle computing part 71, the yaw rate feedback torque correction computing part 72 and a toe angle change control diagnostic part 73.

The front wheel turning angle computing part 68 is configured to calculate a turning angle δ of the front wheels 1L, 1R based on the angular signal θ output from the resolver 25, and to input the result to the target toe angle computing part 71 and the yaw rate feedback torque correction computing part 72.

The target toe angle computing part 71 is configured to generate target values of toe angles for the rear wheels 2L, 2R, respectively, based on the vehicle speed signal VS, a turning angle δ of the front wheels 1L, 1R, and the rotational angular velocity ω of the electric motor 4 which is proportional to the turning angular velocity of the front wheels 1L, 1R. The target values are generated from a rear wheel toe angle table 71a, with reference to the turning angle δ, the vehicle speed signal VS, and the rotational angular velocity ω, which table had been prepared for each of the left rear wheel 2L and the right rear wheel 2R in advance.

When the vehicle speed V is in a specific low-speed range, each of the target values for the toe angle of the rear wheels is generated in such a manner that the rear wheels 2L, 2R are in antiphase relative to the front wheels, in accordance with the turning angle δ, to allow the vehicle to turn in a small radius.

In the high-speed range over the above-mentioned specific low-speed range, when an absolute value of the rotational angular velocity ω is a specific value or less, and at the same time, the turning angle δ is within a specific range (including right and left), each of the target values of the toe angles of the rear wheels 2L, 2R are set as the same phase relative to the front wheels, in accordance with the turning angle δ. In other words, each of the target values of the toe angles of the rear wheels 2L, 2R are set so as to make the slip angle β small during lane change.

However, in the high-speed range over the above-mentioned specific low-speed range, when the absolute value of the rotational angular velocity ω exceeds a specific value, or when the turning angle δ is too large to fall outside the specific range (including right and left), each of the target values of the toe angles of the rear wheels 2L, 2R is set to antiphase relative to the front wheels, in accordance with the turning angle δ. The target value of the toe angle generated in the target toe angle computing part 71 is input to the yaw rate feedback torque correction computing part 72 and the respective toe angle change control ECUs 37, 37 of the toe angle changers 120L, 120R.

It should be noted that, the target values of the toe angles generated in the target toe angle computing part 71 follow Ackerman-Jeantaud geometry.

The detailed configuration of the yaw rate feedback torque correction computing part 72 will be described with reference to FIG. 7. The yaw rate feedback torque correction computing part 72 has a yaw rate gain calculating part 72a, a yaw rate feedback torque correction value calculating part 72b and a yaw rate feedback map 72c.

The yaw rate gain calculating part 72a is configured to calculate a yaw rate gain $G_Y$ in the case where the toe angle changers 120R and/or 120L are in an abnormal state, based on the vehicle speed V, the yaw rate γ, the turning angle δ of the front wheels, and an anomaly signal E received from the toe angle change control diagnostic part 73, which will be described later. The calculation of the yaw rate gain $G_Y$ is initiated when the anomaly signal E is received and thus it is determined that the toe angle changers 120R and/or 120L are in an abnormal state, and the calculation is made based on the vehicle speed V, the yaw rate γ and the turning angle δ of the front wheels. In other words, in order to obtain a target yaw rate in an abnormal state, the yaw rate gain calculating part 72a calculates the yaw rate gain $G_Y$ from the relationship between the turning angle δ of the front wheels and the yaw rate γ, by altering the vehicle speed V as needed. The calculated yaw rate gain $G_Y$ is output to the yaw rate feedback torque correction value calculating part 72b, and used for calculating a correction value $I_Y$, which will be described later. The calculated yaw rate gain $G_Y$ is output also to the yaw rate feedback map 72c, and is used for generating and updating the map.

The yaw rate feedback torque correction value calculating part 72b is configured to calculate a yaw rate feedback torque correction value $I_Y$, which acts as a reaction force to the assisting force by the electric power steering device 110, based on the vehicle speed V, the yaw rate γ, the yaw rate gain $G_Y$ and the anomaly signal E. The calculation of the yaw rate feedback torque correction value $I_Y$ is initiated when the anomaly signal E is received and thus it is determined that the toe angle changers 120R and/or 120L are in an abnormal state, and the calculation is made based on the vehicle speed V, the yaw rate γ and the yaw rate gain $G_Y$. In other words, in order to correct, in accordance with an abnormal state, the torque of the electric motor 4 (see FIG. 2) defined by the output signal $IM_1$ (see FIG. 5), the yaw rate feedback torque correction value calculating part 72b calculates the yaw rate feedback torque correction value $I_Y$ by referring, relative to the yaw rate γ input, to the yaw rate feedback map 72c defined for each vehicle speed V. The calculated yaw rate feedback torque correction value $I_Y$ is output to the adder 63 as a correction current of the torque of the electric motor 4 (see FIG. 2).

The yaw rate feedback map 72c defines the relationship between the yaw rate γ and the yaw rate feedback torque correction value $I_Y$, by means of the yaw rate gain $G_Y$ and the vehicle speed V. FIGS. 8A and 8B show examples of the characteristics of the yaw rate feedback torque correction computing part 72 defining the relationship.

In FIG. 8A, in a specific range including the origin O, the yaw rate feedback torque correction value $I_Y$ linearly increases with a specific slope as the yaw rate γ increases in a normal direction. The yaw rate gain $G_Y$ is a value that defines the slope of the increase. It should be noted that the expression "normal direction" with respect to the yaw rate γ herein means that, when a turning vehicle is seen from the above, a direction of the speed of change in the rotation angle to the turning direction of the vehicle is the same as the direction of the change in the rotation angle, and thus the vehicle speed is in an increasing state.

When the yaw rate γ increases in the normal direction and exceeds a specific range, the yaw rate feedback torque correction value $I_Y$ is set so as to maintain a specific value without augmentation. With this setting, an excessive correction to the torque of the electric motor 4 (see FIG. 2) can be suppressed, and the assist control function by the power steering device 110 can be surely provided.

The slope of the line in FIG. 8A becomes larger as the vehicle speed V increases. In other words, the yaw rate feedback torque is set so as to become larger as the vehicle speed V increases. With this setting, when the vehicle runs at a higher speed, in order to enhance the running stability, the yaw rate feedback torque correction value $I_Y$ as a reaction force of the torque of the electric motor 4 (see FIG. 2) is made larger so as to make the assisting force by the power steering device 110 smaller, to thereby make the steering by the steering wheel 3 (see FIG. 1) heavier. On the other hand, when the vehicle runs at a low speed, in order to enhance the steering feeling of the steering wheel 3 (see FIG. 1), the correction value $I_Y$ is made smaller so as to make the assisting force by the power steering device 110 larger, to thereby make the steering by the steering wheel 3 (see FIG. 1) lighter.

In one condition of the vehicle speed V, when the yaw rate gain $G_Y$ in the case where the toe angle changers 120R and/or 120L are in an abnormal state becomes larger than the yaw rate gain $G_Y0$ in the case where the toe angle changers 120R, 120L are in a normal state (see FIG. 8B), the yaw rate feedback torque is made larger as indicated with (J) in FIG. 8B, to thereby enhance the running stability of the vehicle. On the other hand, when the yaw rate gain $G_Y$ in an abnormal state becomes smaller than the yaw rate gain $G_Y0$ in a normal state (see FIG. 8B), the yaw rate feedback torque is made smaller as indicated with (K) in FIG. 8B so as to make the steering effort lighter, to thereby enhance the operating property (handling comport).

Next, the toe angle change control diagnostic part 73 will be described. The toe angle change control diagnostic part 73 is configured, when receives an anomaly signal E from a self-diagnostic part 81d (which will be described later; see FIG. 9) of the toe angle change control ECU 37 in the toe angle changer 120R (or 120L), to determine that the toe angle changer 120R (or 120L) is in an abnormal state. In response to the determination, the toe angle change control diagnostic part 73 forwards the anomaly signal E to the yaw rate feedback torque correction computing part 72, and at the same time, commands the yaw rate feedback torque correction computing part 72 to perform corrective computation of the yaw rate feedback torque and to output a correction signal (correction value $I_Y$). In addition, the toe angle change control diagnostic part 73 sends the anomaly signal E to the base signal computing part 51, to thereby allow a base signal $D_T$ to be calculated in accordance with an abnormal state of the toe angle changers 120R (or 120L).

(Toe Angle Change Control ECU)

Next, the detailed configuration of the toe angle change control ECU will be described with reference to FIG. 9. FIG. 9 is a block configuration diagram showing a control function of a toe angle change control ECU of a toe angle changer.

As shown in FIG. 9, the toe angle change control ECU 37 has a function to drive control the electric motor 31 of the actuator 30, and is formed of a control part 81 and an electric motor drive circuit 83. Each toe angle change control ECU 37 is connected to the steering control ECU 130 through a communication line, and also to the other toe angle change control ECU 37 through a communication line.

The control part 81 includes a microcomputer with components, such as CPU, RAM and ROM, and a peripheral circuit, and has a target current calculating part 81a, a correction current setting part 81b, a motor control signal generation part 81c and the self-diagnostic part (anomaly detection unit) 81d.

The target current calculating part 81a of one of the toe angle change controls ECU 37 is configured to calculate a target current signal based on a signal of the target value of the toe angle of the rear wheel 2R (or 2L) input through the communication line from the target toe angle computing part 71 of the steering control ECU 130 and to output the result to the motor control signal generation part 81c through an adder 81e. Herein, the target current signal is a current signal required for setting the actuator 30 so as to realize a desired operation amount of the actuator 30 (amount of expansion/contraction of the actuator 30 that allows the rear wheel 2R (or 2L) to have a desired toe angle). In the present embodiment, the target current signal is also input to the correction current setting part 81b, as a reference signal.

Based on the target value signal of the toe angle, the position information input from the stroke sensor 38, and the target current signal as a reference signal, the correction current setting part 81*b* outputs, to the adder 81*e*, a correction current signal for correcting the target current signal in accordance with a deviation from the toe angle indicated by the target current. The adder 81*e* is configured to subtract the correction current signal from the target current signal, and to output the corrected target current signal to the electric motor.

In this manner, the target toe angle is set promptly by correcting the target current signal from the target current calculating part 81*a*, by feeding back a change in the current value required for the steering wheel turn of the rear wheel 2R (or 2L) which change is caused by the vehicle speed V, road conditions, motional states of the vehicle, wear status of tire, or the like.

The motor control signal generation part 81*c* is configured to receive the target current signal from the target current calculating part 81*a* through the adder 81*e*, and to output the motor control signal to the electric motor drive circuit 83. The motor control signal includes a value of the current to be supplied to the electric motor 31, and a direction of the current.

The electric motor drive circuit 83 is formed of, for example, a bridge circuit with FET (Field Effect Transistor), and configured to supply an electric motor voltage to the electric motor 31, based on the motor control signal.

As shown in FIG. 9, in the steering system 100 of the vehicle of the present embodiment, the self-diagnostic part 81*d* of the control part 81 is configured to receive position information of the stroke sensor 38 of the toe angle changer 120L or 120R (to which the self-diagnostic part 81*d* of interest belongs), a signal indicating a condition of the electric motor drive circuit 83, a target current signal from the target current calculating part 81*a*, and a correction current signal from the correction current setting part 81*b*, and to check whether or not there is an anomaly signal E from the other toe angle change control ECU 37 (to which the self-diagnostic part 81*d* of interest does not belong). In other words, the self-diagnostic part 81*d* receives and monitors signals indicating whether or not the electric motor 31 and the electric motor drive circuit 83 in the toe angle change control ECU 37 of interest is normally operated, and at the same time, monitors signals indicating whether or not the electric motor 31 and the electric motor drive circuit 83 in the other toe angle change control ECU 37 is normally operated. When the self-diagnostic part 81*d* determines, based on the monitored signal, that at least one of the electric motor 31, the stroke sensor 38, the electric motor drive circuit 83, the target current calculating part 81*a* and the correction current setting part 81*b* is in an abnormal state (i.e., not operated normally), the self-diagnostic part 81*d* sends an anomaly signal E to the other self-diagnostic part 81*d* of the other toe angle change control ECU 37 (to which the self-diagnostic part 81*d* of interest does not belong). In addition, the anomaly signal E is sent also to the toe angle change control diagnostic part 73 of the steering control ECU 130 through the signal line. Herein, the abnormal state (failure) determined by the self-diagnostic part 81*d* means, for example, a state continued for a certain period of time, in which the toe angle indicated by the stroke sensor 38 is apart by a specific value or more from the toe angle corresponding to the target current signal. Such a state may occur due to a poor turn function of the actuator 30 caused by, for example, overheating of the electric motor 31.

In the present embodiment, the toe angle change control ECU 37 calculates the target current and is unified with the actuator 30 and thus separately arranged from the steering control ECU 130. With this configuration, the detected value (position information) by the stroke sensor 38 does not have to be sent to the steering control ECU 130, and it becomes possible to feedback-wise process the position control and current control in the toe angle change control ECU 37. As a result, an independent feedback loop is formed in the toe angle changer 120L (or 120R), and thus it becomes possible that settings can be made in accordance with the individual actuator 30 in a different state from that of the other actuator 30 (i.e. it is not necessary to make settings in accordance with the steering control ECU 130), leading to increase in the processing speed. In other words, the steering control ECU 130 does not output a command including the actuation amount to the toe angle change control ECU 37; instead, the steering control ECU 130 outputs only a signal of the target toe angle, resulting in a minimum load on the steering control ECU 130. Moreover, with this configuration, it becomes easy to replace the toe angle change control ECU 37 with those having the electric motor drive circuit 83 corresponding to the actuator 30 having the steering effort specific to the type of the vehicle of interest.

In addition, if the electric motor 31 of the actuator 30 is connected to the steering control ECU 130, the feedback loop becomes significantly long, which leads to a large phase lag, resulting in poor control accuracy. On the other hand in the present embodiment, the control part 81 itself of the toe angle change control ECU 37 is configured to calculate the target current, making the feedback loop shortest, thus improving the control accuracy.

As described above, according to the present embodiment, in the vehicle having the steering system 100 using the electric power steering device 110, even when the toe angle changers 120R and/or 120L are in an abnormal state and thus the vehicle becomes unstable, by performing an assist control by the electric power steering device 110 in accordance with the abnormal state, the vehicle can be stabilized. Specifically, in the yaw rate feedback torque correction computing part 72, the yaw rate gain $G_Y$ in the case where the toe angle changers 120R and/or 120L are in an abnormal state is calculated and stored, and the yaw rate feedback torque correction value $I_Y$ calculated using the yaw rate gain $G_Y$ is input to the adder 63, to thereby perform a control with the yaw rate gain $G_Y$ acting as a reaction force to the assisting force by the electric power steering device 110.

Especially in a vehicle with a high yaw rate gain in nature, let alone a vehicle in an abnormal state, when the steering input to the steering wheel 3 (see FIG. 1) becomes larger, a larger yaw rate is generated, and thus the vehicle tends to be unstable. Accordingly, by increasing the yaw rate gain $G_Y$ which defines the yaw rate feedback torque correction value $I_Y$ acting as a reaction force to the assisting force by the electric power steering device 110, and therefore by suppressing the assisting force and making the steering input to the steering wheel 3 (see FIG. 1) small, it becomes possible to stabilize the vehicle with such a property.

The embodiment of the present invention has been described above. However, the present invention is not limited to the above embodiment, and it is a matter of course that the above embodiment may be properly modified without deviating from the spirit of the present invention.

For example, in the above-mentioned embodiment, the auxiliary torque was corrected by using the correction value of feedback torque regarding the yaw rate of the vehicle in an abnormal state. Instead, the auxiliary torque may be corrected by using a correction value of the feedback torque regarding parameters exhibiting vehicle properties, such as lateral acceleration and slip angle, of the vehicle in an abnormal state.

Moreover, the determination in the yaw rate feedback torque correction computing part 72 whether or not the toe angle changers 120R and/or 120L are in an abnormal state may not be limited to the reception of the anomaly signal E, and may be determined using the target value of the toe angle generated in the target toe angle computing part 71. Specifically, upon receiving the anomaly signal E, when the toe angle set at the toe angle changer 120R (or 120L) does not reach the target value, it can be determined that the toe angle changer 120R (or 120L) is in an abnormal state.

Second Embodiment

A second embodiment of the present invention will be described with reference to FIGS. 3, 4, and 10-15. It should be noted that components which are the same as those illustrated in the above-mentioned embodiment are designated with the same reference characters, and thus a duplicate description is omitted, and that components which are equivalent, corresponding or similar to those illustrated in the above-mentioned embodiment, are designated with the same reference characters with a single prime ('), and will be described in detail when necessary.

Figure 10:
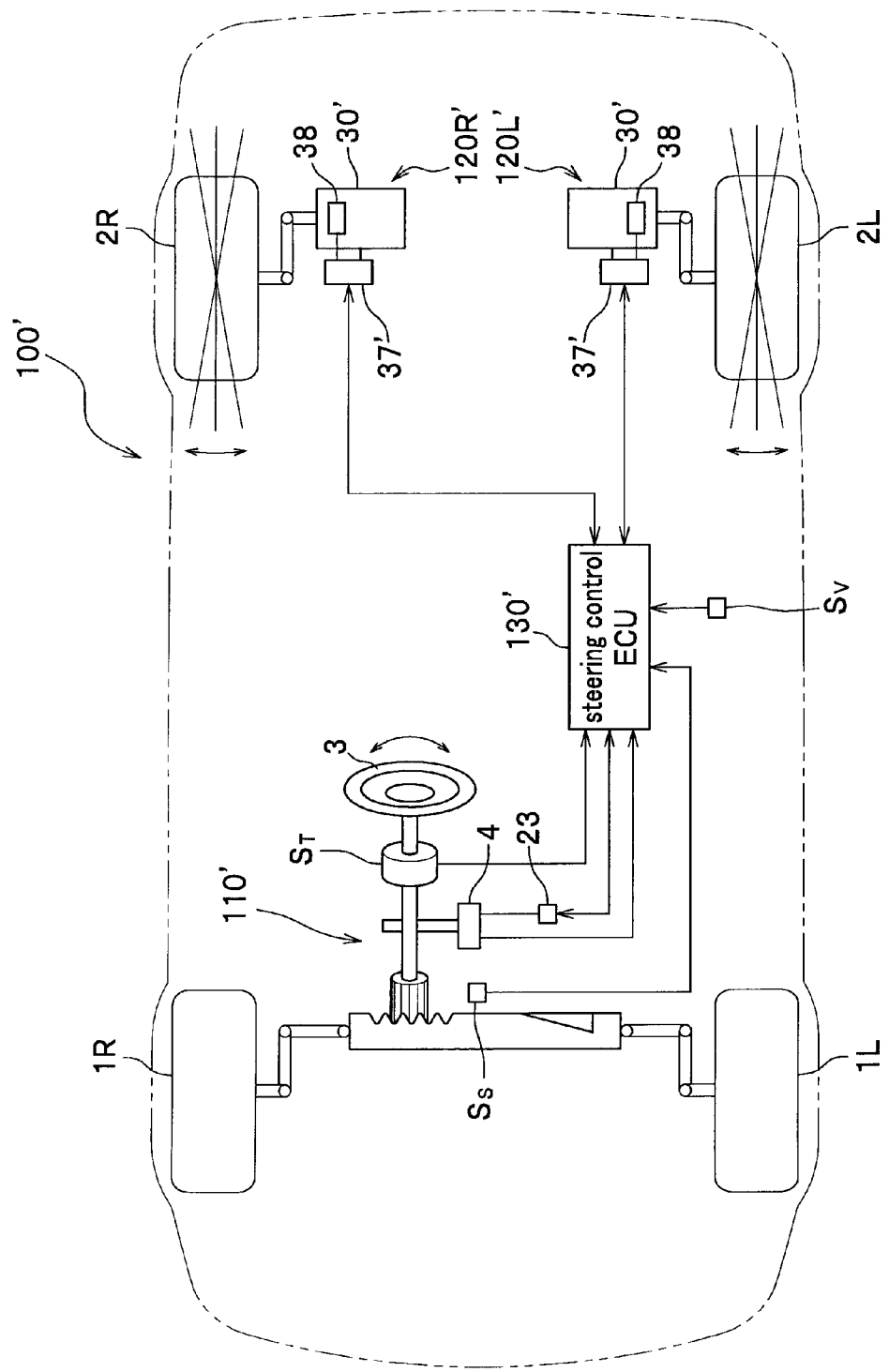
FIG. 10 is a schematic diagram of a four-wheel vehicle having a steering system according to a second embodiment of the present invention.

FIG. 10 is a schematic diagram of a four-wheel vehicle having a steering system according to a second embodiment of the present invention.

Figure 11:
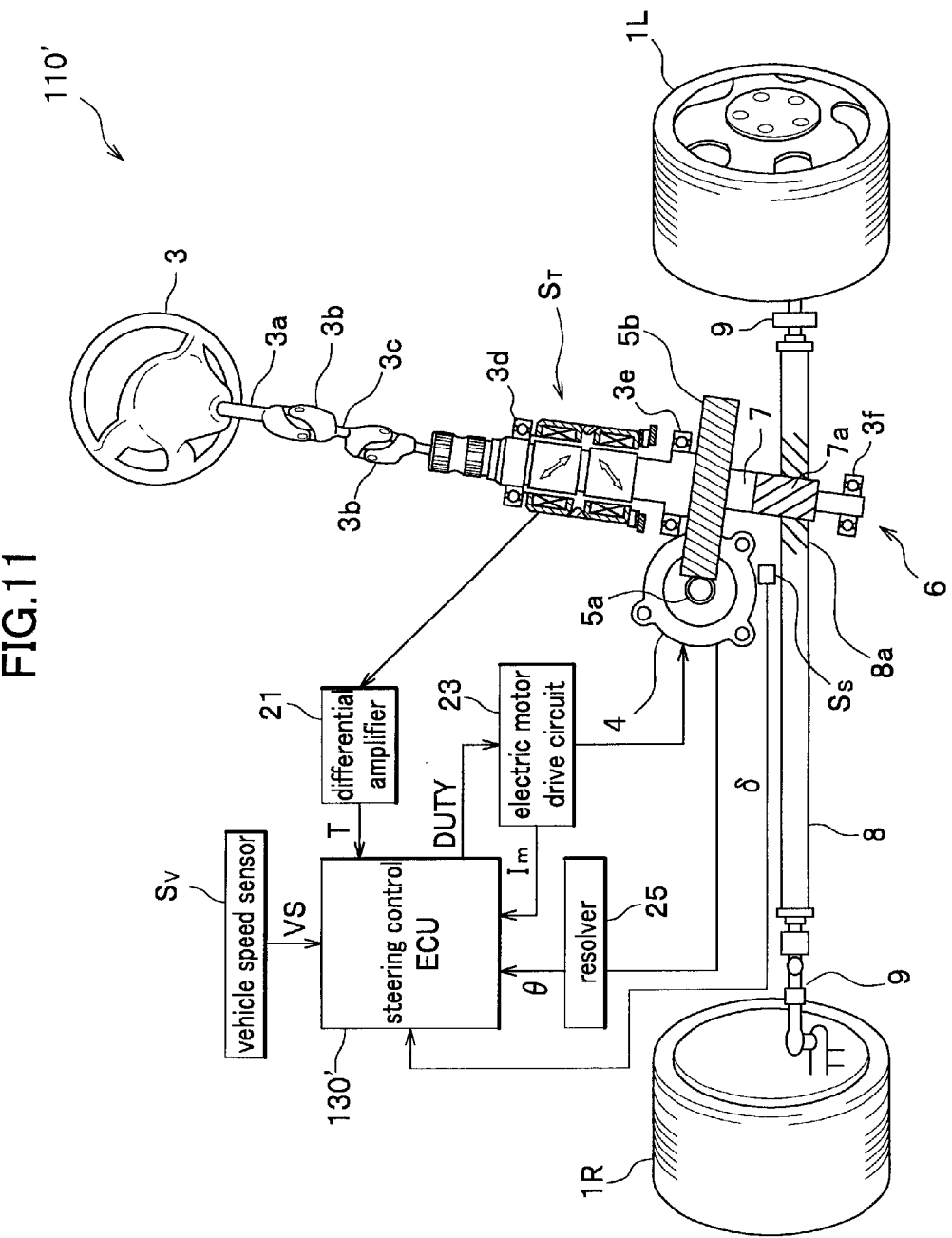
FIG. 11 is a diagram of an electric power steering device in the steering system.

FIG. 11 is a diagram of an electric power steering device in the steering system.

1. Configuration of Steering System

As shown in FIG. 10, a steering system 100' of the second embodiment includes an electric power steering device 110', toe angle changers 120L', 120R', a steering controller (hereinbelow, referred to as "steering control ECU") 130', and various sensors including a front wheel turning angle sensor $S_S$ and a vehicle speed sensor $S_V$. Other components are substantially the same as in the steering system according to the first embodiment shown in FIG. 1, and when different, the component will be described.

2. Configuration of Electric Power Steering Device

The electric power steering device 110' of the present embodiment is substantially the same as the electric power steering device of the first embodiment shown in FIG. 2, except that, as shown in FIG. 11, the electric power steering device 110' includes the steering control ECU 130' and the steering wheel turn mechanism includes the front wheel turning angle sensor $S_S$ for detecting a direction of the front wheels 1L, 1R, based on an amount of movement of the rack shaft 8 in a vehicle width direction.

The electric motor steering control ECU 130' of the steering system 100' has an electric power steering control part 130a' (which will be described later; see FIG. 13) as a functional part of the electric power steering device 110', which controls the driving of the electric motor 4.

3. Configuration of Toe Angle Changer

Next, a configuration of the toe angle changer will be described with reference to FIG. 12.

Figure 12:
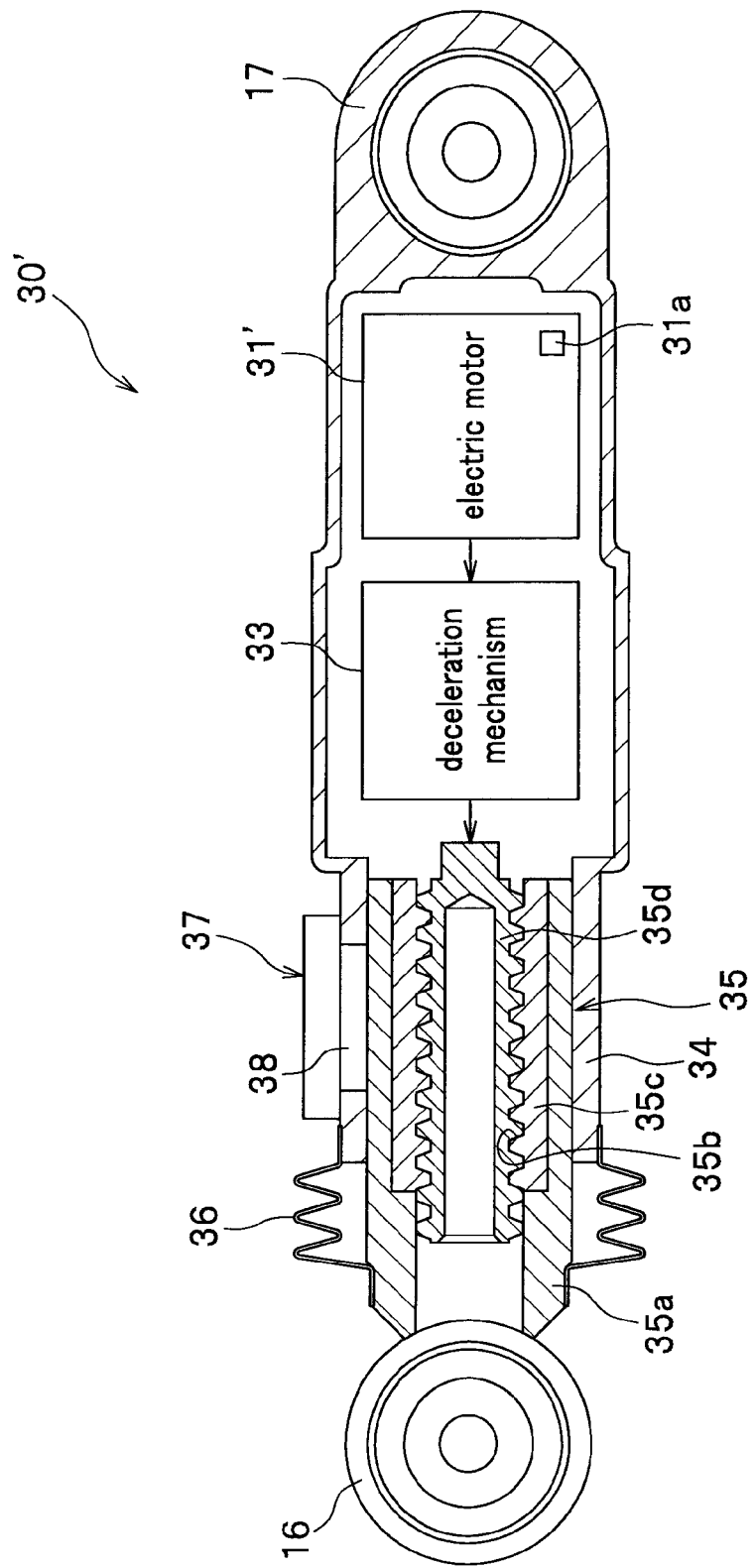
FIG. 12 is a schematic cross sectional view showing a structure of an actuator of a toe angle changer.

FIG. 12 is a schematic cross sectional view showing a structure of an actuator of a toe angle changer.

It should be noted that the toe angle changer 120L' in the present embodiment is different from the toe angle changer 120L according to the first embodiment shown in FIG. 3, in that the actuator 30, the toe angle change control ECU 37, and the steering control ECU 130 in the first embodiment are replaced with an actuator 30', a toe angle change control ECU 37' and the steering control ECU 130', respectively. The other components are the same as those in the first embodiment and thus a duplicate description is omitted. The configurational arrangement of all components including the corresponding components is the same as that in the first embodiment (see FIG. 3), and thus the duplicate drawing and the duplicate description are omitted.

The actuator 30' in the present embodiment is the same as the actuator 30 in the first embodiment shown in FIG. 4, except that the actuator 30' has an electric motor 31'. The electric motor 31' is the same as the electric motor 31 in the first embodiment shown in FIG. 4, except that the electric motor 31' further has a temperature sensor 31a. The temperature sensor 31a is configured to detect (measure) a winding temperature of a coil of the electric motor 31', and to input a detected temperature signal to a self-diagnostic part 81d' (see FIG. 15), which will be described later, of the toe angle change control ECU 37'.

Herein, the self-diagnostic part 81d' and the temperature sensor 31a constitute an anomaly detection unit of the present invention.

It should be noted that the toe angle change control ECU 37' is fixed to the case body 34 of the actuator 30', and connected to the stroke sensor 38 and the temperature sensor 31a through connectors or the like.

4. Functional Configuration of Steering Control ECU

Next, functions of the steering control ECU will be described with reference to FIG. 13.

Figure 13:
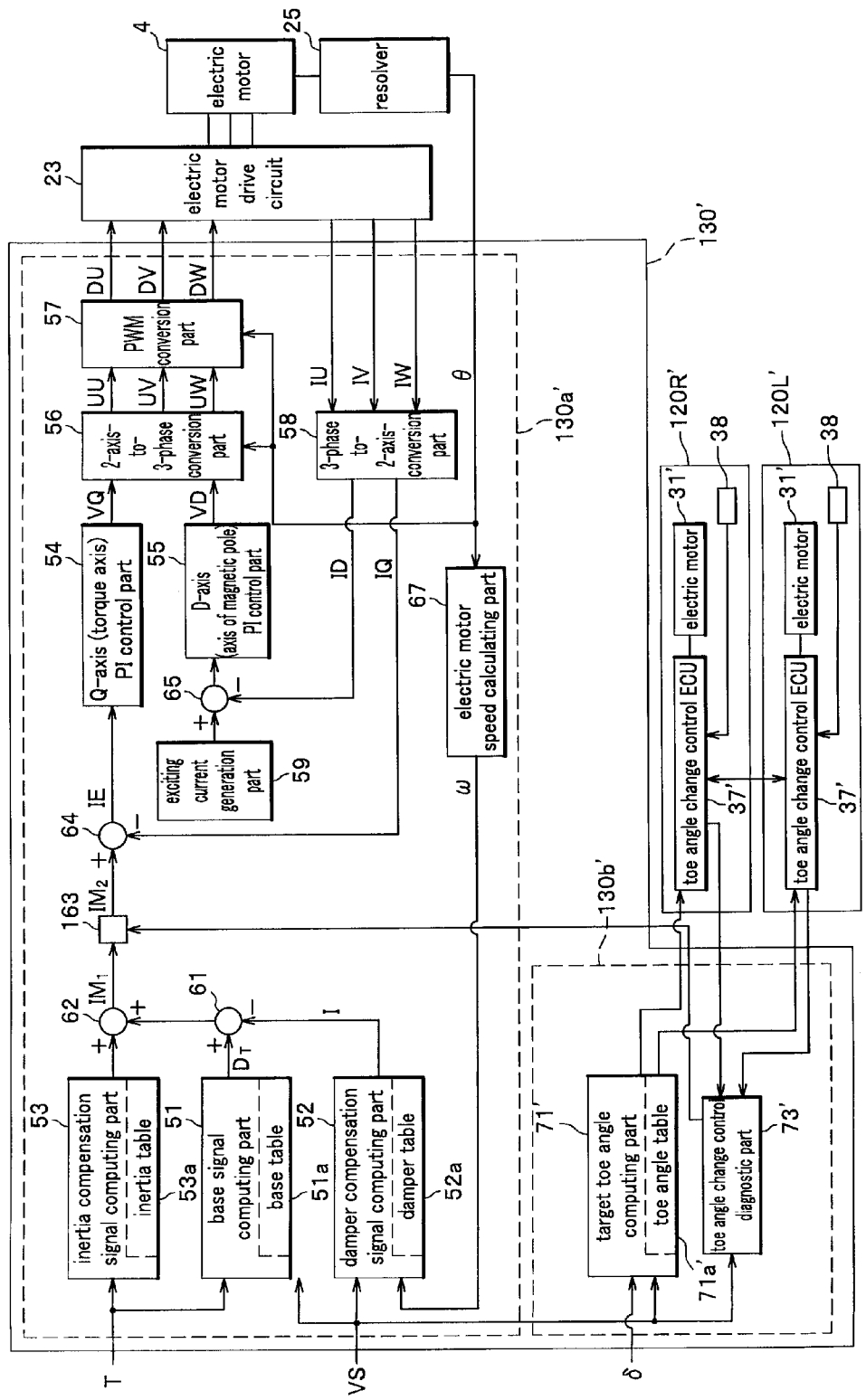
FIG. 13 is a schematic diagram of a control function of a steering control ECU and toe angle changers in the steering system according to the second embodiment.

FIG. 13 is a schematic diagram of a control function of a steering control ECU and toe angle changers in the steering system according to the second embodiment.

As shown in FIG. 13, the steering control ECU 130' includes: the electric power steering control part 130a' configured to control the electric power steering device 110' (see FIGS. 10 and 11); and a rear wheel toe angle control part 130b' configured to compute target toe angles of the rear wheels 2L, 2R.

(Electric Power Steering Control Part)

With respect to the electric power steering control part 130a', only the portions different from those of the first embodiment, and configurations associated therewith, will be described with reference to FIG. 13.

The output signal $IM_1$ of the adder 62 is a target signal for the Q-axis current which defines the torque of the electric motor 4, and input to an anomaly auxiliary torque restriction part 163, which restricts the auxiliary torque when the toe angle changer(s) is in an abnormal state (unlike the first embodiment, the electric power steering control part of the present embodiment does not have the adder 63).

Figure 14:
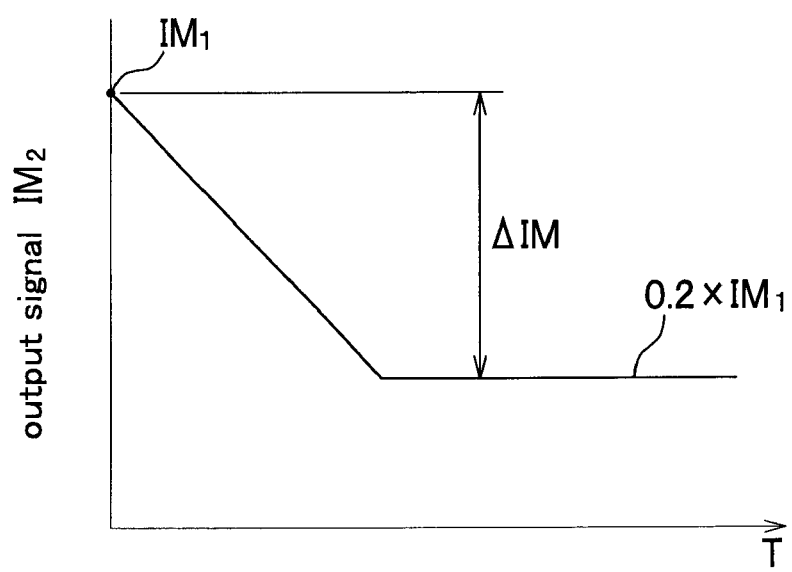
FIG. 14 is a graph illustrating an output signal $IM_2$ relative to an input signal $IM_1$, when a correction command signal is received in an anomaly auxiliary torque restriction part.

The anomaly auxiliary torque restriction part 163 is configured to reduce the signal $IM_1$ from the adder 62 at the moment a correction command signal is input from a toe angle change control diagnostic part 73' (which will be described later), by a specific correction amount $\Delta IM$ as shown in FIG. 14 and to output the output signal $IM_2$ to the adder 64.

The magnitude of the correction amount $\Delta IM$ is set to be a specific percent, such as 80%, of the signal $IM_1$. The current changes between positive and negative when the steering wheel is turned left and right, respectively, but regardless of the sign (positive or negative) of the signal $IM_1$, by diminishing the signal $IM_1$ to 80% of the input value, the auxiliary torque can be reduced in such a manner that the driver can sense the reduction.

When the correction command signal is not input from the toe angle change control diagnostic part 73', the anomaly auxiliary torque restriction part 163 outputs the signal IM$_1$ as-is as an output signal IM$_2$ to the adder 64.

(Rear Wheel Toe Angle Control Part)

Next, the rear wheel toe angle control part 130b' will be described with reference to FIG. 13. As shown in FIG. 13, the rear wheel toe angle control part 130b' includes a target toe angle computing part 71' and the toe angle change control diagnostic part 73'.

The front wheel turning angle sensor S$_S$ is configured to detect (measure) a turning angle δ of the front wheels 1L, 1R and to input the result to the target toe angle computing part 71'.

Figure 15:
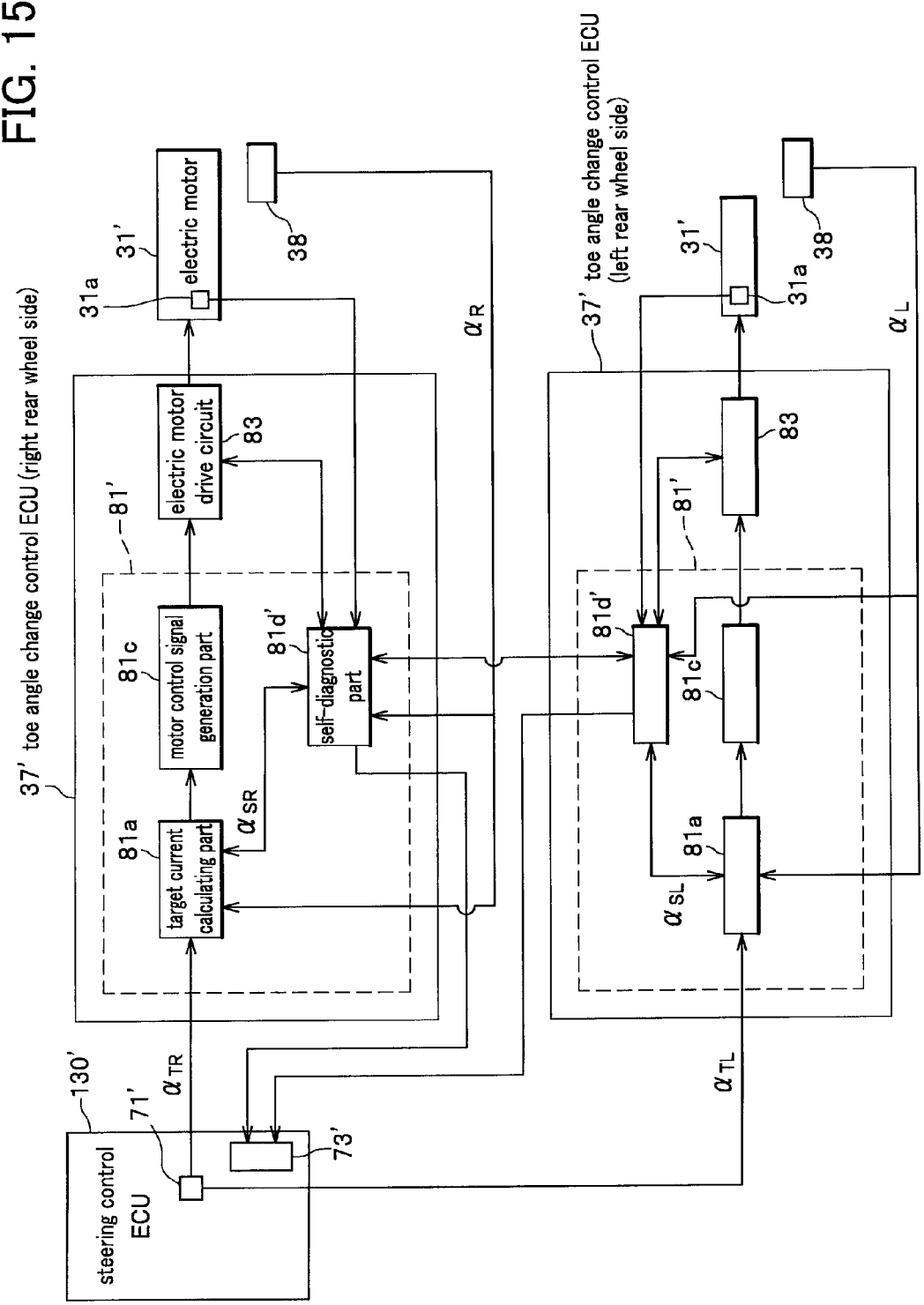
FIG. 15 is a block configuration diagram showing a control function of a toe angle change control ECU of a toe angle changer.

The target toe angle computing part 71' is configured to generate target toe angles $α_{TL}$, $α_{TR}$ for the rear wheels 2L, 2R, respectively, based on the vehicle speed signal VS, a turning angle δ, and a turning angular velocity δ' which is easily obtained by temporal differentiation of the turning angle δ, and to input the target toe angles $α_{TL}$, $α_{TR}$ to the respective toe angle change control ECUs 37', 37' configured to control respective toe angle changes of the left rear wheel 2L and the right rear wheel 2R (see FIG. 15). The target toe angles $α_{TL}$, $α_{TR}$ are generated from a toe angle table 71a', with reference to the turning angle δ, the turning angular velocity δ' and the vehicle speed V, which table had been prepared for each of the left rear wheel 2L and the right rear wheel 2R in advance.

For example, the target toe angles $α_{TL}$, $δ_{TR}$ are defined by the following formulae (6) and (7):

$$α_{TL}=K_L(V,δ',δ)·δ \quad (6)$$

$$α_{TR}=K_R(V,δ',δ)·δ \quad (7)$$

where each of $K_L(V,δ',δ)$, $K_R(V,δ',δ)$ represents a front-rear wheel steering ratio which depends on the vehicle speed V, the turning angle δ and the turning angular velocity δ' of the turning angle. When the vehicle speed V is in a specific low-speed range, each of the target toe angles $α_{TL}$, $α_{TR}$ of the rear wheel is generated in such a manner that the rear wheels 2L, 2R are in antiphase relative to the front wheels, in accordance with the turning angle δ, to allow the vehicle to turn in a small radius.

In the high-speed range over the above-mentioned specific low-speed range, when an absolute value of the turning angular velocity δ' is a specific value or less, and at the same time, the turning angle δ is within a specific range (including right and left), the target toe angles $α_{TL}$, $α_{TR}$ of the rear wheels 2L, 2R are set as the same phase relative to the front wheels, in accordance with the turning angle δ. In other words, the target toe angles $α_{TL}$, $α_{TR}$ of the rear wheels 2L, 2R are set so as to make the slip angle β small during lane change.

However, in the high-speed range over the above-mentioned specific low-speed range, when the absolute value of the turning angular velocity δ' exceeds a specific value, or when the turning angle δ is too large to fall outside the specific range (including right and left), the target toe angles $α_{TL}$, $α_{TR}$ of the rear wheels are set to antiphase relative to the front wheels, in accordance with the turning angle δ.

It should be noted that, from the viewpoint of the stability in a turn, the target toe angles $α_{TL}$, $α_{TR}$ generated in the target toe angle computing part 71' do not necessarily follow Ackerman-Jeantaud geometry. Further, when the turning angle δ is 0°, each of the target toe angles $α_{TL}$, $α_{TR}$ may be, for example, 2°, with the wheels toed in.

Next, the toe angle change control diagnostic part 73' will be described. The toe angle change control diagnostic part 73' is configured to receive an anomaly detection signal (which will be described later) from a self-diagnostic part 81d' (which will be described later; see FIG. 15) of the toe angle change control ECU 37' of the toe angle changers 120L' and/or 120R', and to determine whether or not the specific actual toe angles $α_{SL}$, $α_{SR}$ (which will be described later) received together with the anomaly detection signals indicate that at least one of the rear wheels 2L, 2R is in a toe-out state (i.e., not both of the specific actual toe angles $α_{SL}$, $α_{SR}$ are selected from zero and those indicating a toe-in state), and at the same time, whether or not the vehicle speed is a specific value V$_{low}$ or lower. When these conditions are satisfied, the toe angle change control diagnostic part 73' outputs the correction command signal to the anomaly auxiliary torque restriction part 163 so that the signal IM$_1$ input to the anomaly auxiliary torque restriction part 163 is reduced by a specific correction amount ΔIM as described above, which is then output as the signal IM$_2$. When the above-mentioned conditions are not satisfied, for example, when the both of the rear wheels are locked in the toe-in state, or when one of the rear wheels is locked in the toe-in state and the other has the specific actual toe angle of zero ($α_{SL}$=0 or $α_{SR}$=0), or when the rear wheels are locked with the specific actual toe angles $α_{SL}$=$α_{SR}$=0, or when both of the toe angle changers 120L', 120R' are in a normal state, the correction command signal is not output to the anomaly auxiliary torque restriction part 163.

(Toe Angle Change Control ECU)

Next, the detailed configuration of the toe angle change control ECU will be described with reference to FIG. 15. FIG. 15 is a block configuration diagram showing a control function of a toe angle change control ECU of a toe angle changer.

As shown in FIG. 15, the toe angle change control ECU 37' has a function of drive control of the actuator 30', and is formed of a control part 81' and the electric motor drive circuit 83. Each toe angle change control ECU 37' is connected to the steering control ECU 130' through a communication line, and also to the other toe angle change control ECU 37' through a communication line.

The control part 81' includes a microcomputer with components, such as CPU, RAM, ROM, and a peripheral circuit, and has a target current calculating part 81a, a motor control signal generation part 81c and the self-diagnostic part (anomaly detection unit) 81d'.

The target current calculating part 81a of one toe angle change control ECU 37' (on a right rear wheel 2R side) is configured to calculate a target current signal based on the target toe angle $α_{TR}$ of the rear wheel 2R input through the communication line from the steering control ECU 130' and on the present toe angle $α_R$ of the rear wheel 2R obtained from the stroke sensor 38, and to output the result to the motor control signal generation part 81c.

The target current calculating part 81a of the other toe angle change control ECU 37' (on a left rear wheel 2L side) is configured to calculate a target current signal based on the target toe angle $α_{TL}$ of the rear wheel 2L input through the communication line from the steering control ECU 130' and on the present toe angle $α_L$ of the rear wheel 2L obtained from the stroke sensor 38, and to output the result to the motor control signal generation part 81c.

Herein, the target current signal is a current signal required for setting the actuator 30' so as to realize a desired operation amount of the actuator 30' (amount of expansion/contraction of the actuator 30' that allows the rear wheel 2R (or 2L) to have a desired toe angle $α_{TR}$ (or $α_{TL}$)) at a desired speed.

In this manner, the target toe angle $α_{TR}$ (or $α_{TL}$) is set promptly in the target current calculating part 81a, by feeding back the present toe angle $α_{TR}$ (or $α_{TL}$) and the target toe angle $α_{TR}$ (or $α_{TL}$) and correcting the target current signal, and by feeding back a change in the current value required for the steering wheel turn of the rear wheel 2R (or 2L) which change is caused by the vehicle speed V, road conditions, motional states of the vehicle, wear status of tire, or the like.

It should be noted that the response may be enhanced in the target current calculating part 81a, by adding feedforward control.

The motor control signal generation part 81c is configured to receive the target current signal from the target current calculating part 81a, and to output the motor control signal to the electric motor drive circuit 83. The motor control signal includes a value of the current to be supplied to the electric motor 31, and a direction of the current.

The electric motor drive circuit 83 is formed of, for example, a bridge circuit with FET (Field Effect Transistor), and configured to supply an electric motor current to the electric motor 31, based on the motor control signal.

As shown in FIG. 15, the self-diagnostic part 81d' is configured to determine whether or not an abnormal state is detected, based on a position signal of the stroke sensor 38 of the toe angle changer 120L' or the toe angle changer 120R' (to which the self-diagnostic part 81d' of interest belongs), a detection signal from a Hall element of the electric motor drive circuit 83, a temperature signal from the temperature sensor 31a, and a state monitoring of the target current calculating part 81a.

For example, the self-diagnostic part 81d' determines that a winding temperature of the electric motor 31' is in an abnormal state (high winding temperature mode) when the signal from the temperature sensor 31a exceeds a specific value, and inputs a specific actual toe angle $\alpha_{SL}$ (or $\alpha_{SR}$), such as 0°, to the target current calculating part 81a. Herein, the actual toe angles $\alpha_{SL}$ and $\alpha_{SR}$ are actual toe angles regarding the left rear wheel 2L and the right rear wheel 2R, respectively, which are realized by inputting an actual toe angle when an abnormal state is detected.

The self-diagnostic part 81d' is configured to monitor the target current value from the target current calculating part 81a and the detection signal of actual current from a Hall element of the electric motor drive circuit 83, and to determine whether or not the actuator 30' is locked, based on the position signal from the stroke sensor 38: when it is determined that the actuator 30' is locked (lock mode), the self-diagnostic part 81d' commands the electric motor drive circuit 83 to stop the power supply to the electric motor 31', and inputs the present toe angle $\alpha_L$ (or $\alpha_R$) as the actual toe angle $\alpha_{SL}$ (or $\alpha_{SR}$) to the target current calculating part 81a, and then sends an anomaly detection signal and a signal of the above-mentioned mode made in response to the anomaly detection, to the self-diagnostic part 81d' of the other toe angle change control ECU 37'.

It should be noted that, for an anomaly detection unit, a watch dog circuit may be provided as a peripheral circuit in addition to the self-diagnostic part 81d', to monitor the control part 81'. In this case, when an abnormal state of the control part 81' is detected, the electric motor drive circuit 83 may be commanded to stop a power supply to the electric motor 31', and then an anomaly detection signal may be output to the self-diagnostic part 81d' of the other toe angle change control ECU 37'.

In addition, the self-diagnostic part 81d' of the toe angle changer 120L' (or 120R') is configured to check whether or not there is an anomaly detection signal from the self-diagnostic part 81d' of the toe angle change control ECU 37' of the other toe angle changer 120R' (or 120L'). When the anomaly detection signal is received, the actual toe angle $\alpha_{SL}$ (or $\alpha_{SR}$) is input to the target current calculating part 81a, based on a signal of the above-mentioned process mode.

In other words, the self-diagnostic part 81d' monitors a signal indicating whether or not the toe angle changer 120L' (or 120R') corresponding to the toe angle change control ECU 37' of interest is normally operated, and at the same time, monitors a signal indicating whether or not the toe angle changer 120R' (or 120L') corresponding to the other toe angle change control ECU 37' is normally operated. When one of the toe angle changers 120' is found to be in an abnormal state, both of the toe angle change control ECUs 37', 37' perform a process in the same specific mode.

Then, each self-diagnostic part 81d' sends an anomaly detection signal, a signal of the above-mentioned mode made in response to the anomaly detection, and a specific actual toe angle $\alpha_{SL}$ (or $\alpha_{SR}$) to the toe angle change control diagnostic part 73'.

Figure 16:
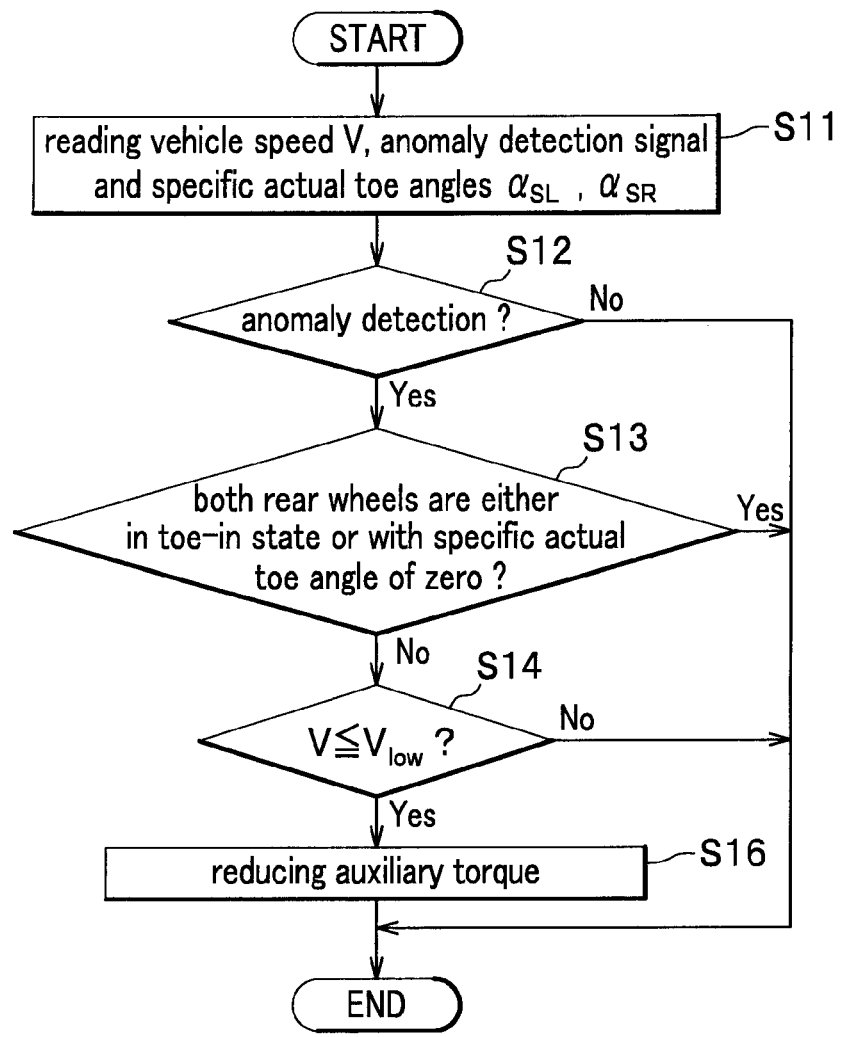
FIG. 16 is a flow chart showing a control in a toe angle change control diagnostic part.

Next, a control in the toe angle change control diagnostic part 73' will be described with reference to FIG. 16. FIG. 16 is a flow chart showing a control in the toe angle change control diagnostic part. This control process is performed in a predetermined cycle.

In a step S11, a vehicle speed V, an anomaly detection signal and specific actual toe angles $\alpha_{SL}$, $\alpha_{SR}$ from the self-diagnostic part 81d' of the right and left toe angle change control ECUs 37' are constantly read.

In a step S12, it is checked whether or not an anomaly detection signal is received (anomaly detection ?). When an abnormal state is detected (Yes), the procedure advances to a step S13, and when the abnormal state is not detected (No), a procedure in one cycle is terminated.

In the step S13, the specific actual toe angle $\alpha_{SL}$, $\alpha_{SR}$ read in the step S11 is examined to determine whether or not both of the left rear wheel 2L and the right rear wheel 2R are in a toe-in state or with the specific actual toe angle of zero. When both of the rear wheels 2L, 2R are either in the toe-in state or with the specific actual toe angle of zero (i.e., when both of the rear wheels 2L, 2R are in the toe-in state, or when both of the specific actual toe angles $\alpha_{SL}$, $\alpha_{SR}$ are zero, or when one of the rear wheels 2L, 2R is in the toe-in state and the other has the specific actual toe angle of zero) (Yes), a procedure in one cycle is terminated. When the above mentioned condition is not satisfied (i.e., at least one of the rear wheels 2L, 2R is in a toe-out state) (No), the procedure advances to a step S14 where it is determined whether or not the vehicle speed V is a specific vehicle speed $V_{low}$ or lower. When the vehicle speed V is larger than the specific vehicle speed $V_{low}$ (No), a procedure in one cycle is terminated. When the vehicle speed V is the specific vehicle speed $V_{low}$ or lower (Yes), the correction command signal is output to the anomaly auxiliary torque restriction part 163. In other words, the auxiliary torque is reduced, and then a series of the control is terminated.

Subsequently, the anomaly auxiliary torque restriction part 163 gently reduces the input signal $IM_1$ to a specific percentage of the auxiliary torque with, for example, a specific delay as shown in FIG. 14, and then output the signal $IM_2$, which is set to be a specific percent (20% in this case) of the signal $IM_1$, to the adder 64.

It should be noted that the vehicle speed $V_{low}$ is a sufficiently low speed (e.g. the lowest running speed of 10 km/hr) which does not affect the vehicle run, even when an awkward feeling is given to the driver as a result of a sudden change in the steering effort, in response to the sudden change in the auxiliary torque, such as 80% reduction.

As described above, according to the present embodiment, when an anomaly detection signal regarding the toe angle changer is received from the anomaly detection unit, the target value can be reduced so that the responsive feeling from the steering torque becomes large. In addition, when an anomaly detection signal is received from the anomaly detection unit, and at the same time, when the vehicle speed is a specific value or less, the target value of the auxiliary torque is reduced. As a result, even though the vehicle runs at a relatively high speed, it is possible to prevent a sudden increase in the responsive feeling from the steering torque. In addition, the calculated target value of the auxiliary torque is reduced only when the steering controller receives an anomaly detection signal from the anomaly detection unit, the vehicle speed is a specific value or lower, and at least one of the left and right toe angles of the rear wheels is locked in a toe-out state.

Specifically, when the toe angle change control diagnostic part 73' receives an anomaly detection signal from the toe angle change control ECU 37', and when both of the rear wheels 2L, 2R are not in a toe-in state or when the actual toe angles $\alpha_{SL}=\alpha_{SR}=0$ is not satisfied or when it is not the case that the one of the rear wheels is in a toe-in state and the actual toe angle of the other rear wheel is zero, the steering control ECU 130' makes the adder 64 output in such a manner that the auxiliary torque is reduced, after confirming that the vehicle speed is $V_{low}$ or lower. With this configuration, the auxiliary torque becomes smaller at a sufficiently low speed, and the responsive feeling from the steering torque given to the driver becomes large, making it easier for the driver to sense an abnormal state of the steering function.

Therefore, an awkward feeling, which may otherwise be given to the driver as a result of a sudden reduction in the auxiliary torque during running, can be prevented.

Since the gain is set in such a manner that the auxiliary torque is reduced in accordance with the increase in the speed, if the vehicle runs at a vehicle speed exceeding the vehicle speed $V_{low}$, an anomaly in the toe angle changers 120L' and/or 120R' is easily sensed by the driver. Therefore, the driver can easily reduce the vehicle speed in response to the discomfort feeling in steerability, and when the vehicle speed reaches $V_{low}$ or lower, the auxiliary torque is reduced, to thereby surely inform the driver of anomaly in the toe angle changers 120L' and/or 120R'.

In this case, the auxiliary torque is reduced with a time delay, and thus it is possible to prevent the driver from being surprised at a rapid decrease in the auxiliary torque.

It should be noted that, the reason for not reducing the auxiliary torque when the signal from the toe angle change control ECU 37' indicates that the rear wheels 2L, 2R are in a toe-in state or $\alpha_{SL}=\alpha_{SR}=0$ is satisfied is that, when the rear wheels 2L, 2R are locked with $\alpha_{SL}=\alpha_{SR}=0$, steerability and turnability are the same as those of a conventional vehicle with the steering of only front wheels 1L, 1R, and when the vehicle is in the toe-in state, vehicle behavior rather shows properties on the safe side. Therefore, it would suffice to warn the driver by turning on an alarm lamp provided on a console, which informs an anomaly in the toe angle changers 120' and/or 120R'.

When the self-diagnostic part 81d' of one of the toe angle change control ECUs 37', 37' detects an abnormal state, the self-diagnostic part 81d' sends an anomaly detection signal to the other toe angle change control ECU 37', and both of the toe angle changers 120L', 120R' are controlled so that both of the toe angles are fixed. Therefore, it is prevented that a change of only one of the toe angles between the rear wheels 2L, 2R remains controlled, and thus a driving performance is maintained stable even when the toe angle changers 120L', 120R' are in an abnormal state.

(Modified Versions of Second Embodiment)

The present invention is not limited to the second embodiment, and it is possible to make, for example, the following various modifications.

(1) In the electric power steering control part 130a' according to the second embodiment, the current in the electric motor 4 is controlled by setting the target current. Instead, a target voltage may be set as a voltage to be applied to the electric motor 4. Alternatively, a target torque may be set as a torque to be output by the electric motor 4, to thereby control the current in the electric motor 4. Such a target voltage and a target torque are included in the target signal.

(2) In the second embodiment, the toe angle change control diagnostic part 73' outputs the correction command signal to the anomaly auxiliary torque restriction part 163, so as to make the anomaly auxiliary torque restriction part 163 reduce the current target value $IM_1$. However, the present invention is not limited to this embodiment.

Figure 17:
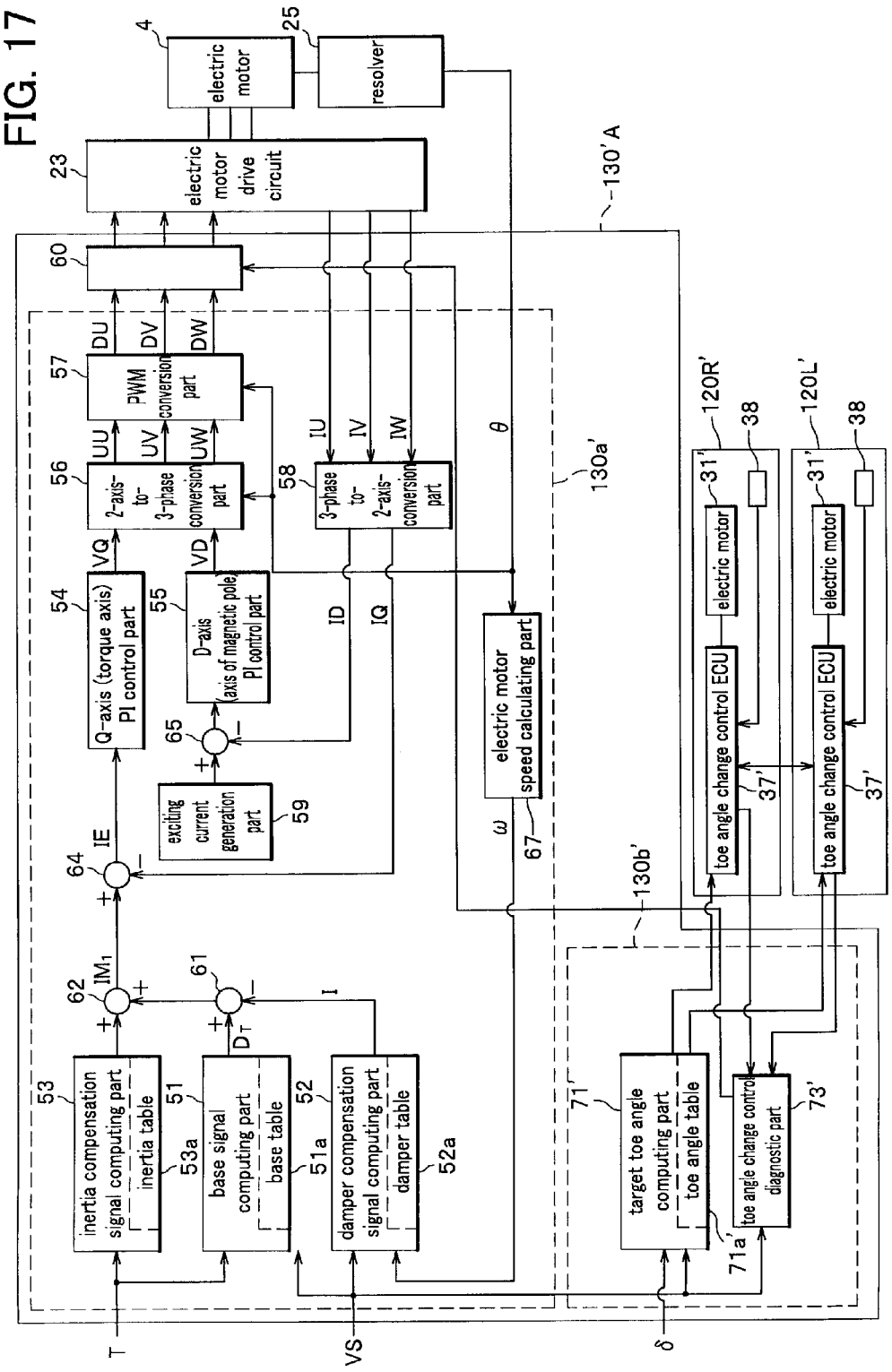
FIG. 17 is a schematic diagram of a control function of a steering control ECU and toe angle changers in the steering system according to a modified version of the second embodiment.

As shown in a steering control ECU 130'A in FIG. 17, a relay switch 60 may be disposed downstream from the PWM conversion part 57 and an auxiliary torque may be cut off by turning off the relay switch 60, in response to the command from the toe angle change control diagnostic part 73'. With this configuration, when the anomaly detection unit detects an abnormal state of the toe angle changer, the amount of the auxiliary torque becomes 0, leading to a large responsive feeling of the steering torque. Moreover, the steering control ECU 130'A may be set in such a manner that the auxiliary torque becomes 0 when the vehicle speed is a specific value or lower. With this configuration, sudden increase in the responsive feeling of the steering torque can be prevented when the vehicle runs at a relatively high speed, and thus an awkward feeling, which may otherwise be given to the driver, can be prevented. Furthermore, the steering control ECU 130'A may be set in such a manner that the auxiliary torque becomes 0 only when at least one of the toe angles of the left and right rear wheels is fixed in a toe-out state (i.e., only when the toe angles are fixed such that a stable turnability is given, with none of the left and right rear wheels being toed out). With this configuration, there can be provided a rational steering system in which an unnecessary reduction (including zeroing) of the auxiliary torque is prevented.

(3) In the second embodiment, as shown in FIG. 6A, the base signal computing part 51 generates the base signal $D_T$ to be used as a standard reference for a target signal $IM_1$ for the output torque $T_M^*$, based on the torque signal T and the vehicle speed signal VS as a parameter, but the present invention is not limited to this embodiment. The present invention can be applied to an electric power steering device in which: an operation angle signal from an operation angle sensor provided in the steering wheel 3 and a yaw rate signal from a yaw rate sensor provided in the vehicle body are input to the steering control ECU 130'; the reference yaw rate, which is determined in advance based on the vehicle speed signal VS and the operation angle, is calculated; and feedback control of the reaction force to the steering wheel 3 is performed based on a difference between the reference yaw rate and the actual yaw rate.

Third Embodiment

A third embodiment of the present invention will be described with reference to FIGS. 3, 6A-6C, 12, 15 and 18-24. It should be noted that components which are the same as those illustrated in the above-mentioned embodiments are designated with the same reference characters, and thus a duplicate description is omitted, and that components which are equivalent, corresponding or similar to those illustrated in the above-mentioned embodiments, are designated with the same reference characters with a double prime ("), and will be described in detail when necessary.

Figure 18:
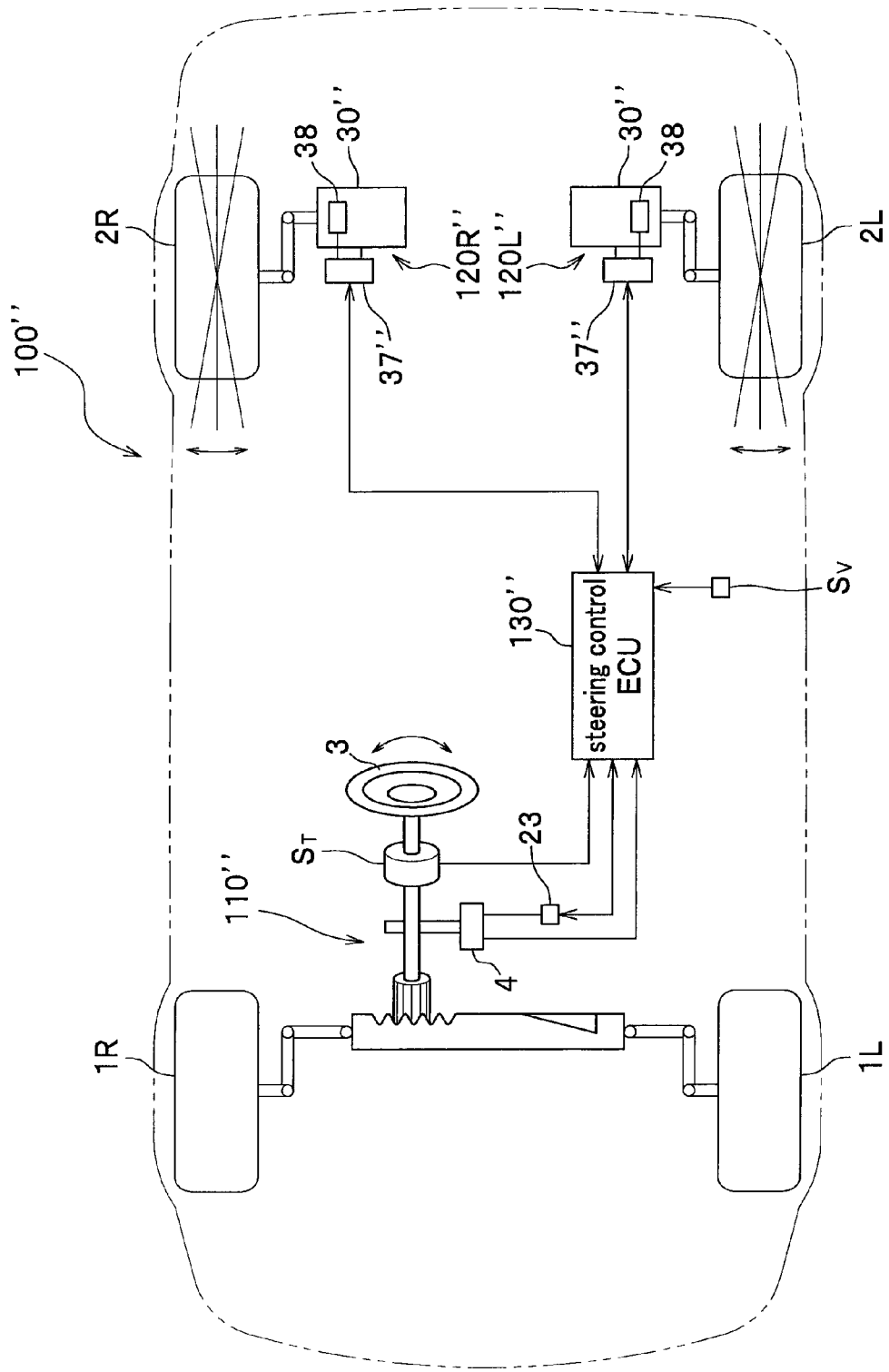
FIG. 18 is a schematic diagram of a four-wheel vehicle having a steering system according to a third embodiment of the present invention.
Figure 19:
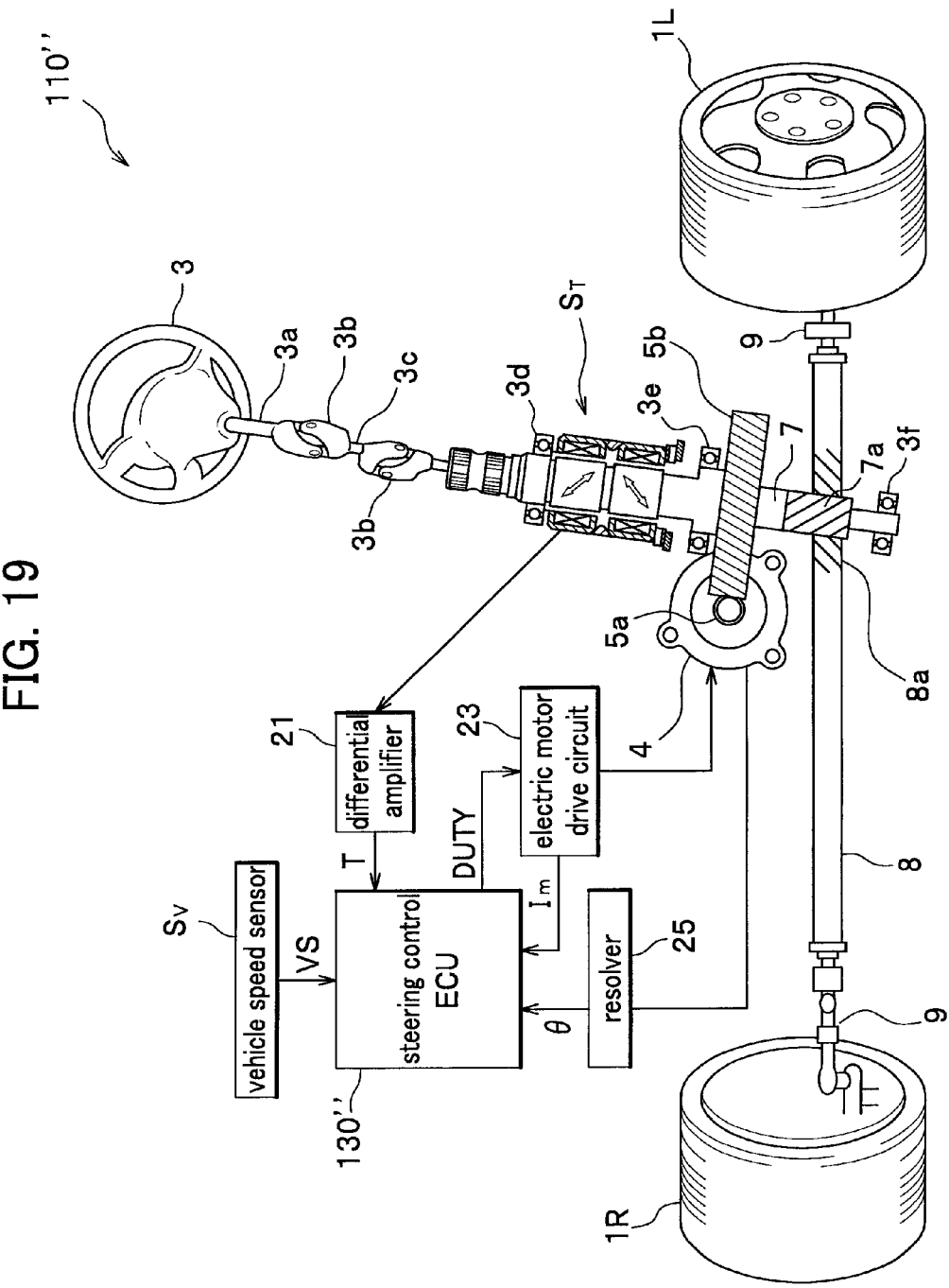
FIG. 19 is a diagram of an electric power steering device in the steering system.

FIG. 18 is a schematic diagram of a four-wheel vehicle having a steering system according to a third embodiment of the present invention. FIG. 19 is a diagram of an electric power steering device in the steering system.

1. Configuration of Steering System

As shown in FIG. 18, a steering system 100" of the third embodiment includes an electric power steering device 110", toe angle changers 120L", 120R", a steering controller (hereinbelow, referred to as "steering control ECU") 130", and various sensors, including a vehicle speed sensor $S_V$. Other components are substantially the same as in the steering system according to the first embodiment shown in FIG. 1, and when different, the component will be described.

2. Configuration of Electric Power Steering Device

The electric power steering device 110" of the present embodiment is substantially the same as the electric power steering device of the first embodiment shown in FIG. 2, except that, as shown in FIG. 19, the electric power steering device 110" includes the steering control ECUs 130".

The electric motor steering control ECU 130" of the steering system 100" has an electric power steering control part 130a" (which will be described later; see FIG. 20) as a functional part of the electric power steering device 110", which controls the driving of the electric motor 4.

3. Configuration of Toe Angle Changer

Next, a configuration of the toe angle changer will be described.

It should be noted that the toe angle changer 120L" in the present embodiment is different from the toe angle changer 120L according to the first embodiment shown in FIG. 3, in that the actuator 30, the toe angle change control ECU 37, and the steering control ECU 130 in the first embodiment are replaced with an actuator 30", a toe angle change control ECU 37" and the steering control ECU 130", respectively. The other components are the same as those in the first embodiment, and thus a duplicate description is omitted. The configurational arrangement of all components including the corresponding components is the same as that in the first embodiment (see FIG. 3), and thus the duplicate drawing and the duplicate description are omitted.

The actuator 30" in the present embodiment is the same as the actuator 30' in the second embodiment shown in FIG. 12, and thus the duplicate drawing and the duplicate description are omitted.

4. Functional Configuration of Steering Control ECU

Next, functions of the steering control ECU will be described with reference to FIGS. 20 and 6A-6C.

Figure 6C:
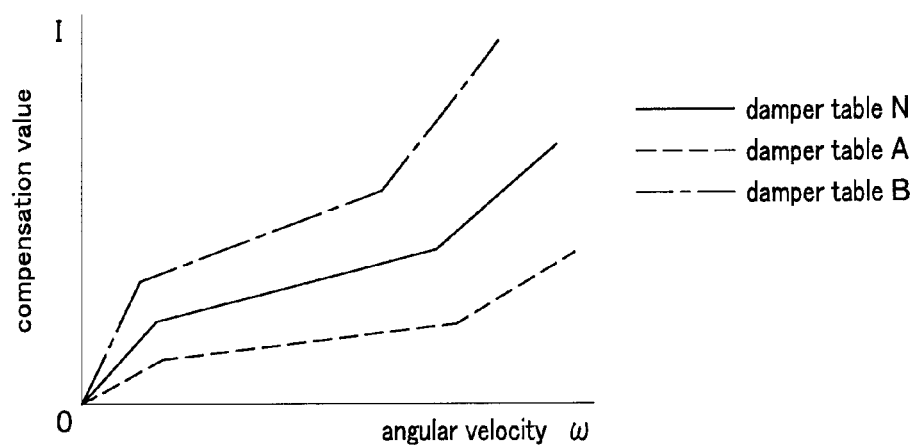
FIG. 6C is a graph showing relationships among a damper table N, a damper table A and a damper table B.
Figure 20:
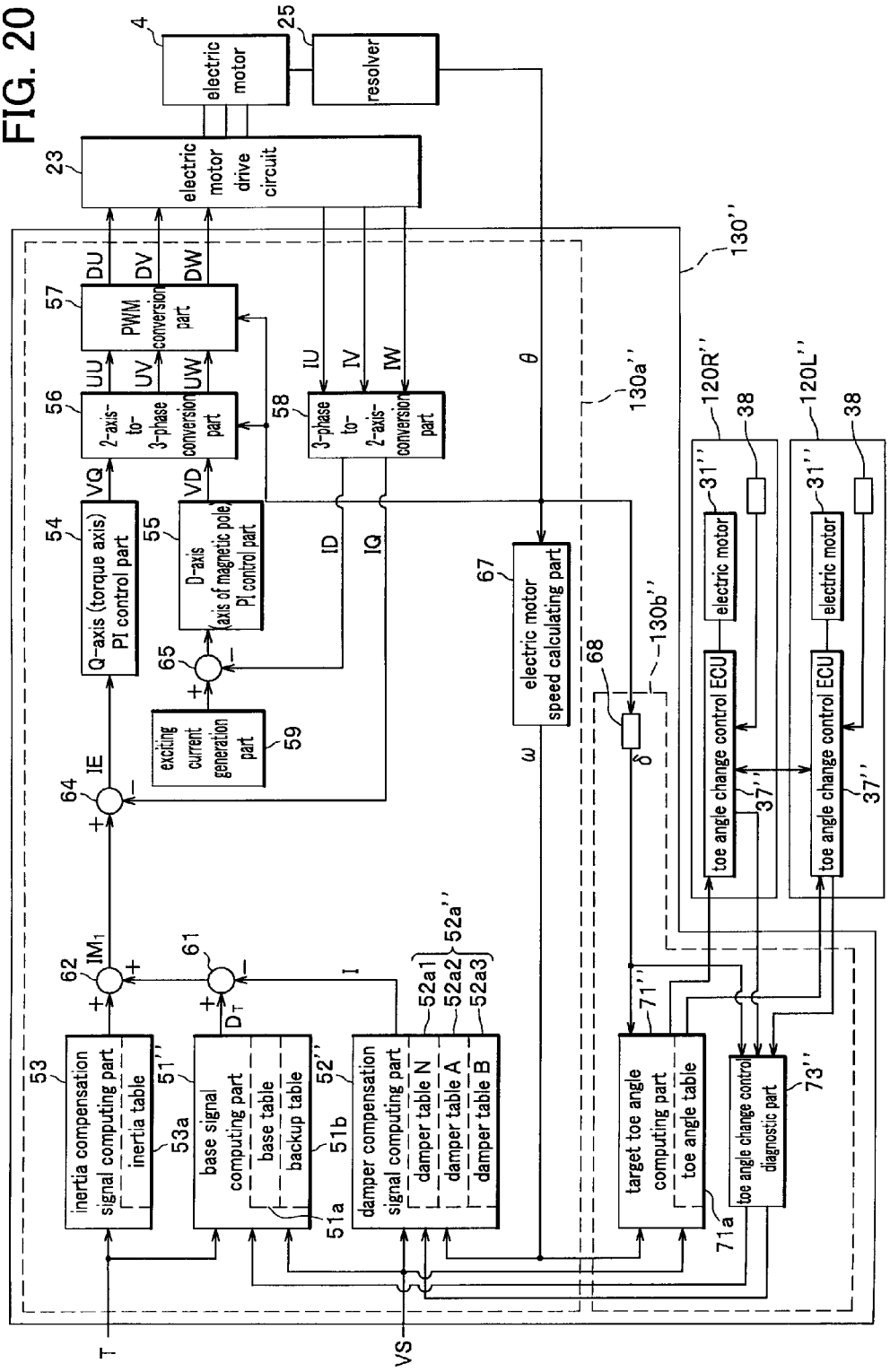
FIG. 20 is a schematic diagram of a control function of a steering control ECU and toe angle changers in the steering system according to the third embodiment.

FIG. 20 is a schematic diagram of a control function of a steering control ECU and toe angle changers in the steering system according to the third embodiment. FIG. 6A is a graph showing a function of base signal stored in a base table, FIG. 6B is a graph showing a characteristic function of a damper table, and FIG. 6C is a graph showing relationships among a damper table N, a damper table A and a damper table B.

As shown in FIG. 20, the steering control ECU 130" includes: the electric power steering control part 130a" configured to control the electric power steering device 110"; and a rear wheel toe angle control part 130b" configured to compute target toe angles of the rear wheels 2L, 2R.

(Electric Power Steering Control Part)

With respect to the electric power steering control part 130a", only the portions different from those of the first embodiment, and configurations associated therewith, will be described with reference to FIGS. 20, 6A and 6B (and FIG. 2 where appropriate).

Referring to FIG. 20, a base signal computing part 51" in the present embodiment further stores a backup table 51b, in addition to the base signal computing part 51 with the base table 51a of the first embodiment, and the base signal computing part 51" generates the base signal (target value) $D_T$ to be used as a standard reference for the target signal $IM_1$ of the output torque $T_M{}^*$, based on the torque signal T and the vehicle speed signal VS using the backup table 51b, in response to a command from a toe angle change control diagnostic part 73" (which will be described below), when the toe angle changers 120L", 120R" are in an abnormal state.

The backup table 51b has a function of the torque signal T and the vehicle speed signal VS as also shown in FIG. 6A, but the values of the gains (G1, G2) are smaller by notable amounts than those in the case of the base table 51a, for the same vehicle speed. With this setting, the auxiliary torque becomes smaller, making it easier for the driver to sense an abnormal state.

In the present embodiment, a damper compensation signal computing part 52" is introduced for compensating a viscosity in the steering unit, and for providing a steering damper function for compensating convergence of steering wheel position when convergence decreases during high-speed driving, by reading a damper table 52a" with reference to the angular velocity signal ω. In the present embodiment, in addition to a normal damper table N 52a1 (first table), which is to be referred to when the toe angle changer 120" is in a normal state, the damper table 52a" further stores a damper table A 52a2 (second table) and a damper table B 52a3 (third table) (which will be described below), which are to be referred to when the toe angle changer 120" is in an abnormal state. The damper compensation signal computing part 52" is also configured to receive information of anomaly of the toe angle changer 120" from the toe angle change control diagnostic part 73", and to switch the tables in the damper table 52a" to be referred to by the steering control ECU 130", based on the input information (see FIG. 6B for the property of the damper table, and see the first embodiment for the description thereof).

FIG. 6C is a graph showing relationships between angular velocity ω and damping compensation value I stored in the damper table N, the damper table A and the damper table B. The damper table A 52a2 shown in FIG. 20 is a table which is referred to when an anomaly, as a toe-in failure state, is detected in the toe angle changer 120, and is used for setting a smaller compensation value I than the value set by the damper table N 52a1 (see FIG. 20). Therefore, as indicated with a broken line in FIG. 6C, a proportion gain (increasing rate relative to the increase in the angular velocity ω) is set smaller as compared with the damper table N 52a1. On the other hand, the damper table B 52a3 shown in FIG. 20 is a table which is referred to when an anomaly, as a toe-out failure state, is detected in the toe angle changer 120, and is used for setting a larger compensation value I than the value set by the damper table N 52a1. Therefore, as indicated with a dashed-dotted line in FIG. 6C, a proportion gain (increasing rate relative to the increase in the angular velocity ω) is set larger as compared with the damper table N 52a1. It should be noted that the expression "toe-in failure state" herein means that a state in which the rear wheels 2 are locked in a toe-in state, while the expression "toe-out failure state" herein means that a state in which the rear wheels 2 are locked in a toe-out state.

The adder 64 is configured to subtract the Q-axis current IQ from the output signal $IM_1$ from the adder 62, and to generate a deviation signal IE (unlike the first embodiment, the electric power steering control part of the present embodiment does not have the adder 63).

(Rear Wheel Toe Angle Control Part)

Next, with respect to the rear wheel toe angle control part 130b", only the portions different from those of the second embodiment, and configurations associated therewith, will be described with reference to FIG. 20. As shown in FIG. 20, the rear wheel toe angle control part 130b" includes a front wheel turning angle computing part 68, a target toe angle computing part 71" and the toe angle change control diagnostic part 73".

The front wheel turning angle computing part 68 is configured to calculate a turning angle δ of the front wheels 1L, 1R based on the angular signal θ of the electric motor 4 output from the resolver 25, and to input the result to the target toe angle computing part 71" and the toe angle change control diagnostic part 73".

The target toe angle computing part 71" is similar to that of the target toe angle computing part 71' in the second embodiment, and the duplicate description is omitted.

The toe angle change control diagnostic part 73" is configured to receive an anomaly detection signal and a toe angle $\alpha_L$ (or $\alpha_R$) of the rear wheel 2 from a self-diagnostic part 81d" (which will be described below) of the toe angle change control ECU 37" of the toe angle changer 120L" (or 120R"). The toe angle change control diagnostic part 73" is also configured to receive a turning angle δ of the front wheel 1 output from the front wheel turning angle computing part 68 and to compare the turning angle δ with the toe angle $\alpha_L$ (or $\alpha_R$) of the rear wheel 2, in terms of direction and magnitude.

(Toe Angle Change Control ECU)

The configuration of the toe angle change control ECU 37" in the present embodiment is substantially the same as that of the toe angle change control ECU 37' in the second embodiment shown in FIG. 15, and thus the duplicate drawing and the duplicate description are omitted. Only the self-diagnostic part 81d" having a different function from that in the second embodiment, and configurations associated therewith, will be described in detail.

The self-diagnostic part (anomaly detection unit) 81d" is configured to determine whether or not an abnormal state is detected, based on a position signal of the stroke sensor 38 of the toe angle changer 120L" or the toe angle changer 120R" (to which the self-diagnostic part 81d" of interest belongs, see FIG. 18), a detection signal from a Hall element of the electric motor drive circuit 83, a temperature signal from the temperature sensor 31a, and a state monitoring of the target current calculating part 81a.

For example, the self-diagnostic part 81d" determines that a winding temperature of the electric motor 31' is in an abnormal state when the signal from the temperature sensor 31a exceeds a specific value, and inputs a specific target toe angle $\alpha_{TL}$ (or $\alpha_{TR}$), such as 0°, to the target current calculating part 81a. Herein, the target toe angles $\alpha_{TL}$ and $\alpha_{TR}$ are target toe angles regarding the left rear wheel 2L and the right rear wheel 2R, respectively, when an abnormal state is detected.

The self-diagnostic part 81d" is configured to monitor the detection signals from the target current calculating part 81a and a Hall element of the electric motor drive circuit 83, and to determine whether or not the actuator 30" is locked, based on the position signal from the stroke sensor 38: when it is determined that the actuator 30" is locked, the self-diagnostic part 81d" commands the electric motor drive circuit 83 to stop the power supply to the electric motor 31', and inputs the present toe angle $\alpha_L$ (or $\alpha_R$) as the target toe angle $\alpha_{TL}$ (or $\alpha_{TR}$) to the target current calculating part 81a, and then sends an anomaly detection signal and a signal of the above-mentioned mode made in response to the anomaly detection, to the self-diagnostic part 81d" of the other toe angle change control ECU 37".

It should be noted that, for an anomaly detection unit, a watch dog circuit may be provided as a peripheral circuit in addition to the self-diagnostic part 81d", to monitor the control part 81". In this case, when an abnormal state of the control part 81" is detected, the electric motor drive circuit 83 may be commanded to stop a power supply to the electric motor 31', and then an anomaly detection signal may be output to the self-diagnostic part 81d" of the other toe angle change control ECU 37".

In addition, the self-diagnostic part 81d" of the toe angle changer 120L" (or 120R") is configured to check whether or not there is an anomaly detection signal from the self-diagnostic part 81d" of the toe angle change control ECU 37" of the other toe angle changer 120R" (or 120L"). When the anomaly detection signal is received, the target toe angle $\alpha_{TL}$ (or $\alpha_{TR}$) is input to the target current calculating part 81a, based on a signal of the above-mentioned process mode.

In other words, the self-diagnostic part 81d" monitors a signal indicating whether or not the toe angle changer 120L" (or 120R") corresponding to the toe angle change control ECU 37" of interest is normally operated, and at the same time, monitors a signal indicating whether or not the toe angle changer 120R" (or 120L") corresponding to the other toe angle change control ECU 37" is normally operated. When one of the toe angle changers 120" is found to be in an abnormal state, both of the toe angle change control ECUs 37", 37" perform a process in the same specific mode.

Then, each self-diagnostic part 81d" sends an anomaly detection signal to the toe angle change control diagnostic part 73".

In a vehicle having the steering system 100" (see FIG. 18) including the components as described above, the damping control is performed in accordance with the steering wheel turn of the front wheel 1 by the operation of the steering wheel 3 (see FIG. 18) by the driver, as will be described below (see the drawings where appropriate).

Figure 21A:
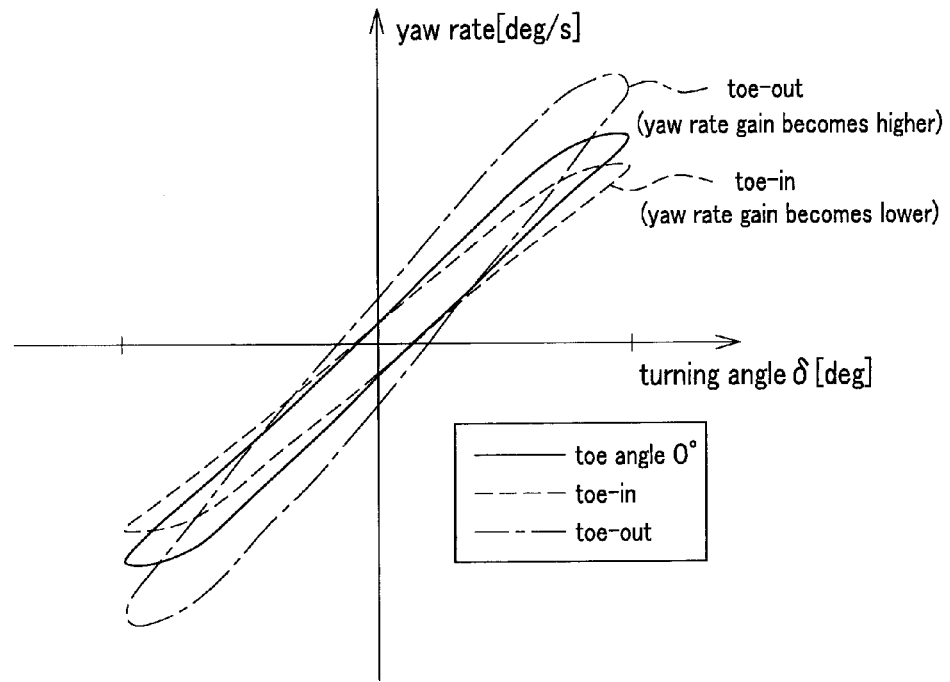
FIG. 21A is a graph showing relationships between turning angle and yaw rate for different toe angles of rear wheels, when a vehicle runs on a slalom road.
Figure 21B:
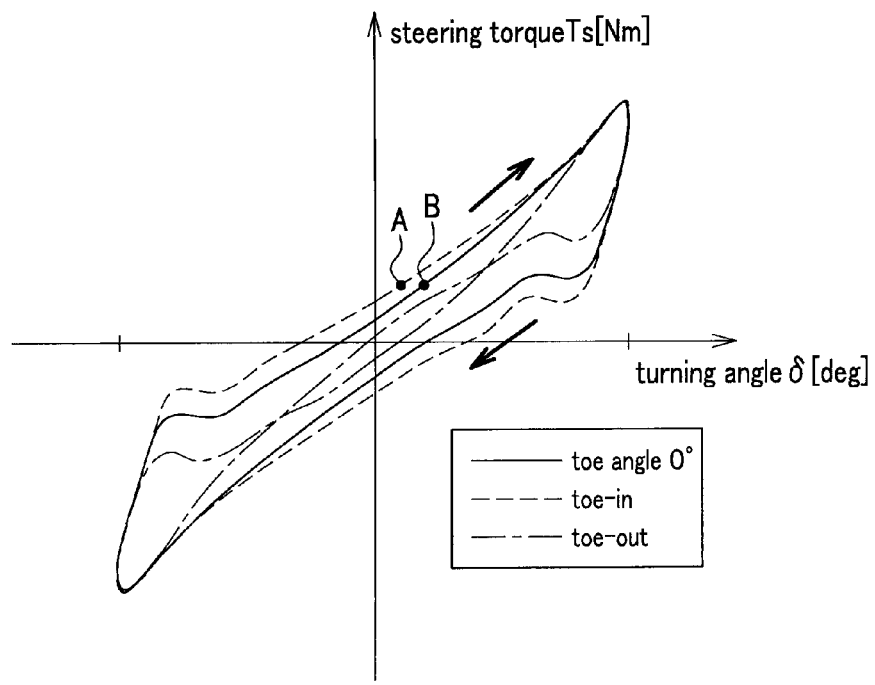
FIG. 21B is a graph showing relationships between turning angle and steering torque for different toe angles of rear wheels, when a vehicle runs on a slalom road.

FIGS. 21A and 21B show results obtained from a vehicle run on a slalom road: FIG. 21A is a graph showing relationships between turning angle and yaw rate for different toe angles of rear wheels, and FIG. 21B is a graph showing relationships between turning angle and steering torque for different toe angles of rear wheels.

As shown in FIG. 21A, when the toe angles $\alpha_L$, $\alpha_R$ of the rear wheels 2L, 2R are set as toe-in, the yaw rate relative to the turning angle δ of the front wheel 1 becomes smaller as compared with the case where the toe angles $\alpha_L$, $\alpha_R$ of the rear wheels 2L, 2R are 0°. In other words, the yaw rate gain Gγ shown as a magnitude of the yaw rate relative to the turning angle δ is lower.

Since the yaw rate gain Gγ is a magnitude of the yaw rate of the vehicle corresponding to the turning angle δ as described above, when the yaw rate gain Gγ is lower, the follow-up property of the yaw rate of the vehicle relative to the operation of the steering wheel 3 by the driver becomes lower.

Herein, when the damping control corresponding only to the turning angle δ of the front wheels 1 is performed, the damping control is performed under the assumption that the toe angles $\alpha_L$, $\alpha_R$ of the rear wheels 2L, 2R are 0°, and therefore, a phase in the case of damping control advances relative to the case of a lower yaw rate gain Gγ obtained when the toe angles $\alpha_L$, $\alpha_R$ of the rear wheels 2L, 2R are set as toe-in.

FIG. 21B is a graph showing relationships between turning angle and steering torque, when a vehicle runs on a slalom road. As the turning angle δ changes, the steering torque $T_S$ changes along a locus in the graph in a clockwise direction as indicated with arrows. As shown in FIG. 21B, when the rear wheels 2 are toed in, the locus thereof (indicated with a broken line in the graph) locates outside a locus in the case where the toe angles $α_L$, $α_R$ of the rear wheels 2L, 2R are 0° (indicated with a solid line in the graph).

In FIG. 21B, it is assumed that the turning angle δ is oriented in a positive direction, and that a point A on the broken line and a point B on the solid line are the same in terms of the steering torque $T_S$. With respect to the turning angle δ, the point B is larger than the point A. To put it another way, the steering torque $T_S$ corresponding to the arbitrary turning angle δ (point B) in the case where the toe angle of the rear wheel 2 is 0° will have a corresponding smaller turning angle δ (point A) than that in the case where the toe angle is 0°, if the rear wheels 2 are made toed in. Since both of the point A and the point B are on their respective locus for the positive direction, i.e., the direction of steering that makes the turning angle δ larger, when the rear wheels 2 are made toed in, the follow-up of the steering torque $T_S$ in accordance with the change in the turning angle δ shows that the phase advances more relative to the case where the toe angles $α_L$, $α_R$ of the rear wheels 2L, 2R are 0°. When the rear wheel 2 are made toed out, the follow-up of the steering torque $T_S$ in accordance with the change in the turning angle δ shows that the phase delays more relative to the case where the toe angles $α_L$, $α_R$ of the rear wheels 2L, 2R are 0°.

Here, it is assumed that the toe angle changer 120" is in an abnormal state. When the toe angle changer 120" is in an abnormal state, the rear wheel 2 is locked in any one of states among a toe-in state (toe-in failure), a toe-out state (toe-out failure) or a state where the rear wheels 2L, 2R are oriented in the same direction.

When the rear wheels 2L, 2R are oriented in the same direction, the follow-up property of the steering torque $T_S$ in accordance with a change in the turning angle δ changes, depending on the direction of the turning angle δ of the front wheels 1. That is, when the rear wheels 2L, 2R and the front wheels 1 are oriented in the same direction (i.e., when the front wheels 1 and the rear wheels 2 are in the same phase), the follow-up property of the steering torque $T_S$ in accordance with the change in the turning angle δ becomes the same as in the case where the rear wheels 2 are toed in (in a toe-in failure state). On the other hand, when the rear wheels 2L, 2R and the front wheels 1 are oriented in the opposite direction (i.e., when the front wheels 1 and the rear wheels 2 are in antiphase), the follow-up property of the steering torque $T_S$ in accordance with the change in the turning angle δ becomes the same as in the case where the rear wheels 2 are toed out (in a toe-out failure state).

As described above, when the toe angle changer 120" is in an abnormal state, as a toe-in failure state or a toe-out failure state, the follow-up property of the steering torque $T_S$ in accordance with the change in the turning angle δ, especially the damping property, is different from those of the toe angle changer 120" in a normal state, and as a result, unnatural steering feeling may be given to the driver.

Specifically, when the toe angle changer 120" is in a toe-in failure state and the phase of the steering torque $T_S$ relative to the turning angle δ advances, it is necessary to delay the phase of the steering torque $T_S$. In other words, the phase of the turning angle δ is to be advanced.

Therefore, in the present embodiment, when the toe angle changer 120" is in a toe-in failure state, a compensation value I is made smaller than that in the case where the toe angle changer 120" is in a normal state, to thereby make the viscosity in the steering unit smaller. Accordingly, the steering unit becomes lighter, and the phase of the turning angle δ can be advanced.

Therefore in the present embodiment, as shown in FIG. 20, the damper compensation signal computing part 52" stores the damper table A 52a2 for setting a smaller compensation value I than that in the case where the toe angle changer 120" is in a normal state. When the changer 120" is in a toe-in failure state, the viscosity in the steering unit can be made smaller to obtain a suitable steering feeling, by performing a damping control using the compensation value I set with reference to the damper table A 52a2.

On the other hand, when the toe angle changer 120" is in a toe-out failure state and the phase of the steering torque $T_S$ relative to the turning angle δ delays, it is necessary to advance the phase of the steering torque $T_S$. In other words, the phase of the turning angle δ is to be delayed.

Therefore, in the present embodiment, when the toe angle changer 120" is in a toe-out failure state, a compensation value I is made larger than that in the case where the toe angle changer 120" is in a normal state, to thereby make the viscosity in the steering unit larger. Accordingly, the steering unit becomes heavier, and the phase of the turning angle δ can be delayed.

Therefore in the present embodiment, as shown in FIG. 20, the damper compensation signal computing part 52" stores the damper table B 52a3 for setting a larger compensation value I than that in the case where the toe angle changer 120" is in a normal state. When the toe angle changer 120" is in a toe-out failure state, the viscosity in the steering unit can be made larger to obtain a suitable steering feeling, by performing a damping control using the compensation value I set with reference to the damper table B 52a3.

In addition, in the case where the rear wheels 2L, 2R are oriented in the same direction, and when the front wheels 1 and the rear wheels 2 are in the same phase, it has been known that the properties become the same as those in the case where the toe angle changer 120" is in a toe-in failure state, as described above. On the other hand, when the front wheels 1 and the rear wheels 2 are in antiphase, it has been known that the properties become the same as those in the case where the toe angle changer 120" is in a toe-out failure state. Accordingly, when the front wheels 1 and the rear wheels 2 are in the same phase, the compensation value I is set in accordance with the setting property that the increment in the compensation value I (which increases as the angular velocity ω increases) is made smaller than that in the case where the angle changer 120" is in a normal state. When the front wheels 1 and the rear wheels 2 are in antiphase, the compensation value I is set in accordance with the setting property that the increment in the compensation value I (which increases as the angular velocity ω increases) is made larger than that in the case where the toe angle changer 120" is in a normal state.

As described above, in the present embodiment, in addition to the damper table N 52a1 to be referred to by the steering control ECU 130" when the toe angle changer 120" is in a normal state, the damper compensation signal computing part 52" shown in FIG. 20 includes: the damper table A 52a2 to be referred to by the steering control ECU 130" when the toe angle changer 120" is in a toe-in failure state; and the damper table B 52a3 to be referred to by the steering control ECU 130" when the toe angle changer 120" is in a toe-out failure state. The damping control of the steering damper is performed with switching the damper tables in accordance with the state of the toe angle changer 120".

Specifically, when the toe angle changer 120" (see FIG. 20) is in a toe-in failure state, the steering control ECU 130" refers to the damper table A 52a2 to set the compensation value I, and when the toe angle changer 120" is in a toe-out failure state, the steering control ECU 130" refers to the damper table B 52a3 to set the compensation value I. In this manner, by switching the damper tables to be referred to, there can be obtained an excellent effect that, when the toe angle changer 120" is in a toe-in failure state during vehicle turn, the viscosity in the steering unit is made smaller, and when the toe angle changer 120" is in a toe-out failure state during vehicle turn, the viscosity in the steering unit is made larger.

Figure 22:
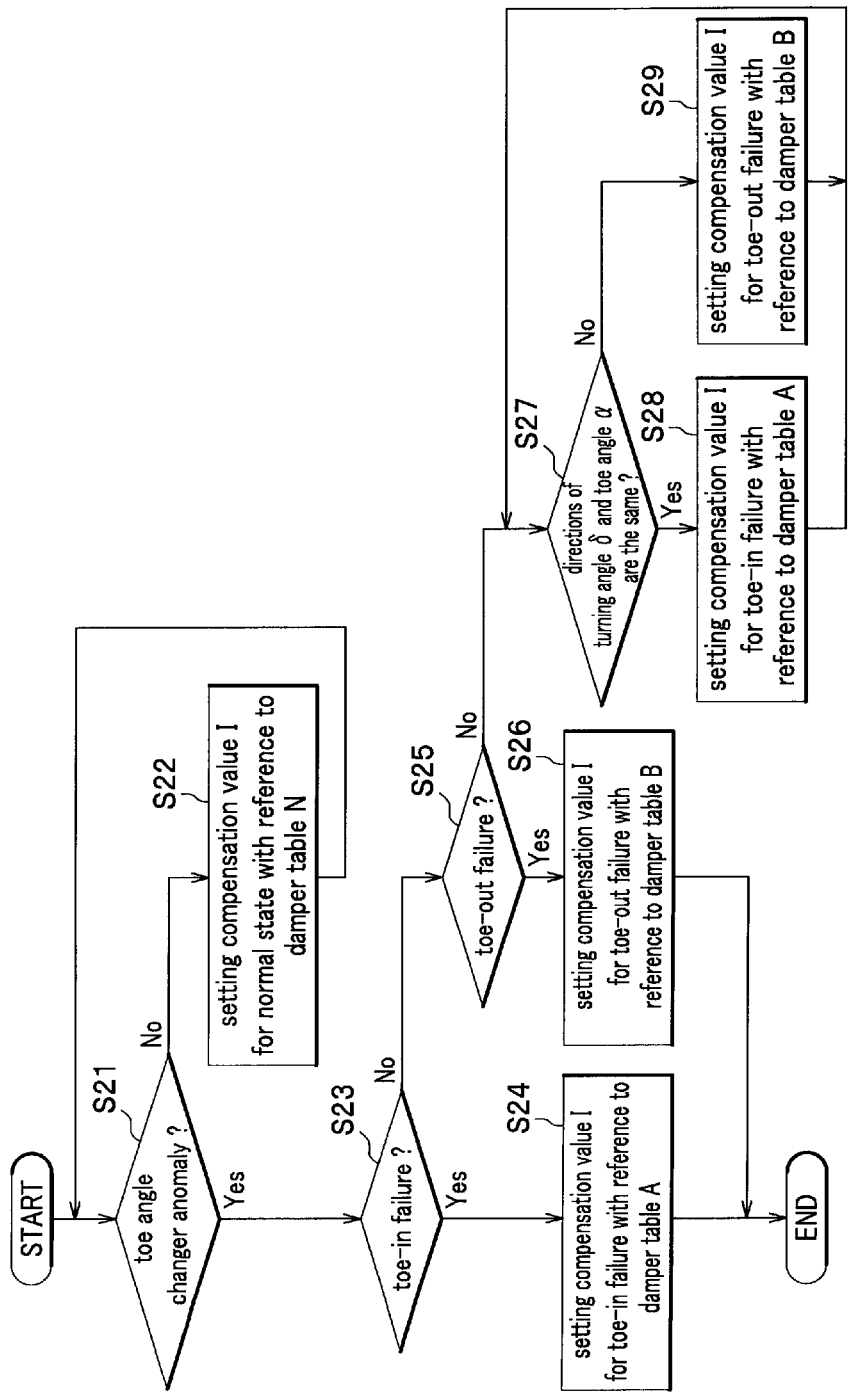
FIG. 22 is a flow chart showing a control in which a steering control ECU detects an anomaly of the toe angle changer and a compensation value for damping control is set.

FIG. 22 is a flow chart showing a control in which the steering control ECU detects an anomaly of the toe angle changer and a compensation value for damping control is set (see the drawings where appropriate).

As shown in FIG. 22, when the steering control ECU 130" determines that the toe angle changer 120" is not in an abnormal state (No at a step S21), the steering control ECU 130" sets a compensation value I for damping in a normal state by referring to the damper table N 52a1 (step S22), and the procedure returns to the step S21.

On the other hand, when the steering control ECU 130" determines that the toe angle changer 120" is in an abnormal state (Yes at the step S21), it is further determined whether or not there is a toe-in failure state (step S23).

As described above, the toe angle change control ECU 37" has the self-diagnostic part 81d", with which anomaly of the toe angle changer 120" can be detected. Accordingly, by inputting the anomaly detection signal from the self-diagnostic part 81d" to the steering control ECU 130", the steering control ECU 130" can detect anomaly in the toe angle changer 120". Therefore, it can be determined whether or not the toe angle changer 120" is in an abnormal state.

The toe angle change control ECU 37" can detect the toe angle α of the rear wheel 2 by the stroke sensor 38 equipped in the actuator 30" of the toe angle changer 120". Therefore, by inputting the toe angle $α_L$ of the rear wheel 2L from the toe angle change control ECU 37" of the toe angle changer 120L" to the steering control ECU 130", the steering control ECU 130" can detect the toe angle $α_L$ of the rear wheel 2L. In the same manner, the steering control ECU 130" can detect the toe angle $α_R$ of the rear wheel 2R. When both of the toe angle $α_L$ of the rear wheel 2L and the toe angle $α_R$ of the rear wheel 2R are oriented inward relative to the vehicle (when the rear wheels are toed in), the steering control ECU 130" determines that the toe angle changer 120" is in a toe-in failure state.

In the step S23, when it is determined that the toe angle changer 120" is in a toe-in failure state (Yes at the step S23), the steering control ECU 130" sets a compensation value I for damping in a toe-in failure state by referring to the damper table A 52a2 (step S24), and the procedure is terminated.

Referring again to the step S23, when it is determined that the toe angle changer 120" is not in a toe-in failure state (No at the step S23), the steering control ECU 130" determines whether or not the toe angle changer 120" is in a toe-out failure state (step S25).

Herein, when both of the toe angle $α_L$ of the rear wheel 2L and the toe angle $α_R$ of the rear wheel 2R are oriented outward relative to the vehicle (when the rear wheels are toed out), the steering control ECU 130" determines that the toe angle changer 120" is in a toe-out failure state. When both of the toe angle $α_L$ of the rear wheel 2L and the toe angle $α_R$ of the rear wheel 2R are oriented in the same direction, the steering control ECU 130" determines that the toe angle changer 120" is not in a toe-out failure state.

Then, in the step S25, when it is determined that the toe angle changer 120" is in a toe-out failure state (Yes at the step S25), the steering control ECU 130" sets a compensation value I for damping in a toe-out failure state by referring to the damper table B 52a3 (step S26), and the procedure is terminated.

Referring again to the step S25, when it is determined that the toe angle changer 120" is not in a toe-out failure state (No at the step S25), the steering control ECU 130" determines that the rear wheels 2L, 2R are oriented in the same direction, and compares the turning angle δ of the front wheels 1 and the toe angle α of the rear wheels 2. When it is determined that the directions of the turning angle δ and the toe angle α are the same (Yes at a step S27), the steering control ECU 130" sets a compensation value I for damping in a toe-in failure state by referring to the damper table A 52a2 (step S28); when it is determined that the directions of the turning angle δ and toe angle α are not the same (No at the step S27), the steering control ECU 130" sets a compensation value I for damping in a toe-out failure state by referring to the damper table B 52a3 (step S29). Then, the procedure is returned to the step S27, in order for the steering control ECU 130" to set a compensation value I for damper in accordance with a change in the turning angle δ.

In this manner, when the toe angle changer 120" is in an abnormal state and the rear wheels 2L, 2R (see FIG. 18) are oriented in the same direction, the damper table 52a" to be referred to is switched as needed in accordance with the direction of the turning angle δ of the front wheels 1 (see FIG. 18). As a result, the compensation value for damping can be altered, leading to an excellent effect of always imparting a suitable steering feeling to the driver.

As described above, in the present embodiment, the damper tables to be referred to are switched depending on the state of the toe angle changer 120" among a non-failure (normal) state, a toe-in failure state and a toe-out failure state. In other words, when the toe angle changer 120" is in a toe-in failure state, the viscosity in the steering unit is made smaller by setting a smaller compensation value I for damping control than usual; when in a toe-out failure state, the viscosity in the steering unit is made larger by setting a larger compensation value I than usual. As a result, it can be obtained an excellent effect of imparting a natural steering feeling to the driver, even when the toe angle changer 120" is in an abnormal state.

Fourth Embodiment

In a fourth embodiment, a value of the base signal $D_T$ output by the base signal computing part 51" of the steering control ECU 130" (see FIG. 20) is altered, when the toe angle changer 120" (see FIG. 18) of the steering system 100" (see FIGS. 18 and 19) having the same configuration as that of the third embodiment is in an abnormal state.

As described above, when the toe angle changer 120" (see FIG. 18) is in a toe-in failure state, the phase of the steering torque $T_S$ relative to the turning angle δ advances. Therefore, by advancing the phase of the turning angle δ to follow-up the phase of the steering torque $T_S$, a natural steering feeling can be given to the driver. In addition, when the toe angle changer 120" is in a toe-out failure state, the phase of the steering torque $T_S$ relative to the turning angle δ delays. Therefore, by delaying the phase of the turning angle δ to follow-up the phase of the steering torque $T_S$, a natural steering feeling can be given to the driver.

Accordingly, in the fourth embodiment, when an anomaly is detected in the toe angle changer, in the case where the rear wheels are in a toe-in state, the target value of the auxiliary torque can be made larger; while in the case where the rear wheels are in a toe-out state, the target value of the auxiliary torque can be made smaller.

Specifically, when the toe angle changer 120" (see FIG. 18) is in a toe-in failure state, the steering control ECU 130" (see FIG. 18) sets the target value of the auxiliary torque for assisting the steering torque $T_S$ of the electric power steering device 110" (see FIG. 19) to be larger. In other words, the base signal for obtaining the auxiliary torque having the set target value is set larger. By setting the target value of the auxiliary torque to be larger, the auxiliary torque to be added to the steering torque $T_S$ becomes larger. Accordingly, the steering unit becomes lighter, and the phase of the turning angle δ can be advanced.

On the hand, when the toe angle changer 120" is in a toe-out failure state, the steering control ECU 130" sets the target value of the auxiliary torque for assisting the steering torque $T_S$ of the electric power steering device 110" to be small. In other words, the base signal for obtaining the auxiliary torque having the set target value is set smaller. By setting the target value of the auxiliary torque to be smaller, the auxiliary torque to be added to the steering torque $T_S$ becomes smaller. Accordingly, the steering unit becomes heavier, and the phase of the turning angle δ can be delayed.

Figure 23:
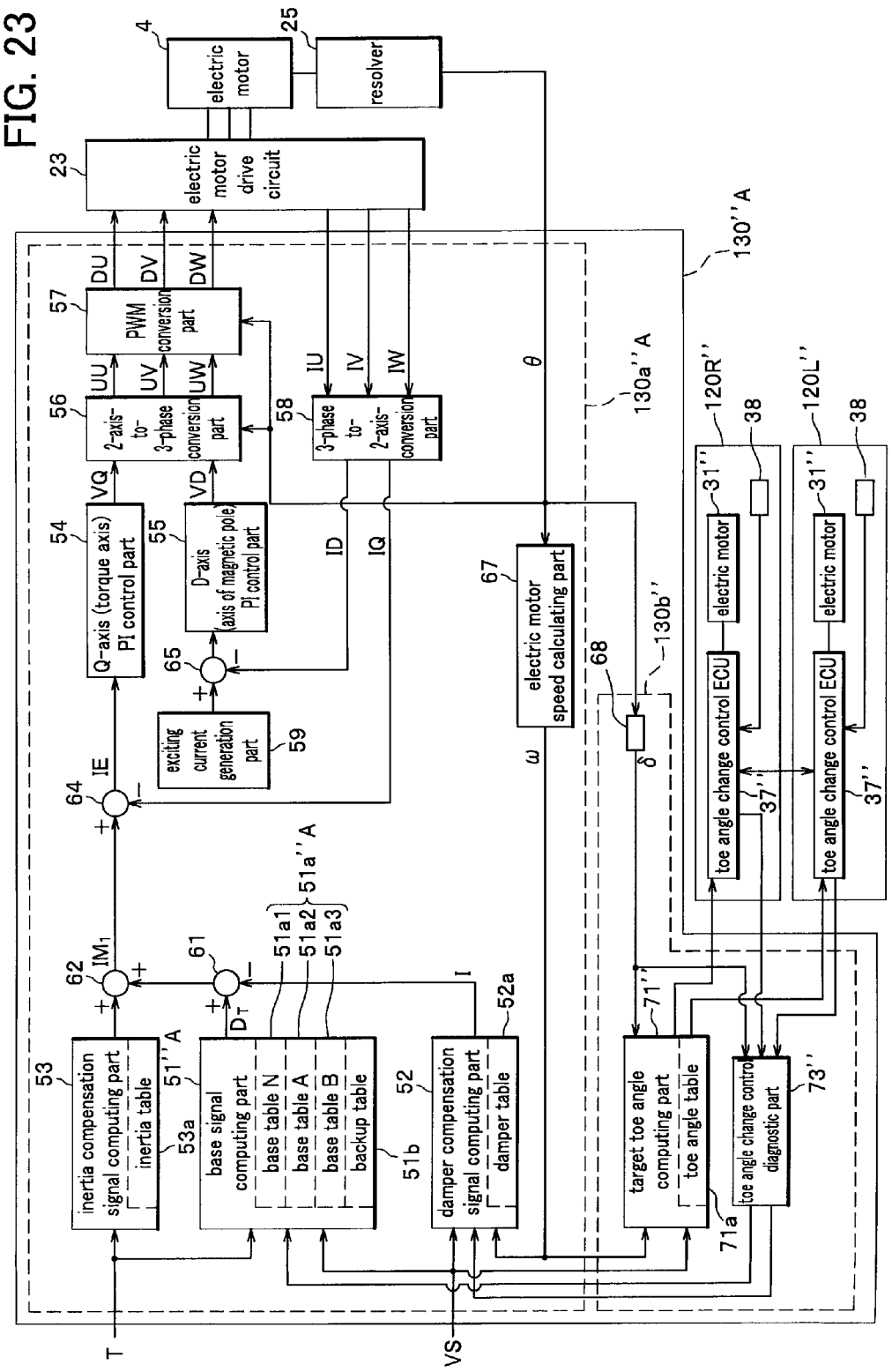
FIG. 23 is a schematic diagram of a control function of a steering control ECU and toe angle changers in the steering system according to a fourth embodiment.

FIG. 23 is a schematic diagram of a control function of a steering control ECU and toe angle changers in the steering system according to the fourth embodiment. In FIG. 23, components which are the same as those illustrated in the third embodiment are designated with the same reference characters, and thus a duplicate description is omitted.

As shown in FIG. 23, in the steering control ECU 130"A according to the fourth embodiment, in addition to a base table N 51a1 (fourth table) and a backup table 51b, the base signal computing part 51"A further stores a base table A 51a2 (fifth table) and a base table B 51a3 (sixth table). The base signal computing part 51"A is configured to receive information of anomaly of the toe angle changer 120" from the toe angle change control diagnostic part 73" and to switch the tables in the base table 51a"A to be referred to by the steering control ECU 130"A, based on the input information. The base table A 51a2 is a table to be referred to by the steering control ECU 130"A when the toe angle changer 120" is in a toe-in failure state, in which table the rate of increase in the base signal $D_T$ in accordance with the increase in the torque signal T is larger than that in the base table N 51a1 shown in FIG. 6A.

When the toe angle changer 120" is in a toe-in failure state, the steering control ECU 130"A refers to the base table A 51a2 and sets a base signal $D_T$ corresponding to the torque signal T, to thereby set a base signal $D_T$ larger than that in a case where the toe angle changer 120" is in a normal state.

The base table B 51a3 is a table to be referred to by the steering control ECU 130"A when the toe angle changer 120" is in a toe-out failure state, in which table the rate of increase in the base signal $D_T$ in accordance with the increase in the torque signal T is smaller than that in the base table N 51a1.

When the toe angle changer 120" is in a toe-out failure state, the steering control ECU 130"A refers to the base table B 51a3 and sets a base signal $D_T$ corresponding to the torque signal T, to thereby set a base signal $D_T$ smaller than that in a case where the toe angle changer 120" is in a normal state.

Figure 24:
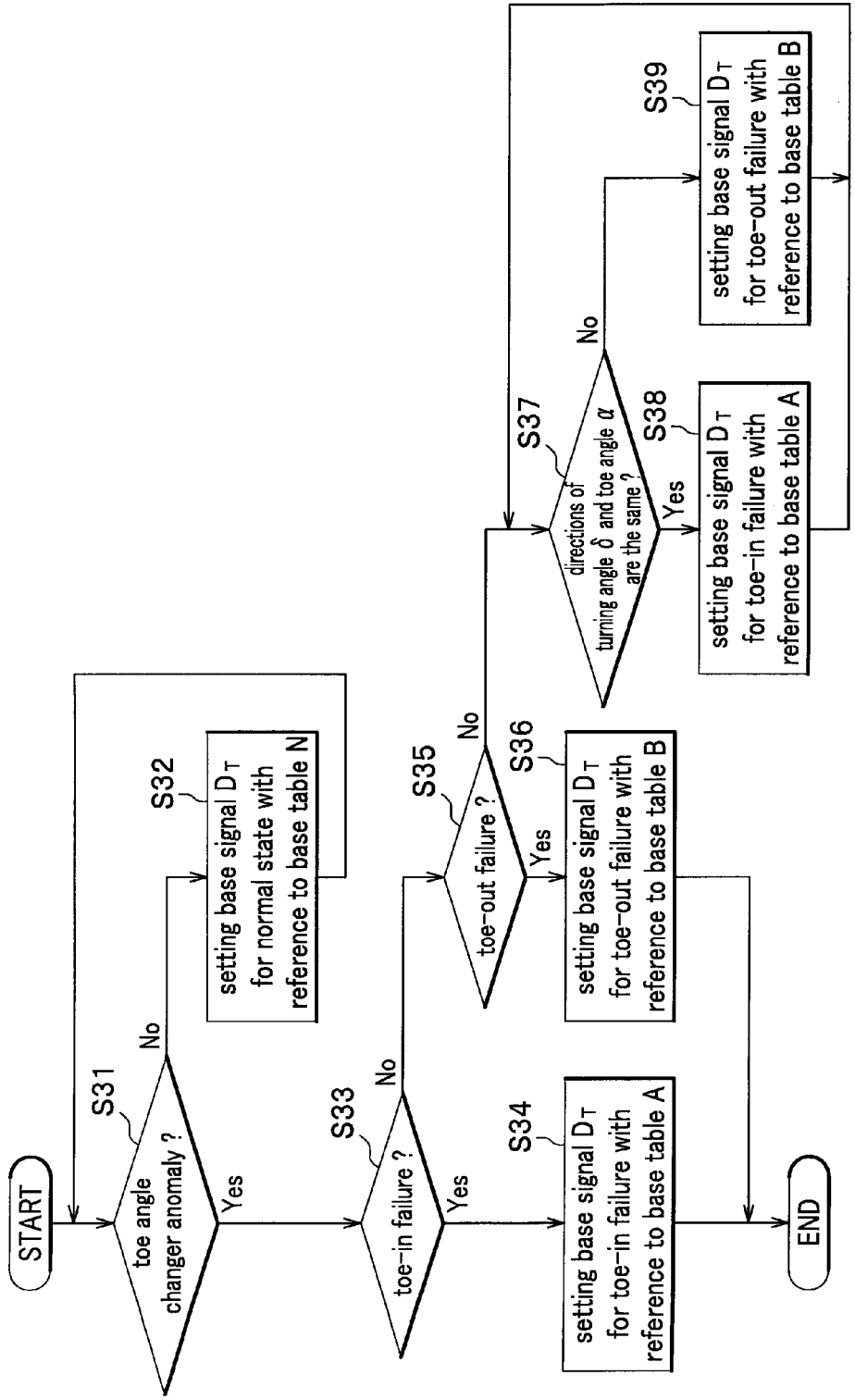
FIG. 24 is a flow chart showing a control in which a steering control ECU detects an anomaly of the toe angle changer and a base signal is set.

FIG. 24 is a flow chart showing a control in which the steering control ECU detects an anomaly of the toe angle changer and a base signal is set (see the drawings where appropriate).

As shown in FIG. 24, when the steering control ECU 130"A determines that the toe angle changer 120" is not in an abnormal state (No at a step S31), the steering control ECU 130"A sets a base signal $D_T$ for a normal state by referring to the base table N 51a1 (step S32), and the procedure returns to the step S31.

On the other hand, when the steering control ECU 130"A determines that the toe angle changer 120" is in an abnormal state (Yes at the step S31), it is further determined whether or not there is a toe-in failure state (step S33).

As described above, the toe angle change control ECU 37" has the self-diagnostic part 81d", with which anomaly of the toe angle changer 120" can be detected. Accordingly, by inputting the anomaly detection signal from the self-diagnostic part 81d" to the steering control ECU 130"A, the steering control ECU 130"A can detect anomaly in the toe angle changer 120". Therefore, it can be determined whether or not the toe angle changer 120" is in an abnormal state.

The toe angle change control ECU 37" can detect the toe angle α of the rear wheel 2 by the stroke sensor 38 equipped in the actuator 30" of the toe angle changer 120". Therefore, by inputting the toe angle $α_L$ of the rear wheel 2L from the toe angle change control ECU 37" of the toe angle changer 120L" to the steering control ECU 130"A, the steering control ECU 130"A can detect the toe angle $α_L$ Of the rear wheel 2L. In the same manner, the steering control ECU 130"A can detect the toe angle $α_R$ of the rear wheel 2R. When both of the toe angle $α_L$ of the rear wheel 2L and the toe angle $α_R$ of the rear wheel 2R are oriented inward relative to the vehicle (when the rear wheels are toed in), the steering control ECU 130"A determines that the toe angle changer 120" is in a toe-in failure state.

In the step S33, when it is determined that the toe angle changer 120" is in toe-in failure state (Yes at the step S33), the steering control ECU 130"A sets a base signal $D_T$ for a toe-in failure state by referring to the base table A 51a2 (step S34), and the procedure is terminated.

Referring again to the step S33, when it is determined that the toe angle changer 120" is not in a toe-in failure state (No at the step S33), the steering control ECU 130"A determines whether or not the toe angle changer 120" is in a toe-out failure state (step S35).

Herein, when both of the toe angle $α_L$ of the rear wheel 2L and the toe angle $α_R$ of the rear wheel 2R are oriented outward relative to the vehicle (when the rear wheels are toed out), the steering control ECU 130"A determines that the toe angle changer 120" is in a toe-out failure state. When both of the toe angle $α_L$ of the rear wheel 2L and the toe angle $α_R$ of the rear wheel 2R are oriented in the same direction, the steering control ECU 130"A determines that the toe angle changer 120" is not in a toe-out failure state.

Then, in the step S35, when it is determined that the toe angle changer 120" is in toe-out failure state (Yes at the step S35), the steering control ECU 130"A sets a base signal $D_T$ for a toe-out failure state by referring to the base table B 51a3 (step S36), and the procedure is terminated.

Referring again to the step S35, when it is determined that the toe angle changer 120" is not in toe-out failure state (No at the step S35), the steering control ECU 130"A determines that the rear wheels 2L, 2R are oriented in the same direction, and compares the turning angle δ of the front wheels 1 and the toe angle α of the rear wheels 2. When it is determined that the directions of the turning angle δ and the toe angle α are the same (Yes at the step S37), the steering control ECU 130"A sets a base signal $D_T$ for a toe-in failure state by referring to the base table A 51a2 (step S38); when it is determined that the directions of the turning angle δ and toe angle α are not the same (No at the step S37), the steering control ECU 130"A sets a base signal $D_T$ for a toe-out failure state by referring to the base table B 51*a*3 (step S39). Then, the procedure is returned to the step S37, in order for the steering control ECU 130"A to set a base signal D in accordance with a change in the turning angle δ.

As described above, in the fourth embodiment, the base tables to be referred to are switched depending on the state of the toe angle changer 120" among a non-failure (normal) state, a toe-in failure state and a toe-out failure state. In other words, when the toe angle changer 120" is not in an abnormal state, the steering control ECU 130"A refers to the base table N 51*a*1 and sets a normal base signal $D_T$. When the toe angle changer 120" is in a toe-in failure state, the steering control ECU 130"A refers to the base table A 51*a*2 to set a larger base signal $D_T$ than usual, to thereby make the auxiliary torque to be added to the steering torque $T_S$ larger. On the other hand, when the toe angle changer 120" is in a toe-out failure state, the steering control ECU 130"A refers to the base table B 51*a*3 to set a smaller base signal $D_T$ than usual.

In this manner, when the toe angle changer 120" is in a toe-in failure state, by making the auxiliary torque larger, the effect which is equivalent to that obtained when the viscosity in the steering unit is made smaller can be obtained; when the toe angle changer 120" is in a toe-out failure state, by making the auxiliary torque smaller, the effect which is equivalent to that obtained when the viscosity in the steering unit is made larger can be obtained. As a result, it can be obtained an effect equivalent to the third embodiment of imparting a natural steering feeling to the driver, even when the toe angle changer 120" is in an abnormal state.

When the toe angle changer 120" is in an abnormal state and the rear wheels 2L, 2R (see FIG. 18) are oriented in the same direction, the tables to be referred to are switched in accordance with the direction of the turning angle δ of the front wheels 1.

When the front wheels 1 and the rear wheels 2 are oriented in the same direction (i.e. in the same phase), since the properties become the same as in the case of a toe-in failure state as described above, the steering control ECU 130"A refers to the base table A 51*a*2 to set the base signal $D_T$. On the other hand, when the front wheels 1 and the rear wheels 2 are oriented in the opposite direction (i.e., in antiphase), since the properties become the same as in the case of a toe-out failure state as described above, the steering control ECU 130"A refers to the base table B 51*a*3 to set the base signal $D_T$.

In this manner, when the toe angle changer 120" is in an abnormal state and the rear wheels 2L, 2R (see FIG. 18) are oriented in the same direction, the base table 51*a*"A to be referred to is switched as needed in accordance with the direction of the turning angle δ of the front wheels 1 (see FIG. 18). As a result, the target value of the auxiliary torque can be altered, leading to an excellent effect of always imparting a suitable steering feeling to the driver.

Fifth Embodiment

A fifth embodiment of the present invention will be described with reference to FIGS. 3, 12, 15, 16 and 25-30. It should be noted that components which are the same as those illustrated in the above-mentioned embodiments are designated with the same reference characters, and thus a duplicate description is omitted, and that components which are equivalent, corresponding or similar to those illustrated in the above-mentioned embodiments, are designated with the same reference characters with a triple prime ("'"), and will be described in detail when necessary.

Figure 25:
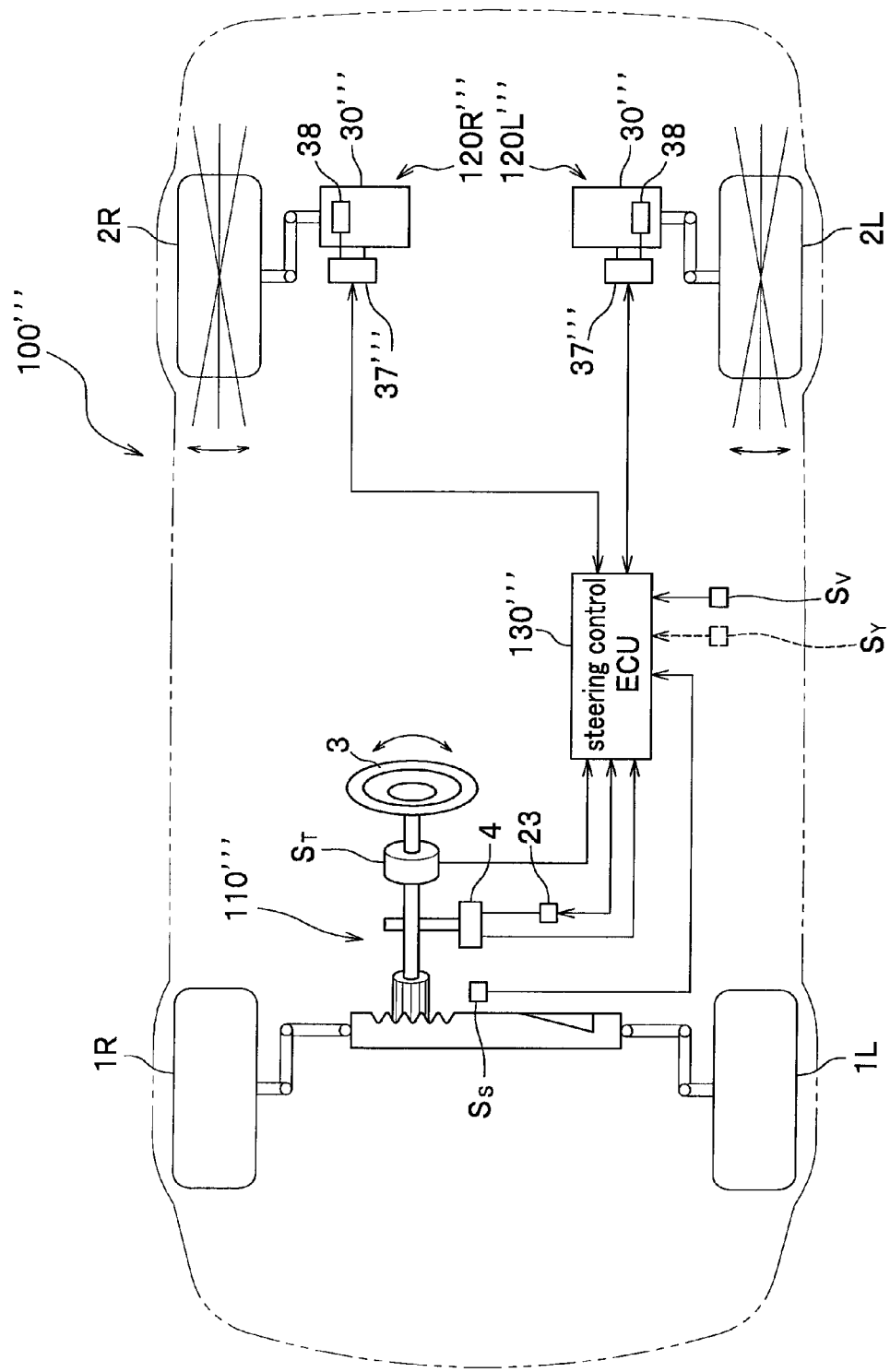
FIG. 25 is a schematic diagram of a four-wheel vehicle having a steering system according to a fifth embodiment of the present invention.

FIG. 25 is a schematic diagram of a four-wheel vehicle having a steering system according to a fifth embodiment of the present invention. In the description of the steering system according to the fifth embodiment, an actuator of the power steering device is represented by an electric power steering device using an electric motor for the illustration purpose.

1. Configuration of Steering System

As shown in FIG. 25, a steering system 100''' of the fifth embodiment includes an electric power steering device 110''', toe angle changers 120L''', 120R''', a steering controller (hereinbelow, referred to as "steering control ECU") 130''', and various sensors including a front wheel turning angle sensor $S_S$ and a vehicle speed sensor $S_V$. Other components are substantially the same as in the steering system according to the first embodiment shown in FIG. 1, and when different, the component will be described.

2. Configuration of Electric Power Steering Device

The electric power steering device 110''' of the present embodiment is substantially the same as the electric power steering device of the second embodiment shown in FIG. 11, except that the electric power steering device 110''' includes steering control ECUs 130'''.

The electric motor steering control ECU 130''' of the steering system 100''' has an electric power steering control part 130*a*''' (which will be described below; see FIG. 26) as a functional part of the electric power steering device 110''', which controls the driving of the electric motor 4.

3. Configuration of Toe Angle Changer

Next, a configuration of the toe angle changer will be described.

It should be noted that the toe angle changer 120L''' in the present embodiment is different from the toe angle changer 120L according to the first embodiment shown in FIG. 3, in that the actuator 30, the toe angle change control ECU 37, and the steering control ECU 130 in the first embodiment are replaced with an actuator 30''', a toe angle change control ECU 37''' and the steering control ECU 130''', respectively. The other components are the same as those in the first embodiment and thus a duplicate description is omitted. The configurational arrangement of all components including the corresponding components is the same as that in the first embodiment (see FIG. 3), and thus the duplicate drawing and the duplicate description are omitted.

The actuator 30''' in the present embodiment is the same as the actuator 30' in the second embodiment shown in FIG. 12, and thus the duplicate drawing and the duplicate description are omitted.

4. Functional Configuration of Steering Control ECU

Next, functions of the steering control ECU will be described with reference to FIG. 26.

Figure 26:
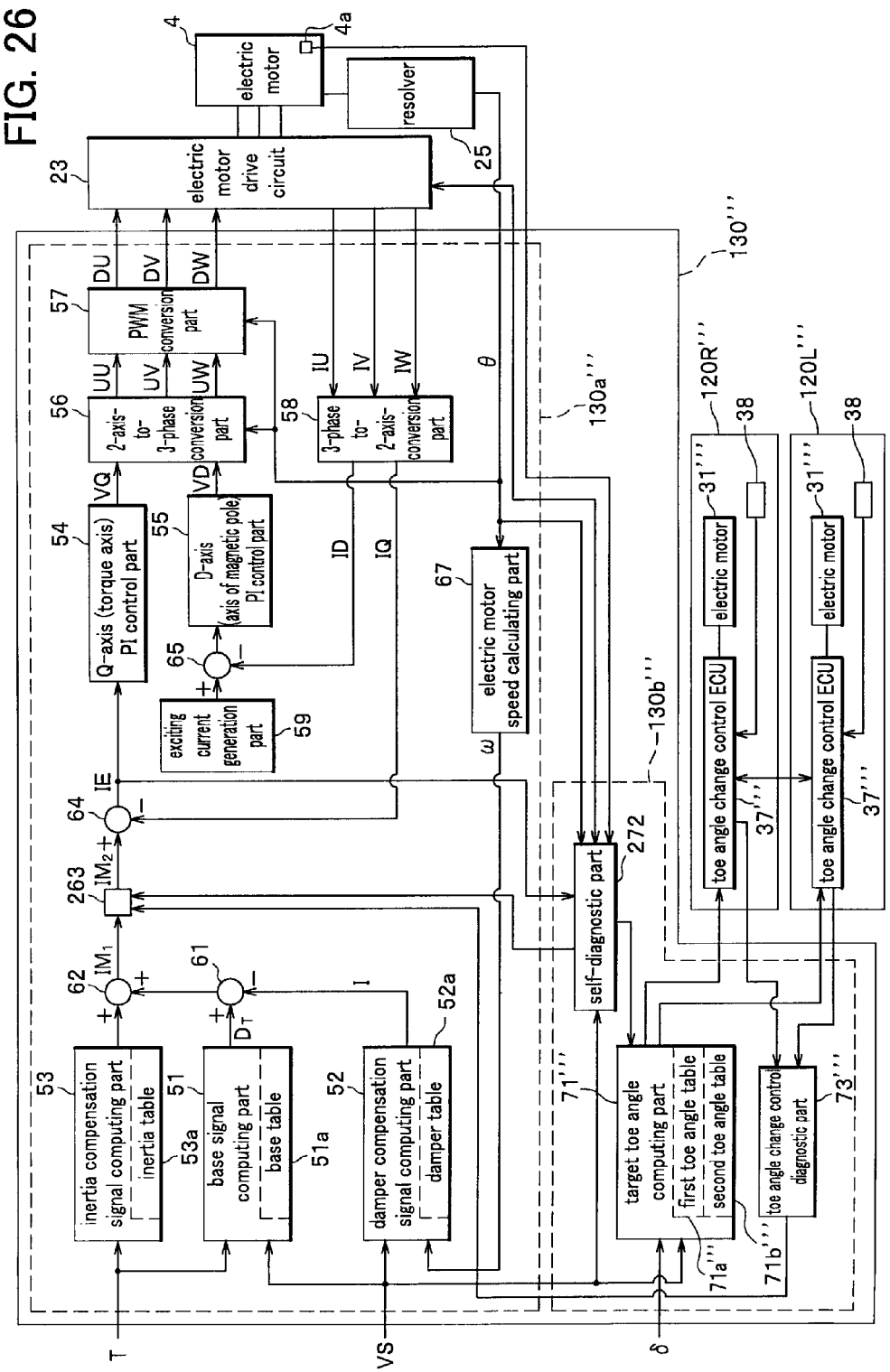
FIG. 26 is a schematic diagram of a control function of a steering control ECU and toe angle changers in the steering system according to a fifth embodiment.

FIG. 26 is a schematic diagram of a control function of a steering control ECU and toe angle changers in the steering system according to a fifth embodiment.

As shown in FIG. 26, the steering control ECU 130''' includes: the electric power steering control part 130*a*''' configured to control the electric power steering device 110''' (see FIGS. 25 and 2); and a rear wheel toe angle control part 130*b*''' configured to compute target toe angles of the rear wheels 2L, 2R.

(Electric Power Steering Control Part)

With respect to the electric power steering control part 130*a*''', only the portions different from those of the second embodiment, and configurations associated therewith, will be described with reference to FIG. 26.

The output signal $IM_1$ of the adder 62 is a target signal for the Q-axis current which defines the torque of the electric motor 4, and input to an anomaly auxiliary torque restriction part 263, which restricts the auxiliary torque when the electric power steering device is in an abnormal state.

The anomaly auxiliary torque restriction part 263 is configured to suppress the input signal IM1 to less than a specific value, when an anomaly detection signal of a high winding temperature mode from a self-diagnostic part 272, which will be described below, is detected and the input signal $IM_1$ exceeds the specific value.

The anomaly auxiliary torque restriction part 263 is configured to reduce with time the signal $IM_1$ from the adder 62 at the moment a correction command signal is input from a toe angle change control diagnostic part 73''' (which will be described below), by a specific correction amount ΔIM as shown in FIG. 14 and to output the output signal $IM_2$ to the adder 64.

The magnitude of the correction amount ΔIM is set to be a specific percent, such as 80%, of the signal $IM_1$. The current changes between positive and negative when the steering wheel is turned left and right, respectively, but regardless of the sign (positive or negative) of the signal $IM_1$, by diminishing the signal $IM_1$ to 80% of the input value, the auxiliary torque can be reduced in such a manner that the driver can sense the reduction.

When the correction command signal is not input from the toe angle change control diagnostic part 73''', the anomaly auxiliary torque restriction part 263 outputs the signal $IM_1$ as-is as an output signal $IM_2$ to the adder 64.

(Rear Wheel Toe Angle Control Part)

Next, with respect to the rear wheel toe angle control part 130b''', only the portions different from those of the second embodiment, and configurations associated therewith, will be described with reference to FIG. 26. A shown in FIG. 26, the rear wheel toe angle control part 130b''' includes a target toe angle computing part 71''', the self-diagnostic part 272 and the toe angle change control diagnostic part 73'''.

The front wheel turning angle sensor $S_S$ is configured to detect (measure) a turning angle δ of the front wheels 1L, 1R and to input the result to the target toe angle computing part 71'''.

The target toe angle computing part 71''' is configured to generate target toe angles $\alpha_{TL}, \alpha_{TR}$ for the rear wheels 2L, 2R, respectively, based on the vehicle speed signal VS, a turning angle δ, and a turning angular velocity δ' which is easily obtained by temporal differentiation of the turning angle δ, and to input the target toe angles $\alpha_{TL}, \alpha_{TR}$ to the respective toe angle change control ECUs 37''', 37''' configured to control respective toe angle changes of the left rear wheel 2L and the right rear wheel 2R (see FIG. 15). The target toe angles $\alpha_{TL}, \alpha_{TR}$ are generated from a first toe angle table 71a''' and a second toe angle table 71b''', with reference to the turning angle δ, the turning angular velocity δ' and the vehicle speed V, which tables had been prepared for each of the left rear wheel 2L and the right rear wheel 2R in advance.

The first toe angle table 71a''' is a table to be referred when the electric power steering device 110''' is in a normal state. The second toe angle table 71b''' is a table to be referred when the auxiliary torque function of the electric power steering device 110''' is in an abnormal state and an anomaly detection signal indicating a failure mode is received from the self-diagnostic part 272, which will be described later.

In the first toe angle table 71a''', the target toe angles $\alpha_{TL}, \alpha_{TR}$ of the rear wheels are set in a similar manner to that of the second embodiment (thus a detailed description is omitted here).

Also in the second toe angle table 71b''', the target toe angles $\alpha_{TL}, \alpha_{TR}$ are generated in the same manner as in the second embodiment described with the formulae (6) and (7). However, in order to prevent discomfort to the driver due to a mismatch between the steering feeling to the driver and the vehicle turnability, which may otherwise be caused when the auxiliary torque function of the electric power steering device 110''' is in an abnormal state and the steerability is reduced, the target toe angle controls which are allowed in the first toe angle table 71a''' are prohibited. Specifically, in the high-speed range over the above-mentioned specific low-speed range, when an absolute value of the turning angular velocity δ' is a specific value or less, and at the same time, the turning angle δ is within a specific range (including right and left), it is prohibited that the target toe angle control be performed in which the target toe angles $\alpha_{TL}, \alpha_{TR}$ of the rear wheels 2L, 2R are set as the same phase relative to the front wheels, in accordance with the turning angle δ. In the high-speed range over the above-mentioned specific low-speed range, when the absolute value of the turning angular velocity δ' exceeds a specific value, or when the turning angle δ is too large to fall outside the specific range (including right and left), it is prohibited that the target toe angle control be performed in which the target toe angle $\alpha_{TL}, \alpha_{TR}$ of the rear wheels are set to antiphase relative to the front wheels, in accordance with turning angle δ. To sum up, the data in the second toe angle table 71b''' is set in advance in such a manner that, when the vehicle speed V is in the high-speed range over the above-mentioned specific low-speed range, at least the target toe angle $\alpha_{TL}$ of the left rear wheel 2L and the target toe angle $\alpha_{TR}$ of the right rear wheel 2R do not exceed 0° (do not become toe-out), for any turning angle δ and turning angular velocity δ'.

The specific low-speed range herein means a range from no running state to the lowest speed of, for example, 10 km/hr.

Next, the self-diagnostic part (anomaly detection unit) 272 will be described with reference to FIG. 26. The self-diagnostic part 272 is configured to determine whether or not an abnormal state of the electric power steering device 110''' is detected, based on an angular signal θ from the resolver 25, a detection signal from a Hall element (not shown) of the electric motor drive circuit 23, a temperature signal from a sensor 4a provided in the electric motor 4, and a state monitoring of the output signal from the adder 64.

For example, the self-diagnostic part 272 determines that a winding temperature of the electric motor 4 is in an abnormal state (high winding temperature mode) when the signal from the temperature sensor 4a exceeds a specific value, and outputs an anomaly detection signal indicating a high winding temperature mode to the anomaly auxiliary torque restriction part 263 to suppress the target current.

The self-diagnostic part 272 is configured to monitor the output signal IE from the adder 64 and the detection signal of actual current from a Hall element of the electric motor drive circuit 23; to determine whether or not the auxiliary torque function of the electric power steering device 110''' is in an abnormal state, based on the angular signal θ from the resolver 25. The self-diagnostic part 272 is also configured, when it is determined that the auxiliary torque function is in an abnormal state (failure mode), to command the electric motor drive circuit 23 to stop the power supply to the electric motor 4; to output an anomaly detection signal indicating the failure mode to the target toe angle computing part 71'''; and to switch the tables to be referred to by the target toe angle computing part 71''' for computing the target toe angles $\alpha_{TL}, \alpha_{TR}$ to be output to the toe angle change control ECU 37''' of the toe angle changers 120L''', 120R''', from the first toe angle table 71a''' to the second toe angle table 71b'''.

The toe angle change control diagnostic part 73''' is similar to the toe angle change control diagnostic part 73' in the second embodiment, and thus a duplicate description is omitted.

(Toe Angle Change Control ECU)

The configuration of the toe angle change control ECU 37''' in the present embodiment is substantially the same as that of the toe angle change control ECU 37' in the second embodiment shown in FIG. 15, and thus the duplicate drawing and the duplicate description are omitted.

Figure 27:
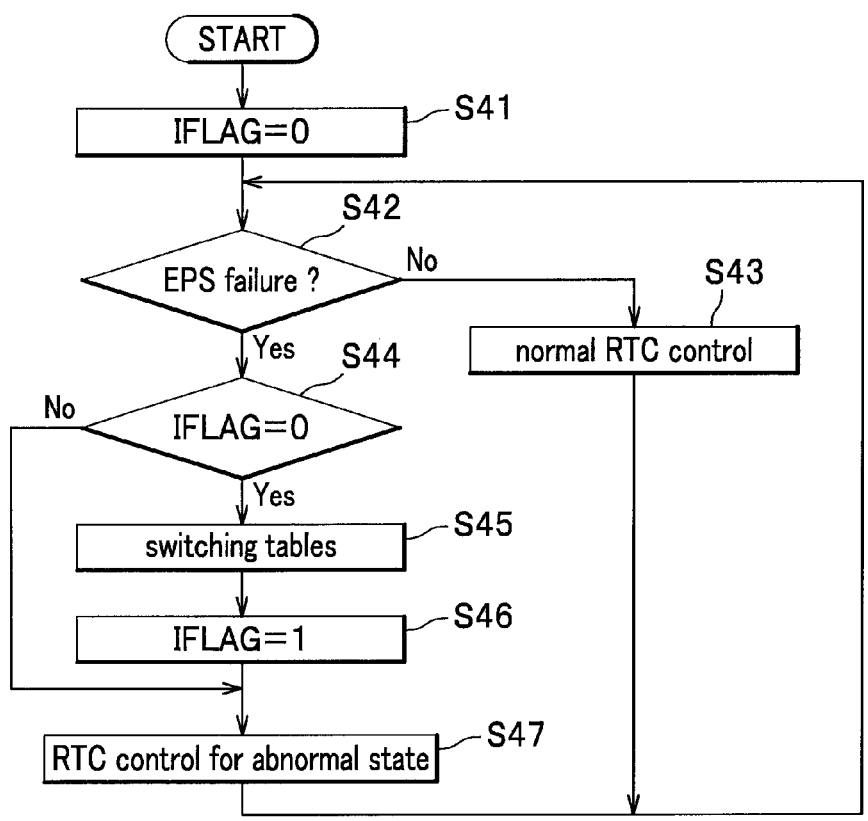
FIG. 27 is a flow chart showing a control for changing toe angle of the rear wheels when an electric power steering device has an anomaly in auxiliary torque.

Next, with reference to FIG. 27, a flow of controlling the toe angle change of the rear wheels, when the electric power steering device 110''' has an anomaly in auxiliary torque, will be described. FIG. 27 is a flow chart showing a control in the target toe angle computing part. This control process is performed in a predetermined cycle.

In a step S41, immediately after initiating the steering control ECU 130''', IFLAG=0 indicating a normal state is set as an initial setting. Subsequently in a step S42, it is determined whether or not the auxiliary torque function of the electric power steering device 110''' is in an abnormal state (EPS (Electric Power Steering) failure), based on whether or not the anomaly detection signal indicating a failure mode as described above is received from the self-diagnostic part 272. When it is determined that the electric power steering device 110''' is not in an EPS failure state (No), the procedure advances to a step S43, and in an EPS failure state (Yes), the procedure advances to a step S44.

In the step S43, the target toe angles $\alpha_{TL}$, $\alpha_{TR}$ are calculated by referring to the first toe angle table 71a''' in accordance with the vehicle speed signal VS, the turning angle δ and the turning angular velocity δ', and the results are output to the toe angle change control ECU 37''' of the respective toe angle changers 120L''', 120R''' (normal RTC control). The procedure returns to the step S42, and a series of the control is repeated.

The normal RTC control performs the control of the toe angles of the rear wheels 2L, 2R to the same phase or to antiphase in accordance with the vehicle speed signal VS, the turning angle δ and the turning angular velocity δ', to thereby allow the vehicle to turn in a small radius at a low speed, to quickly change lanes at a high speed, and to quickly turn for risk aversion at a high speed.

In the step S44, it is determined that the condition IFLAG=0 is met or not. When it is determined that IFLAG=0 is satisfied (Yes), the procedure advances to a step S45, and that IFLAG=0 is not satisfied (No), the procedure advances to a step S47. In the step S45, the first toe angle table is switched to the second toe angle table. Then, IFLAG=1 indicating the auxiliary torque anomaly mode is set (step S46), and the procedure advances to the step S47.

In the step S47, the target toe angles $\alpha_{TL}$, $\alpha_{TR}$ are calculated by referring to the second toe angle table 71b''' in accordance with the vehicle speed signal VS, the turning angle δ and the turning angular velocity δ', and the results are output to the toe angle change control ECU 37''' of the respective toe angle changers 120L''', 120R''' (anomaly RTC control). The procedure returns to the step S42, and a series of the control is repeated.

In an anomaly RTC control, when the vehicle runs at a sufficiently low speed, the toe angles of the rear wheels 2L, 2R are allowed to become antiphase, so as to allow the vehicle to turn in a small radius. However, when the vehicle runs at a high speed, the steerability becomes low due to the EPS failure, and in order to correspond to this state, a priority is given to securing a stable turnability, and thus the toe-out control of the rear wheels 2L, 2R is not allowed.

The control flow in the toe angle change control diagnostic part 73''' is substantially the same as that in the second embodiment shown in FIG. 16, and thus the duplicate drawing and the duplicate description are omitted.

As described above, according to the present embodiment, when the target toe angle computing part 71''' receives, from the self-diagnostic part 272, an anomaly detection signal indicating a failure mode in which it is determined that there is an anomaly in the auxiliary torque function of the electric power steering device 110''' (i.e., it is determined that the auxiliary torque cannot be output), in the case of the high-speed range over the above-mentioned specific low-speed range of, for example, 10 km/hr, the steering control ECU 130''' switches to the control in which the rear wheels 2L, 2R are not allowed to be toed out (when the anomaly detection unit detects an abnormal state of the power steering device, the toe angle changer is controlled so that at least toe-out control which improves turnability is not allowed). Therefore, in accordance with the notably reduced steerability due to no auxiliary torque and thus to a large reaction force for steering the steering wheel 3, a light turnability by the rear wheel steering is not imparted (discomfort feeling is prevented which may otherwise be caused by less reduction in turnability than the reduction expected from the heavy steering feeling during running), leading to a stable turn operation provided to the driver.

As a result, discomfort feeling can be prevented which may otherwise be caused by the same-phase control of the rear wheels 2L, 2R during high-speed driving with no auxiliary torque in the electric power steering device 110'''.

When the toe angle change control diagnostic part 73''' receives an anomaly detection signal from the toe angle change control ECU 37''', and when both of the rear wheels 2L, 2R are not in a toe-in state or when the actual toe angles $\alpha_{SL}=\alpha_{SR}=0$ is not satisfied, or when it is not the case that the one of the rear wheels is in a toe-in state and the actual toe angle of the other rear wheel is zero, the steering control ECU 130''' makes the adder 64 output in such a manner that the auxiliary torque is reduced, after confirming that the vehicle speed is $V_{low}$ or lower. With this configuration, the auxiliary torque becomes smaller at a sufficiently low speed, and the responsive feeling from the steering torque given to the driver becomes large, making it easier for the driver to sense an abnormal state of the steering function. Therefore, an awkward feeling, which may otherwise be given to the driver as a result of a sudden reduction in the auxiliary torque during running, can be prevented. Further, even when the steering feeling is heavy, an excellent turnability can be maintained, and for example, the vehicle can turn in a small radius during a parking operation of the vehicle.

Since the gain is set in such a manner that the auxiliary torque is reduced in accordance with the increase in the speed, if the vehicle runs at a vehicle speed exceeding the vehicle speed $V_{low}$, an anomaly in the toe angle changers 120L''' and/or 120R''' is easily sensed by the driver. Therefore, the driver can easily reduce the vehicle speed in response to the discomfort feeling in steerability, and when the vehicle speed reaches $V_{low}$ or lower, the auxiliary torque is reduced, to thereby surely inform the driver of anomaly in the toe angle changers 120L''' and/or 120R'''.

In this case, the auxiliary torque is reduced with a time delay, and thus it is possible to prevent the driver from being surprised at a rapid decrease in the auxiliary torque.

It should be noted that, the reason for not reducing the auxiliary torque when the signal from the toe angle change control ECU 37''' indicates that the rear wheels 2L, 2R are in a toe-in state or $\alpha_{SL}=\alpha_{SR}=0$ is satisfied is that, when the rear wheels 2L, 2R are locked in the toe-in state or locked with $\alpha_{SL}=\alpha_{SR}=0$ steerability and turnability are the same as those of a conventional vehicle with the steering of only front wheels 1L, 1R. Therefore, it would suffice to warn the driver by turning on an alarm lamp provided on a console, which informs anomaly in the toe angle changers 120L''' and/or 120R'''.

When the self-diagnostic part 81d''' of one of the toe angle change control ECUs 37''', 37''' detects an abnormal state, the self-diagnostic part 81d''' sends an anomaly detection signal to the other toe angle change control ECU 37''', and both of the toe angle changers 120L''', 120R''' are controlled so that both of the toe angles are fixed. Therefore, it is prevented that a change of only one of the toe angles between the rear wheels 2L, 2R remains controlled, and thus a driving performance is maintained stable even when the toe angle changers 120L''', 120R''' are in an abnormal state.

(First Modified Version of Fifth Embodiment)

Figure 28:
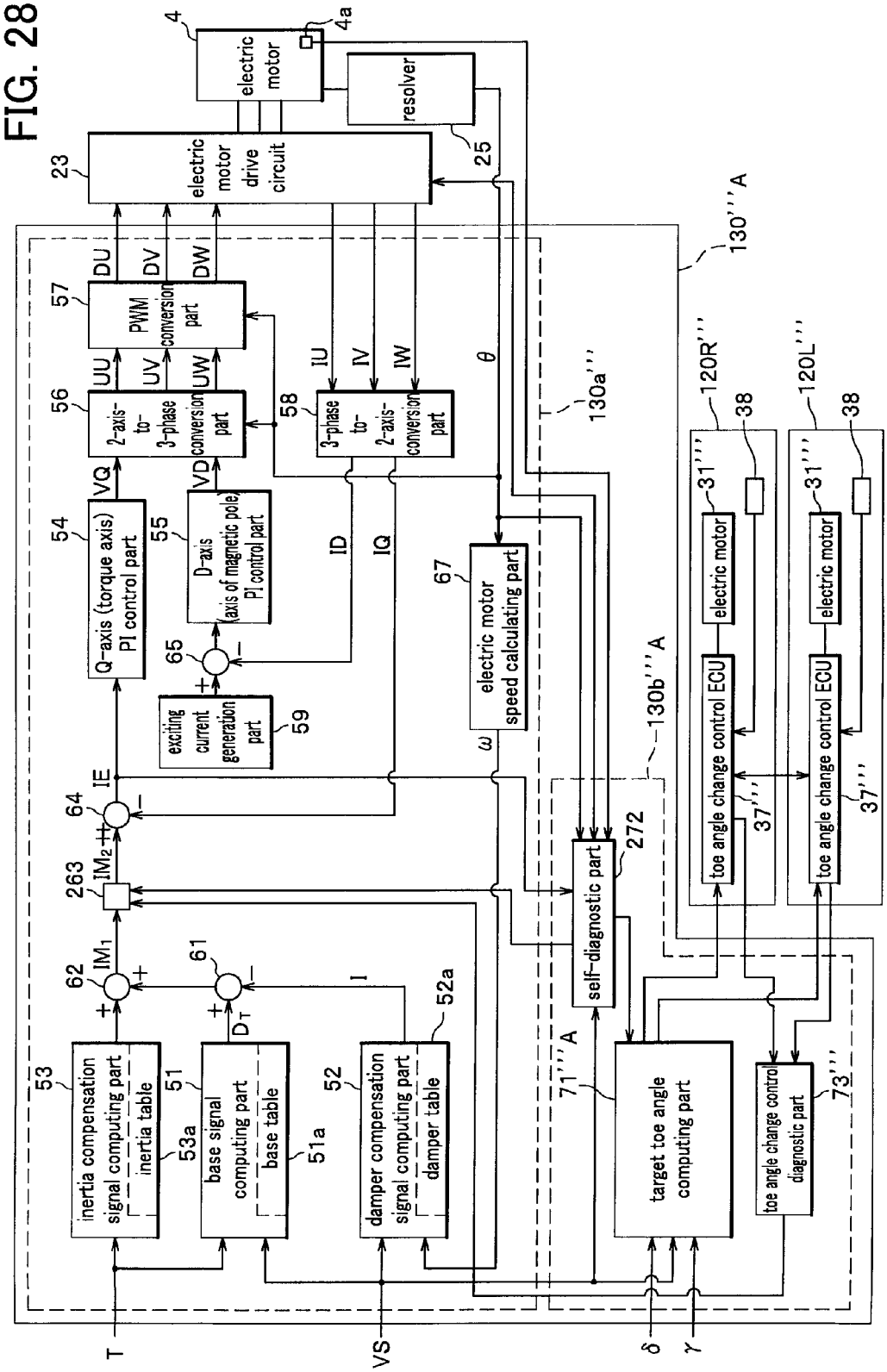
FIG. 28 is a schematic diagram of a control function of a steering control ECU and toe angle changers in the steering system according to a first modified version of the fifth embodiment.
Figure 29:
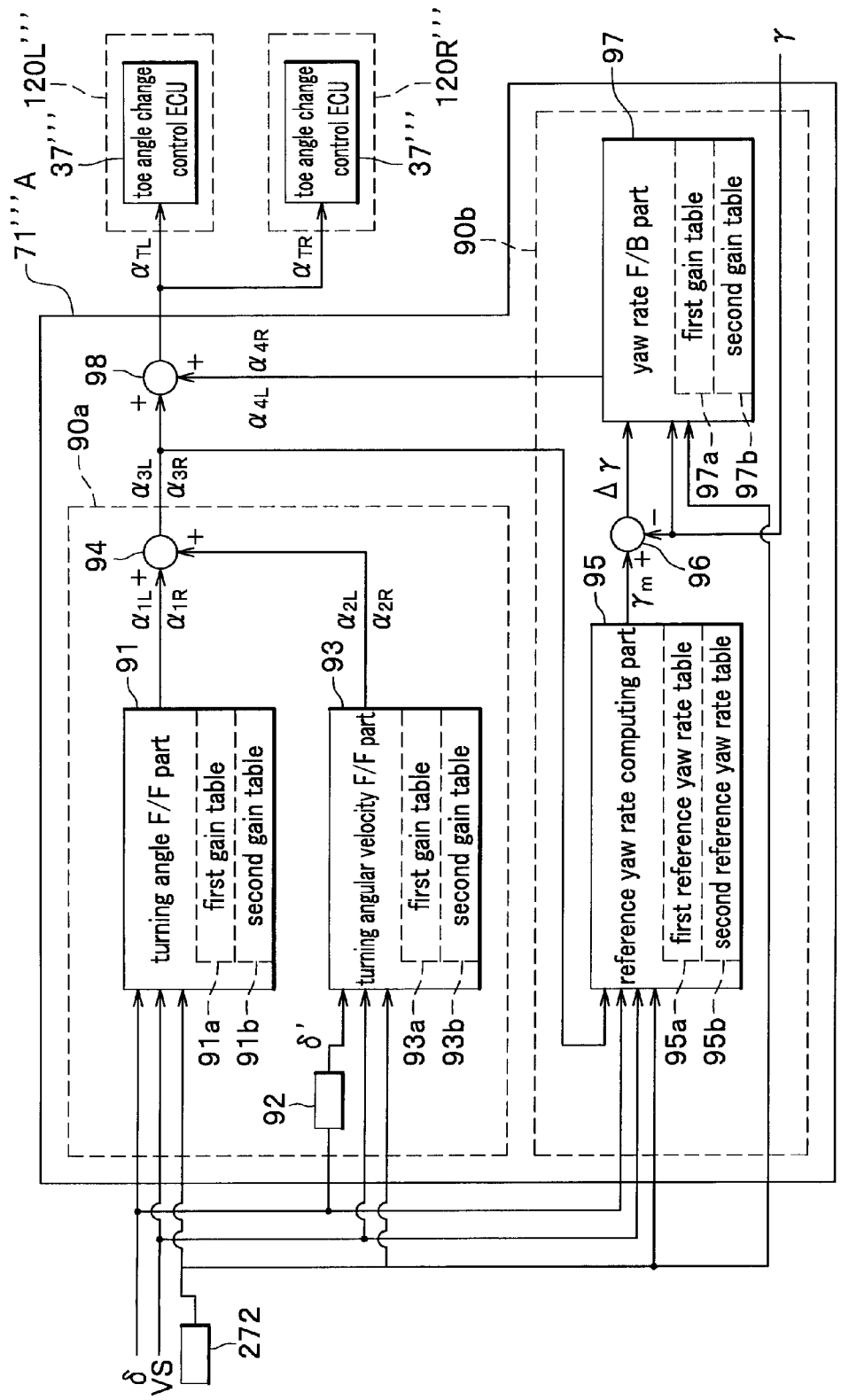
FIG. 29 is a detailed diagram of a control function of a target toe angle computing part of the steering control ECU.

Next, a steering system 100'''A according to a first modified version of the fifth embodiment will be described with reference to FIGS. 25, 28 and 29. FIG. 28 is a schematic diagram of a control function of a steering control ECU and toe angle changers in the steering system according to a first modified version of the fifth embodiment. FIG. 29 is a detailed diagram of a control function of a target toe angle computing part of the steering control ECU. Components which are the same as those illustrated in the fifth embodiment are designated with the same reference characters, and thus a duplicate description is omitted.

It should be noted that the steering system 100'''A in the present modified version is different from the steering system 100''' according to the fifth embodiment shown in FIG. 25, in that the steering control ECU 130''' in the first embodiment is replaced with the steering control ECU 130'''A. The other components are the same as those in the fifth embodiment and thus a duplicate description is omitted. The configurational arrangement of all components including the corresponding components is the same as that in the fifth embodiment (see FIG. 25), and thus the duplicate drawing and the duplicate description are omitted.

The steering system 100'''A according to the present modified version has a yaw rate sensor $S_Y$, as shown in FIG. 25, which is configured to detect (measure) an actual yaw rate of the vehicle body and to output the result to a steering control ECU 130'''A.

The steering control ECU 130'''A has, as shown in FIG. 28, a target toe angle computing part 71'''A, instead of the target toe angle computing part 71''' of the fifth embodiment.

As shown in FIG. 29, the target toe angle computing part 71'''A includes: a feedforward control part 90a having a turning angle feedforward part (hereinbelow, simply referred to as "turning angle F/F part") 91, a turning angular velocity computing part 92, a turning angular velocity feedforward part (hereinbelow, referred to as "turning angular velocity F/F part") 93 and an adder 94; a feedback control part 90b having a reference yaw rate computing part 95, a subtracter 96, a yaw rate feedback part (hereinbelow, simply referred to as "yaw rate F/B part") 97; and an adder 98.

The turning angle F/F part 91 is configured to receive signals of the turning angle δ and vehicle speed V and an anomaly detection signal from the self-diagnostic part 272, and to calculate feedforward output values $\alpha_{1L}$, $\alpha_{1R}$ of the target toe angle by referring to a first gain table 91a or a second gain table 91b. These gain tables 91a, 91b are look-up tables stored in a memory in advance, for calculating the feedforward output values $\alpha_{1L}$, $\alpha_{1R}$ using a turning angle δ and a vehicle speed V as parameters.

The turning angle F/F part 91 is configured to refer to the first gain table 91a when in a normal state, to control the ratio of the feedforward based on the vehicle speed V and the turning angle δ, and to set absolute values of the feedforward output values $\alpha_{1L}$, $\alpha_{1R}$ of the target toe angle larger, when the turning angle δ is large.

The turning angle F/F part 91 is configured to switch from the first gain table 91a to the second gain table 91b when it receives an anomaly detection signal indicating a failure mode, and to calculate feedforward output values $\alpha_{1L}$, $\alpha_{1R}$ by referring to the second gain table 91b.

In the calculation of the target toe angles in the turning angle F/F part 91, the left and right directions of the rear wheels 2L, 2R are defined as positive and negative, respectively. When the turning angle F/F part 91 refers to the first gain table 91a to calculate the target toe angle, in the case where the vehicle speed V is in the specific low-speed range as described above, the feedforward output values $\alpha_{1L}$, $\alpha_{1R}$ of the target toe angle are set in such a manner that the rear wheels 2L, 2R are in antiphase relative to the turning angle δ, and thus to allow the vehicle to turn in a small radius. In the high-speed range over the above-mentioned specific low-speed range, when the turning angle δ is within a specific range (including right and left), the turning angle F/F part 91 refers to the first gain table 91a and sets the output values $\alpha_{1L}$, $\alpha_{1R}$ in such a manner that the rear wheels 2L, 2R are in the same phase relative to the turning angle δ. In the high-speed range over the above-mentioned specific low-speed range, when the turning angle δ is too large to fall outside the specific range (including right and left), the turning angle F/F part 91 refers to the first gain table 91a and sets the output values $\alpha_{1L}$, $\alpha_{1R}$ in such a manner that the rear wheels 2L, 2R are in antiphase relative to the turning angle δ.

Unlike the first gain table 91a, the second gain table 91b is set so that the feedforward output values $\alpha_{1L}$, $\alpha_{1R}$ are under toe-in control.

The turning angular velocity computing part 92 is configured to calculate a turning angular velocity δ' by temporal differentiation of the turning angle δ, and to input the result to the turning angular velocity F/F part 93.

The turning angular velocity F/F part 93 is configured to receive signals of the turning angular velocity δ' and vehicle speed V and an anomaly detection signal from the self-diagnostic part 272, and to calculate feedforward output values $\alpha_{2L}$, $\alpha_{2R}$ of the target toe angle by referring to a first gain table 93a or a second gain table 93b. These gain tables 93a, 93b are look-up tables stored in a memory in advance, for calculating feedforward output values $\alpha_{2L}$, $\alpha_{2R}$ using a turning angular velocity δ' and a vehicle speed V as parameters.

The turning angular velocity F/F part 93 is configured to refer to the first gain table 93a when in a normal state, to control the ratio of the feedforward based on the vehicle speed V and the turning angular velocity δ', and to set absolute values of the feedforward output values $\alpha_{2L}$, $\alpha_{2R}$ larger, when the turning angular velocity δ' is large.

The turning angular velocity F/F part 93 is configured to switch from the first gain table 93a to the second gain table 93b when it receives an anomaly detection signal indicating a failure mode, and to calculate feedforward output values $\alpha_{2L}$, $\alpha_{2R}$, by referring to the second gain table 93b. The gain in the second gain table 93b is set in such a manner that the feedforward output values $\alpha_{2L}$, $\alpha_{2R}$ become smaller as compared with the first gain table 93b.

As a result, when in a normal state, the turning angular velocity F/F part 93 sets the feedforward output values $\alpha_{2L}$, $\alpha_{2R}$ in such a manner that a light turning motion of the vehicle is realized in accordance with the turning angular velocity δ'; when receiving an anomaly detection signal indicating a failure mode, the turning angular velocity F/F part 93 sets the feedforward output values $\alpha_{2L}$, $\alpha_{2R}$ in such a manner that the turning motion of the vehicle does not quickly respond to the turning angular velocity $\delta'$.

The feedforward output values $\alpha_{1L}$, $\alpha_{1R}$ of the target toe angle calculated in the turning angle F/F part 91 and the feedforward output values $\alpha_{2L}$, $\alpha_{2R}$ calculated in the turning angular velocity F/F part 93 are added in the adder 94, which gives the feedforward output values $\alpha_{3L}$ ($=\alpha_{1L}+\alpha_{2L}$), $\alpha_{3R}$ ($=\alpha_{1R}+\alpha_{2R}$) of the target toe angle, to be input to the adder 98 and at the same time to the reference yaw rate computing part 95.

To the reference yaw rate computing part 95, the signals of turning angle $\delta$ and vehicle speed V, the anomaly detection signal from the self-diagnostic part 272 and the feedforward output values $\alpha_{3L}$, $\alpha_{3R}$ of the target toe angle are input, and the reference yaw rate computing part 95 calculates a reference yaw rate $\gamma_m$ by referring to a first reference yaw rate table 95*a* or a second reference yaw rate table 95*b*. The first reference yaw rate table 95*a* is referred to when the electric power steering device 110''' is in a normal state, and the second reference yaw rate table 95*b* is referred to when auxiliary torque function of the electric power steering device 110''' is in an abnormal state. These reference yaw rate tables 95*a*, 95*b* are look-up tables stored in a memory in advance, for computing the reference yaw rate $\gamma_m$ using, for example, the vehicle speed signal VS, the turning angle $\delta$, the output values $\alpha_{3L}$, $\alpha_{3R}$ of the target toe angle as parameters.

The first reference yaw rate table 95*a* is set in advance so as to calculate a reference yaw rate $\gamma_m$ as a target standard yaw rate during expected light turning motion, by setting the toe angles of the rear wheels to antiphase or the same phase relative to the turning angle $\delta$, based on the combination of the vehicle speed V and the turning angle $\delta$.

As shown in FIG. 29, upon receiving an anomaly detection signal indicating a failure mode from the self-diagnostic part 272, the reference yaw rate computing part 95 switches from the first reference yaw rate table 95*a* to the second reference yaw rate table 95*b*. The second reference yaw rate table 95*b* is set in advance so as to calculate a reference yaw rate $\gamma_m$ which is expected to provide a stable turning behavior with the turning angle $\delta$ being valued.

The reference yaw rate $\gamma_m$ calculated in the reference yaw rate computing part 95 is put in the subtracter 96, and a deviation $\Delta\gamma$ between the reference yaw rate $\gamma_m$ and an actual yaw rate $\gamma$ from the yaw rate sensor $S_Y$ is obtained, which is input to the yaw rate F/B part 97.

The yaw rate F/B part 97 in a normal state refers to a first gain table 97*a* in accordance with the actual yaw rate $\gamma$ and the deviation $\Delta\gamma$, and outputs feedback output values $\alpha_{4L}$, $\alpha_{4R}$ of the target toe angle to the adder 98. Then, as shown in FIG. 29, to the yaw rate F/B part 97, an anomaly detection signal from the self-diagnostic part 272 is input, and when an anomaly detection signal indicating a failure mode is received, the first gain table 97*a* is switched to a second gain table 97*b*. When an anomaly detection signal indicating a failure mode is received, the yaw rate F/B part 97 refers to the second gain table 97*b* in accordance with the actual yaw rate $\gamma$ and the deviation $\Delta\gamma$ to thereby output the feedback output values $\alpha_{4L}$, $\alpha_{4R}$ of the target toe angle to the adder 98.

These gain tables 97*a*, 97*b* are look-up tables stored in a memory in advance, for calculating feedback output values $\alpha_{4L}$, $\alpha_{4R}$ using a yaw rate and a deviation $\Delta\gamma$ as parameters.

The first gain table 97*a* is set in such a manner that the gain is set to make the feedback larger relative to the deviation $\Delta\gamma$ of the yaw rate. On the other hand, the second gain table 97*b* is set in such a manner that the gain is set to make the feedback smaller relative to the deviation $\Delta\gamma$ of the yaw rate, as compared with the first gain table 97*a*.

In the adder 98, the feedforward output values $\alpha_{3L}$, $\alpha_{3R}$ of the target toe angle and the feedback output values $\alpha_{4L}$, $\alpha_{4R}$ of the target toe angle are added, respectively, and the target toe angles $\alpha_{TL}$ ($=\alpha_{3L}+\alpha_{4L}$), $\alpha_{TR}$ ($=\alpha_{3L}+\alpha_{4L}$) are input to the respective toe angle change control ECUs 37''', 37''' of the left rear wheel 2L and the right rear wheel 2R.

Herein, the first gain tables 91*a*, 93*a*, 97*a* and the first reference yaw rate table 95*a* form a standard vehicle model in a normal state, while the second gain tables 91*b*, 93*b*, 97*b* and the second reference yaw rate table 95*b* form a standard vehicle model in an abnormal state of a failure mode.

In the target toe angle computing part 71'''A, switching from the standard vehicle model in a normal state to the standard vehicle model in an abnormal state of a failure mode is executed in the same manner as in the control flow chart (FIG. 27) of the target toe angle computing part 71''' (see FIG. 15) according to the fifth embodiment, while the steering control ECU 130''' is replaced with the steering control ECU 130'''A, the target toe angle computing part 71''' is replaced with the target toe angle computing part 71'''A, and the first toe angle table 71*a*''' and the second toe angle table 71*b*''' are replaced with the standard vehicle model in a normal state and the standard vehicle model in an abnormal state of a failure mode, respectively. The description "switching tables" of the step S45 in the flow chart in FIG. 27 is replaced with "switching standard vehicle models".

Figure 30A:
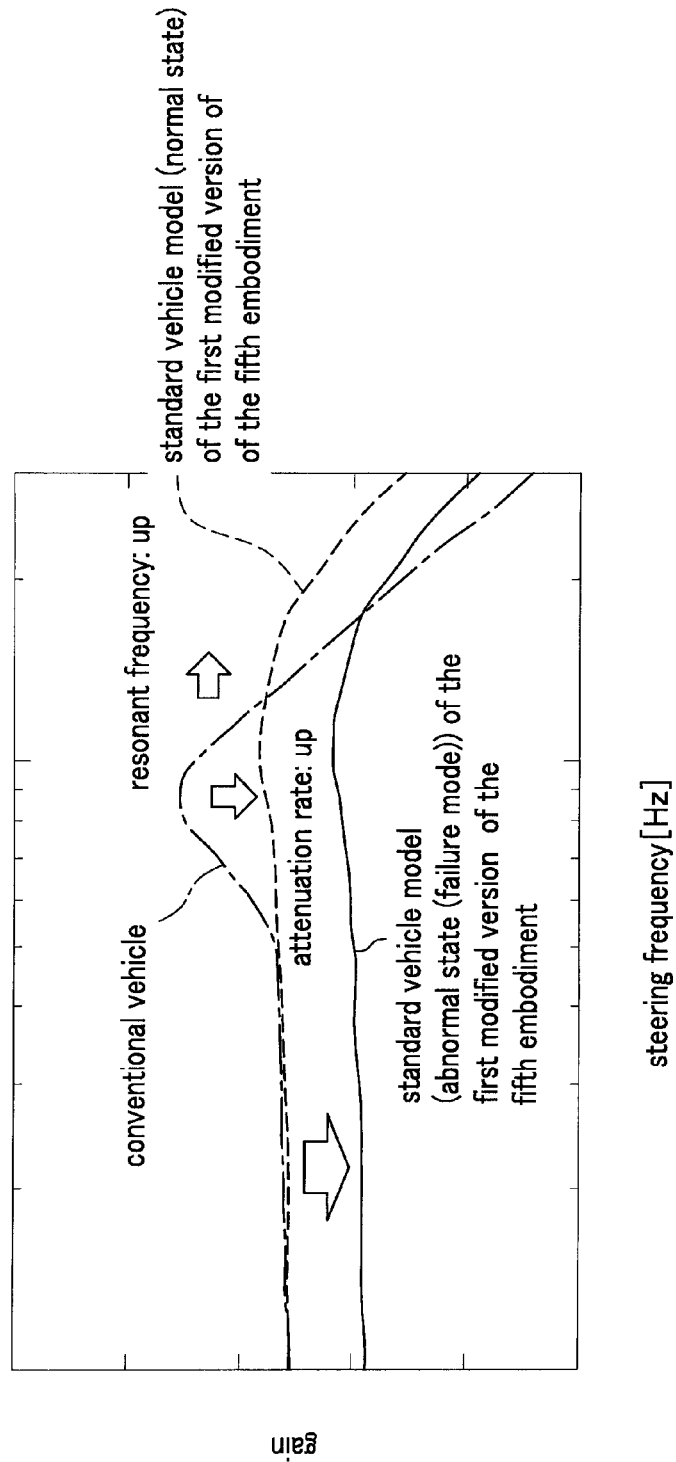
FIG. 30A is a graph showing a gain property of yaw rate.
Figure 30B:
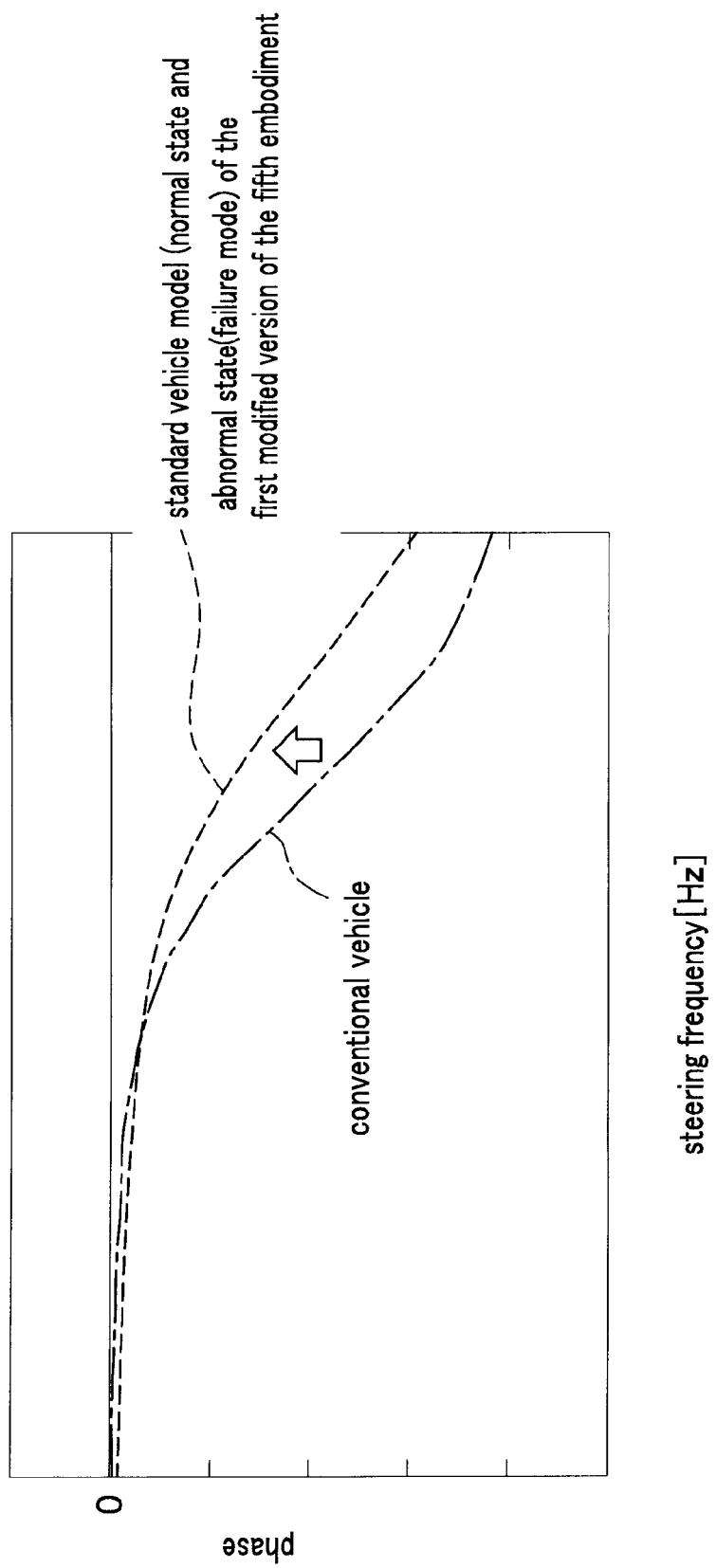
FIG. 30B is a graph showing a phase lag property of yaw rate.

FIG. 30 show a comparison in yaw rate response property in a turning motion between a standard vehicle model according to the first modified version of the fifth embodiment and a vehicle having only a front wheel steering (hereinbelow, simply referred to as "conventional vehicle") in which: FIG. 30A is a graph showing yaw rate response property with steering frequency on the horizontal axis and yaw rate gain on the vertical axis. FIG. 30B is a graph showing a yaw rate response property with steering frequency on the horizontal axis and yaw rate phase on the vertical axis.

The standard vehicle model (normal state) according to the first modified version of the fifth embodiment is set in such a manner that, as indicated with a broken line in FIG. 30A, the resonant frequency is enhanced in an right arrow direction and the resonance gain is reduced in a down-arrow direction to thereby increase an attenuation rate, as compared with the conventional vehicle indicated with a dashed-dotted line; and set in such a manner that, as indicated with a broken line in FIG. 30B, the phase delay of the yaw rate is reduced in an up-arrow direction, as compared with the conventional vehicle indicated with a dashed-dotted line.

With this setting, in a normal state, a vehicle with a high response is obtained that can follow up a quick steering by the driver.

The standard vehicle model (abnormal state of a failure mode) according to the first modified version of the fifth embodiment is set in such a manner that, as indicated with a solid line in FIG. 30A, the yaw rate gain of the standard vehicle model is made lower than that of the standard vehicle model in a normal state; and also set in such a manner that, as shown in FIG. 30B, the phase delay of the yaw rate is made same as that of the standard vehicle model in a normal state.

With this setting, in an abnormal state of auxiliary torque in the electric power steering device 110''', the standard vehicle model is switched to the vehicle with a low response, to thereby surely provide the stability of the vehicle.

It should be noted that, in the fifth embodiment and the first modified version thereof, it is preferable that the switching from the target toe angle control for a normal state to that for an abnormal state of a failure mode is performed when the vehicle is not in turning motion or when the vehicle runs at a sufficiently low speed, since an awkward feeling, which may otherwise be given to the driver as a result of a sudden change in response property of vehicle during turning motion, can be prevented.

(Other Modified Versions of Fifth Embodiment)

The present invention is not limited to the fifth embodiment and the first modified version thereof, and it is possible to make, for example, the following various modifications.

(1) In the electric power steering control part $130a'''$ according to the fifth embodiment and the first modified version thereof, the current in the electric motor 4 is controlled by setting the target current. Instead, a target voltage may be set as a voltage to be applied to the electric motor 4. Alternatively, a target torque may be set as a torque to be output by the electric motor 4, to thereby control the current in the electric motor 4. Such a target voltage and a target torque are included in the target signal.

(2) In the fifth embodiment and the first modified version thereof, as shown in FIG. 6A, the base signal computing part 51 generates the base signal $D_T$ to be used as a standard reference for a target signal $IM_1$ for the output torque $T_M^*$, based on the torque signal T and the vehicle speed signal VS as a parameter, but the present invention is not limited to these embodiments. The present invention can be applied to an electric power steering device in which: an operation angle signal from an operation angle sensor provided in the steering wheel 3 and a yaw rate signal from the yaw rate sensor $S_Y$ are input to the steering control ECU 130''' or the steering control ECU 130'''A, the reference yaw rate, which is determined in advance based on the vehicle speed signal VS and the operation angle, is calculated; and feedback control of the reaction force to the steering wheel 3 is performed based on a difference between the reference yaw rate and the actual yaw rate.

The present invention can be applied to an electric power steering device in which: a yaw rate signal from the yaw rate sensor $S_Y$ is input to the steering control ECU 130''' or the steering control ECU 130'''A; and a yaw rate feedback reaction force torque, which is calculated based on the vehicle speed signal VS and the yaw rate, is fed back as a reaction force to the steering wheel 3.

In the steering system according to the fifth embodiment and the first modified version thereof, when the electric power steering device is in an abnormal auxiliary torque state, it is prohibited to perform the control that makes the toe angles $\alpha_L$, $\alpha_R$ of the rear wheels toed out. This means that the toe angle of the rear wheels are changed to the direction that suppresses the generation of yaw rate. The steering system in which the left and right toe angles of the rear wheels are controlled to become the same phase includes those in which it is prohibited that a rear wheel as an outer ring of turning becomes toe-out, i.e., antiphase of the left and right toe angles of the rear wheels relative to the turning angle δ of the front wheels.

What is claimed is:

1. A steering system for a vehicle, comprising:
   an electric power steering device which comprises a steering unit of front wheels having an electric motor configured to generate an auxiliary torque in accordance with at least a steering torque, and is configured to transmit the auxiliary torque to the steering unit;
   a toe angle changer for a left rear wheel and a toe angle changer for a right rear wheel, which are capable of changing toe angles of the respective left and right rear wheels in accordance with at least a turning angle of the front wheels and a vehicle speed; and
   a steering controller configured to control the electric power steering device and the toe angle changer,
   wherein the steering system further comprises at least one of
      a toe angle changer anomaly detection unit configured to detect an abnormal state of the toe angle changer, and
      an electric power steering device anomaly detection unit configured to detect an abnormal state of the electric power steering device, and
      when an abnormal state of the toe angle changer is detected, the toe angle changer anomaly detection unit controls at least one of a target value of the auxiliary torque for assisting the electric power steering device and a viscosity in the electric power steering device, and
      when an abnormal state of the electric power steering device is detected, the electric power steering device anomaly detection unit controls the toe angle changer in a manner that the toe angle changer for allowing the rear wheels to be toed out is not performed.

2. The steering system according to claim 1, wherein each of the toe angle changers comprises
   the toe angle changer anomaly detection unit, and
   the steering controller comprises
      an auxiliary torque calculating unit configured to calculate the target value of the auxiliary torque;
      a yaw rate detection unit for detecting a yaw rate of the vehicle;
      a yaw rate gain calculating unit configured to calculate a yaw rate gain in the abnormal state of the toe angle changer;
      a yaw rate feedback torque correction value calculating unit configured to calculate a yaw rate feedback torque correction value in the abnormal state of the toe angle changer based on the yaw rate, the vehicle speed and the yaw rate gain in the abnormal state; and
      a target value correction unit configured to correct the target value of the auxiliary torque using the yaw rate feedback torque correction value.

3. The steering system according to claim 2, wherein the yaw rate gain in the abnormal state of the toe angle changer is calculated based on the turning angle of the front wheels, the yaw rate and the vehicle speed.

4. The steering system according to claim 1, wherein each of the toe angle changers comprises
   the toe angle changer anomaly detection unit,
   the steering controller comprises
      an auxiliary torque calculating unit configured to calculate the target value of the auxiliary torque, and
   the steering controller reduces the calculated target value of the auxiliary torque when the steering controller receives an anomaly detection signal from the toe angle changer anomaly detection unit.

5. The steering system according to claim 4, wherein the steering controller reduces the calculated target value of the auxiliary torque when the steering controller receives the anomaly detection signal from the toe angle changer anomaly detection unit and the vehicle speed is a specific value or lower.

6. The steering system according to claim 4, wherein the toe angle changers lock both the left and right toe angles of the rear wheels in accordance with the abnormal state, when the toe angle changer anomaly detection unit detects an abnormal state, and
   the steering controller reduces the calculated target value of the auxiliary torque, when the steering controller receives the anomaly detection signal from the toe angle changer anomaly detection unit, the vehicle speed is a specific value or lower, and at least one of the left and right toe angles of the rear wheels locked in accordance with the abnormal state is in a toe-out state.

7. The steering system according to claim 1, wherein each of the toe angle changers comprises
   the toe angle changer anomaly detection unit, and
the steering controller sets the auxiliary torque to 0 when the steering controller receives an anomaly detection signal from the toe angle changer anomaly detection unit.

8. The steering system according to claim 7, wherein the steering controller sets the auxiliary torque to 0 when the steering controller receives the anomaly detection signal from the toe angle changer anomaly detection unit and the vehicle speed is a specific value or lower.

9. The steering system according to claim 7, wherein the toe angle changers lock both the left and right toe angles of the rear wheels in accordance with the abnormal state, when the toe angle changer anomaly detection unit detects an abnormal state, and
the steering controller sets the auxiliary torque to 0, when the steering controller receives the anomaly detection signal from the toe angle changer anomaly detection unit, the vehicle speed is a specific value or lower, and at least one of the left and right toe angles of the rear wheels locked in accordance with the abnormal is in a toe-out state.

10. The steering system according to claim 1, wherein each of the toe angle changers comprises
   a toe angle detection unit for detecting the toe angle of the corresponding rear wheel and
   the toe angle changer anomaly detection unit,
the steering controller comprises
   a damping control part configured to calculate a compensation value for increasing or reducing the viscosity in the electric power steering device, and
when the toe angle changer anomaly detection unit detects an abnormal state,
in the case where the left and right rear wheels are toed in, the compensation value is made smaller to reduce the viscosity, and
in the case where the left and right rear wheels are toed out, the compensation value is made larger to increase the viscosity.

11. The steering system according to claim 10, wherein the steering controller comprises
   a first table for setting the compensation value to be referred to when the toe angle changer is in a normal state,
   a second table for setting the compensation value to be referred to when the toe angle changer is in an abnormal state and the left and right rear wheels are toed in,
   a third table for setting the compensation value to be referred to when the toe angle changer is in an abnormal state and the left and right rear wheels are toed out, and
when the toe angle changer anomaly detection unit detects an abnormal state,
in the case where the left and right rear wheels are toed in, the steering controller switches the tables to be referred to from the first table to the second table and sets the compensation value, and
in the case where the left and right rear wheels are toed out, the steering controller switches the tables to be referred to from the first table to the third table and sets the compensation value.

12. The steering system according to claim 1, wherein each of the toe angle changers comprises
   a toe angle detection unit for detecting the toe angle of the corresponding rear wheel and
   the toe angle changer anomaly detection unit,
the steering controller comprises
   an auxiliary torque calculating unit configured to calculate the target value of the auxiliary torque as an assist amount for the electric power steering device, and
when the toe angle changer anomaly detection unit detects an abnormal state,
in the case where the left and right rear wheels are toed in, the target value of the auxiliary torque is made larger to make the assist amount for the electric power steering device larger, and
in the case where the left and right rear wheels are toed out, the target value of the auxiliary torque is made smaller to make the assist amount for the electric power steering device smaller.

13. The steering system according to claim 12, wherein the steering controller comprises
   a fourth table for setting the target value of the auxiliary torque to be referred to when the toe angle changer is in a normal state,
   a fifth table for setting the target value of the auxiliary torque to be referred to when the toe angle changer is in an abnormal state and the left and right rear wheels are toed in,
   a sixth table for setting the target value of the auxiliary torque to be referred to when the toe angle changer is in an abnormal state and the left and right rear wheels are toed out, and
when the toe angle changer anomaly detection unit detects an abnormal state,
in the case where the left and right rear wheels are toed in, the steering controller switches the tables to be referred to from the fourth table to the fifth table and sets the target value of the auxiliary torque, and
in the case where the left and right rear wheels are toed out, the steering controller switches the tables to be referred to from the fourth table to the sixth table and sets the target value of the auxiliary torque.

14. The steering system according to claim 1, wherein each of the toe angle changers comprises
   a toe angle detection unit for detecting the toe angle of the corresponding rear wheel and the steering controller comprises
   an auxiliary torque calculating unit configured to calculate the target value of the auxiliary torque, and
   the electric power steering device anomaly detection unit.

15. The steering system according to claim 14, wherein when the electric power steering device anomaly detection unit detects an abnormal state and the vehicle speed exceeds a specific value, the toe angle changers are controlled in a manner that at least toe-out control for allowing the rear wheels to be toed out is not performed.

* * * * *